US012209004B2

(12) United States Patent
Kawauchi et al.

(10) Patent No.: US 12,209,004 B2
(45) Date of Patent: Jan. 28, 2025

(54) INITIAL SETTING METHOD OF UNMANNED FORKLIFT, PALETTE FOR ADJUSTMENT, AND ADJUSTMENT SYSTEM OF UNMANNED FORKLIFT

(71) Applicant: Mitsubishi Logisnext Co., Ltd., Nagaokakyo (JP)

(72) Inventors: Naoto Kawauchi, Tokyo (JP); Kensuke Futahashi, Tokyo (JP); Noriyuki Hasegawa, Tokyo (JP); Masayuki Ishikawa, Tokyo (JP); Atsushi Minobe, Nagaokakyo (JP); Masafumi Monchi, Nagaokakyo (JP); Kenji Nakayama, Nagaokakyo (JP); Kazuaki Okai, Nagaokakyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 310 days.

(21) Appl. No.: 17/973,123

(22) Filed: Oct. 25, 2022

(65) Prior Publication Data

US 2023/0139296 A1 May 4, 2023

(30) Foreign Application Priority Data

Oct. 29, 2021 (JP) .................................. 2021-177632
Mar. 31, 2022 (JP) .................................. 2022-060387

(51) Int. Cl.
*B66F 9/075* (2006.01)
*B66F 9/06* (2006.01)
*G05D 1/00* (2006.01)

(52) U.S. Cl.
CPC ............ *B66F 9/0755* (2013.01); *B66F 9/063* (2013.01); *G05D 1/0221* (2013.01); *G05D 1/0225* (2013.01); *G05D 1/0246* (2013.01)

(58) Field of Classification Search
None
See application file for complete search history.

(56) References Cited

U.S. PATENT DOCUMENTS 10,429,833 B2 * 10/2019 Schulz ..................... G06T 7/74
11,841,216 B2 * 12/2023 Clayton ............... G06T 7/0004
(Continued)

FOREIGN PATENT DOCUMENTS

AU   2022284873 A1 * 11/2023 ............... B65G 1/04
CA   3221082 A1 * 12/2022 ............... B65G 1/04
(Continued)

OTHER PUBLICATIONS

European Search Report dated Mar. 31, 2023 issued in corresponding European Application No. 22203808.5.

*Primary Examiner* — Kevin R Steckbauer
(74) *Attorney, Agent, or Firm* — Birch, Stewart, Kolasch & Birch, LLP

(57) ABSTRACT

An initial setting method of an unmanned forklift is an initial setting method when the unmanned forklift is introduced in a facility including a rack structure, which includes placing a palette for adjustment on a palette placing part of the rack structure using the unmanned forklift on the basis of a preset operation program, acquiring relative position information between the palette for adjustment and the rack structure using a position information acquisition part included in the palette for adjustment, and calculating the shift amount of the palette for adjustment placed on the rack structure with respect to the palette placing part on the basis of the relative position information.

23 Claims, 26 Drawing Sheets

(56) References Cited

U.S. PATENT DOCUMENTS

| | | | |
|---|---|---|---|
| 11,851,310 B2 * | 12/2023 | Yeo | G05D 1/024 |
| 12,030,758 B2 * | 7/2024 | Kawauchi | B66F 9/0755 |
| 2018/0143624 A1 * | 5/2018 | Schulz | B66F 9/24 |
| 2019/0331474 A1 * | 10/2019 | Clayton | G01B 11/04 |
| 2020/0039766 A1 * | 2/2020 | Haban | G06Q 10/08 |
| 2021/0087033 A1 | 3/2021 | Kimura et al. | |
| 2021/0316975 A1 * | 10/2021 | Yeo | G01S 17/42 |
| 2022/0267128 A1 * | 8/2022 | Han | B66F 9/0755 |
| 2022/0388783 A1 * | 12/2022 | Wintz | B65G 1/04 |
| 2022/0396459 A1 * | 12/2022 | Kim | G06K 7/10366 |
| 2023/0002204 A1 * | 1/2023 | Kawauchi | B66F 9/0755 |
| 2023/0139296 A1 * | 5/2023 | Kawauchi | B66F 9/24 |
| | | | 356/614 |

FOREIGN PATENT DOCUMENTS

| | | | | |
|---|---|---|---|---|
| CA | 3229505 A1 * | 2/2023 | | B66F 17/003 |
| CN | 108584800 A * | 9/2018 | | |
| CN | 108773798 A * | 11/2018 | | B66F 9/075 |
| CN | 108946585 A * | 12/2018 | | |
| CN | 208200282 U * | 12/2018 | | |
| CN | 109353967 A * | 2/2019 | | |
| CN | 109553034 A * | 4/2019 | | |
| CN | 208791108 U * | 4/2019 | | |
| CN | 208791109 U * | 4/2019 | | B66F 9/075 |
| CN | 111115515 A * | 5/2020 | | |
| CN | 111221330 A * | 6/2020 | | |
| CN | 213950488 U * | 8/2021 | | B65G 67/02 |
| CN | 113896138 A * | 1/2022 | | |
| CN | 216190820 U * | 4/2022 | | |
| CN | 216272964 U * | 4/2022 | | |
| CN | 216377351 U * | 4/2022 | | |
| CN | 115123969 A * | 9/2022 | | |
| CN | 218025302 U * | 12/2022 | | |
| CN | 115557431 A * | 1/2023 | | B66F 9/063 |
| CN | 115840449 A * | 3/2023 | | |
| CN | 115947266 A * | 4/2023 | | |
| CN | 115973966 A * | 4/2023 | | |
| CN | 116358563 A * | 6/2023 | | |
| CN | 116374782 B * | 8/2023 | | |
| CN | 116768107 A * | 9/2023 | | |
| CN | 117023458 A * | 11/2023 | | |
| CN | 117326245 A * | 1/2024 | | |
| CN | 220317287 U * | 1/2024 | | |
| CN | 220412787 U * | 1/2024 | | |
| CN | 117622750 A * | 3/2024 | | |
| CN | 117682453 A * | 3/2024 | | |
| CN | 117720045 A * | 3/2024 | | |
| CN | 114834908 B * | 4/2024 | | B65G 41/005 |
| CN | 117622750 B * | 4/2024 | | |
| CN | 117910196 A * | 4/2024 | | |
| CN | 220745281 U * | 4/2024 | | |
| CN | 118052421 A * | 5/2024 | | |
| CN | 221027487 U * | 5/2024 | | |
| CN | 221027495 U * | 5/2024 | | |
| CN | 118164133 A * | 6/2024 | | |
| CN | 118210317 A * | 6/2024 | | B05D 1/43 |
| CN | 118255295 A * | 6/2024 | | |
| CN | 118052421 B * | 7/2024 | | |
| CN | 118343650 A * | 7/2024 | | |
| CN | 118364411 A * | 7/2024 | | |
| CN | 221397169 U * | 7/2024 | | |
| CN | 118210317 B * | 9/2024 | | B05D 1/43 |
| DE | 102020203207 A1 * | 9/2021 | | B65D 19/38 |
| EP | 3988496 A1 * | 4/2022 | | B66F 9/063 |
| EP | 4112534 A1 * | 1/2023 | | B66F 9/063 |
| EP | 4174016 A1 * | 5/2023 | | B66F 9/063 |
| EP | 3538470 B1 * | 3/2024 | | B66C 13/46 |
| EP | 4112534 B1 * | 7/2024 | | B66F 9/063 |
| JP | 6-340400 A | 12/1994 | | |
| JP | 9-12297 A | 1/1997 | | |
| JP | 2003034497 A * | 2/2003 | | |
| JP | 2003081410 A * | 3/2003 | | |
| JP | 3894753 B2 * | 3/2007 | | |
| JP | 6707601 B2 * | 6/2020 | | |
| JP | 2023007817 A * | 1/2023 | | B66F 9/063 |
| JP | 2023067706 A * | 5/2023 | | B66F 9/063 |
| JP | 7373148 B2 * | 11/2023 | | B66F 9/063 |
| JP | 7472082 B2 * | 4/2024 | | B66F 9/063 |
| JP | 7504147 B2 * | 6/2024 | | B66F 9/063 |
| WO | WO-2022256572 A1 * | 12/2022 | | B65G 1/04 |
| WO | WO-2024138845 A1 * | 7/2024 | | |

\* cited by examiner

INITIAL SETTING METHOD OF UNMANNED FORKLIFT, PALETTE FOR ADJUSTMENT, AND ADJUSTMENT SYSTEM OF UNMANNED FORKLIFT

CROSS-REFERENCE TO RELATED APPLICATION

Priority is claimed on Japanese Patent Application No. 2021-177632, filed Oct. 29, 2021, and Japanese Patent Application No. 2022-60387, filed Mar. 31, 2022, the contents of which are incorporated herein by reference.

BACKGROUND OF THE INVENTION

Field of the Invention

The present disclosure relates to an initial setting method of an unmanned forklift, a palette for adjustment, and an adjustment system of the unmanned forklift.

Description of Related Art

Japanese Unexamined Patent Application, First Publication No. H09-12297, discloses a configuration of an unmanned forklift in which a reach direction palette shift detection device and a leftward/rightward direction palette shift detection device are provided on a pair of forks, and a shift and a rotational shift in a forward/rearward direction and a leftward/rightward direction of a palette on the forks can be detected. In the above-mentioned configuration, a shift of the palette with respect to the forks is detected when the palette is picked up, when the held palette is unloaded onto a rack or the like, when the unmanned forklift travels in a state in which the palette is held, or the like.

SUMMARY OF THE INVENTION

Incidentally, the unmanned forklift travels in a facility such as a warehouse, a factory, or the like on the basis of a preset operation program and executes a loading operation and an unloading operation of the palette with respect to a palette placing part set in a predetermined position. When the unmanned forklift is introduced into a new facility, there is a need to set initial setting information such as a moving route of the unmanned forklift, position coordinates of a palette placing part, and the like in an operation program. The information such as the moving route of the unmanned forklift, the position coordinates of the palette placing part, and the like are acquired on the basis of design data such as a facility, a rack installed in the facility, or the like.

However, for example, in the rack installed in the facility, a position shift with respect to the design data may occur due to assembling accuracy of the rack itself, installation accuracy of the rack, or the like. For this reason, upon new introduction of the unmanned forklift, prior to an official operation of the unmanned forklift, test traveling in which the unmanned forklift is operated is performed on the basis of a preset operation program. In the test traveling, the palette is actually unloaded onto a palette placing part of the rack by the unmanned forklift. A worker measures the actual installation position of the unloaded palette and a position shift amount with respect to the palette placing part, and there is a need to correct information such as position coordinates or the like of the palette placing part in the operation program based on the measured position shift amount. For this reason, measurement of the position shift amount of the unloaded palette takes time and effort, and introduction of the unmanned forklift takes time and cost.

In order to solve the above-mentioned problems, the present disclosure is directed to providing an initial setting method of an unmanned forklift, a palette for adjustment, and an adjustment system of the unmanned forklift, which enable easy introduction of the unmanned forklift and suppress time and cost required for test traveling before an official operation.

In order to solve the above-mentioned problems, an initial setting method of an unmanned forklift according to the present disclosure is an initial setting method for when an unmanned forklift is introduced into a facility including a rack structure, the initial setting method of the unmanned forklift including: placing a palette for adjustment on a palette placing part of the rack structure using the unmanned forklift on the basis of a preset operation program; acquiring relative position information between the palette for adjustment and the rack structure using a position information acquisition part included in the palette for adjustment; and calculating the shift amount of the palette for adjustment placed on the rack structure with respect to the palette placing part on the basis of the relative position information.

A palette for adjustment according to the present disclosure is a palette for adjustment used in the initial setting method of the unmanned forklift, which includes a palette main body that is able to be supported by the forks of the unmanned forklift and placed on the rack structure; and the position information acquisition part provided on the palette main body and configured to acquire relative position information with the rack structure on which the palette for adjustment is placed.

An adjustment system of an unmanned forklift according to the present disclosure includes the above-mentioned palette for adjustment, and a calculation part configured to calculate the shift amount of the palette for adjustment placed on the rack structure with respect to the palette placing part based on the relative position information acquired by the position information acquisition part.

According to the initial setting method of the unmanned forklift, the palette for adjustment, and the adjustment system of the unmanned forklift of the present disclosure, it is possible to easily perform introduction of the unmanned forklift and suppress time and costs required for test traveling before an official operation.

DETAILED DESCRIPTION OF THE INVENTION

Hereinafter, aspects for performing an initial setting method of an unmanned forklift, a palette for adjustment, and an adjustment system of the unmanned forklift according to the present disclosure will be described with reference to the accompanying drawings. However, the present disclosure is not limited to these embodiments only.

First Embodiment (Configuration of Unmanned Forklift System)

Figure 1:
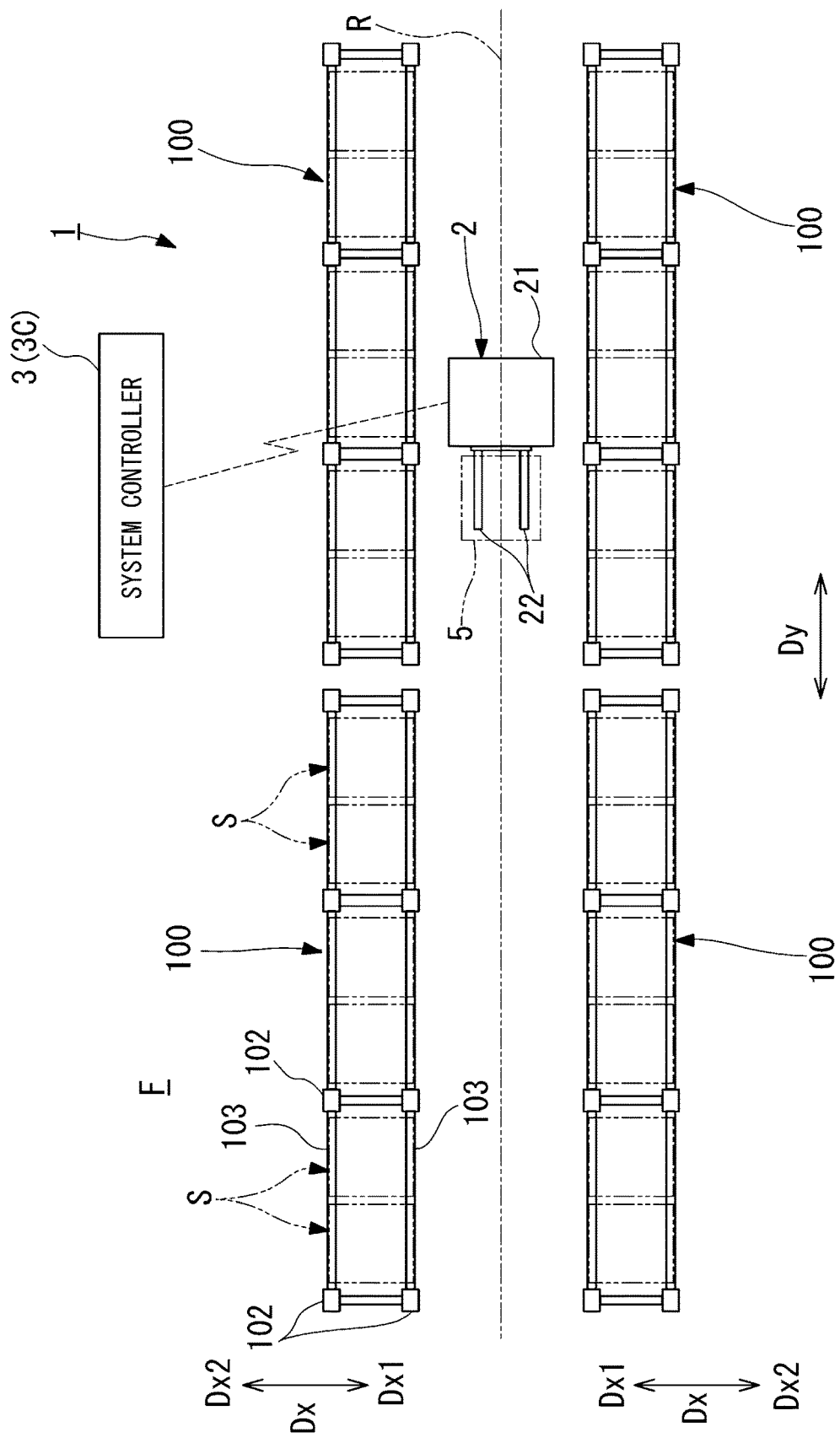
FIG. 1 is a plan view showing a schematic configuration of an automated guided forklift system of a facility to which an initial setting method of an unmanned forklift, a palette for adjustment, and an adjustment system of the unmanned forklift according to an embodiment of the present disclosure are applied.

Here, before description of an adjustment system 10A of an unmanned forklift, an automated guided forklift (AGF) system 1 to which the adjustment system 10A of the unmanned forklift is applied will be described. As shown in FIG. 1, as a facility in which the automated guided forklift system 1 is installed, for example, a warehouse, a factory, a commercial facility, a freight handling facility, or the like are exemplary examples. In the warehouse, for example, various articles placed on the palette are stored. In the factory, for example, various parts or materials placed on the palette are conveyed between processes in the factory. In the commercial facility, goods placed on the palette are displayed in, for example, a goods showcase. In the freight handling facility, for example, temporary storage of freights placed on the palette, sorting of the freights toward destinations, or the like is performed. Here, the palette may include a container that can be transported by the unmanned forklift.

In the automated guided forklift system 1, an unmanned forklift 2 automatically travels along a predetermined route R set in the facility, and various articles placed on a palette 5 are conveyed in the facility. The automated guided forklift system 1 includes one or more unmanned forklifts 2 that can travel along the route R, and a system controller 3.

(Configuration of Rack Structure)

Figure 2:
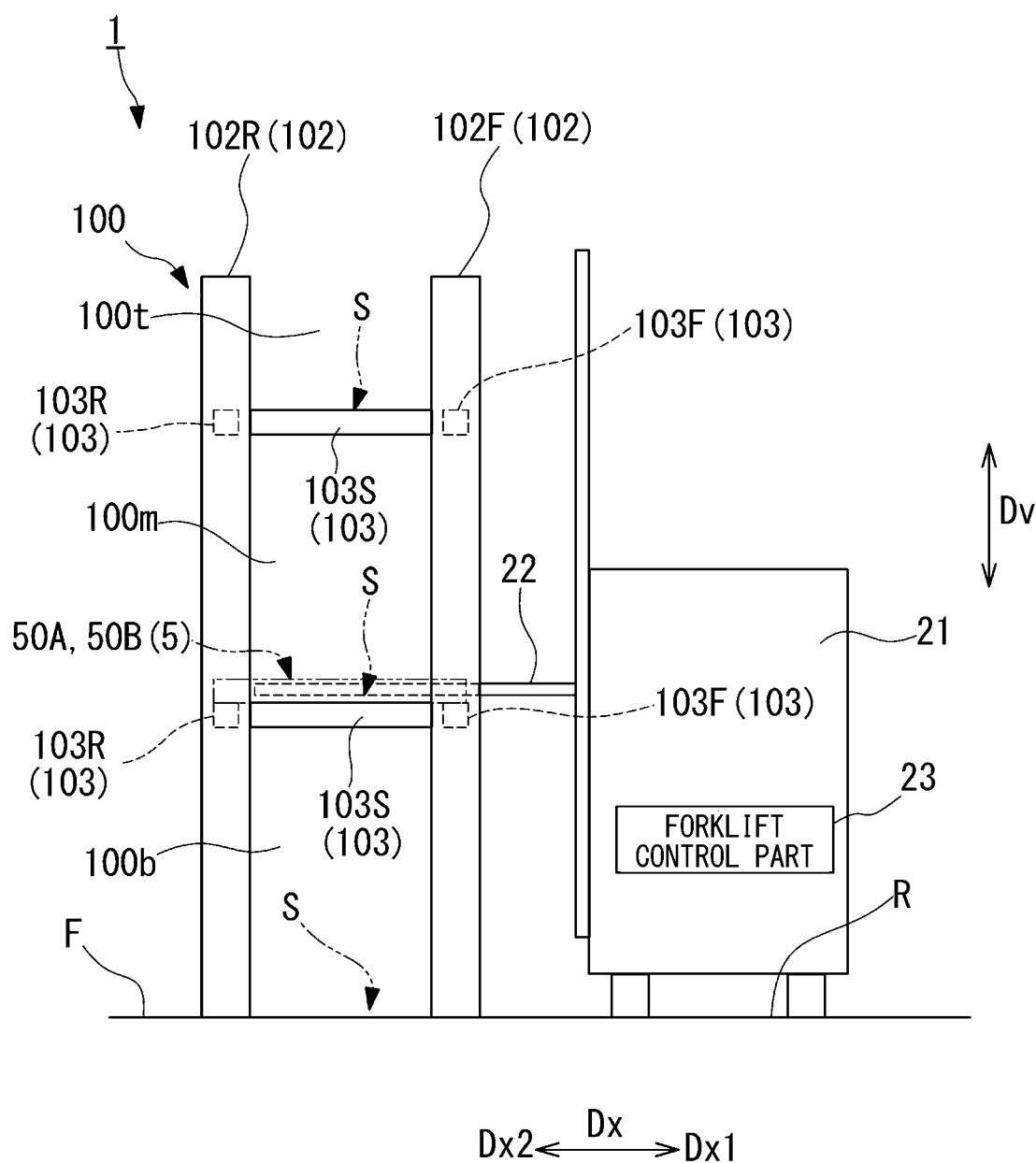
FIG. 2 is a side view of rack equipment installed in the facility.
Figure 3:
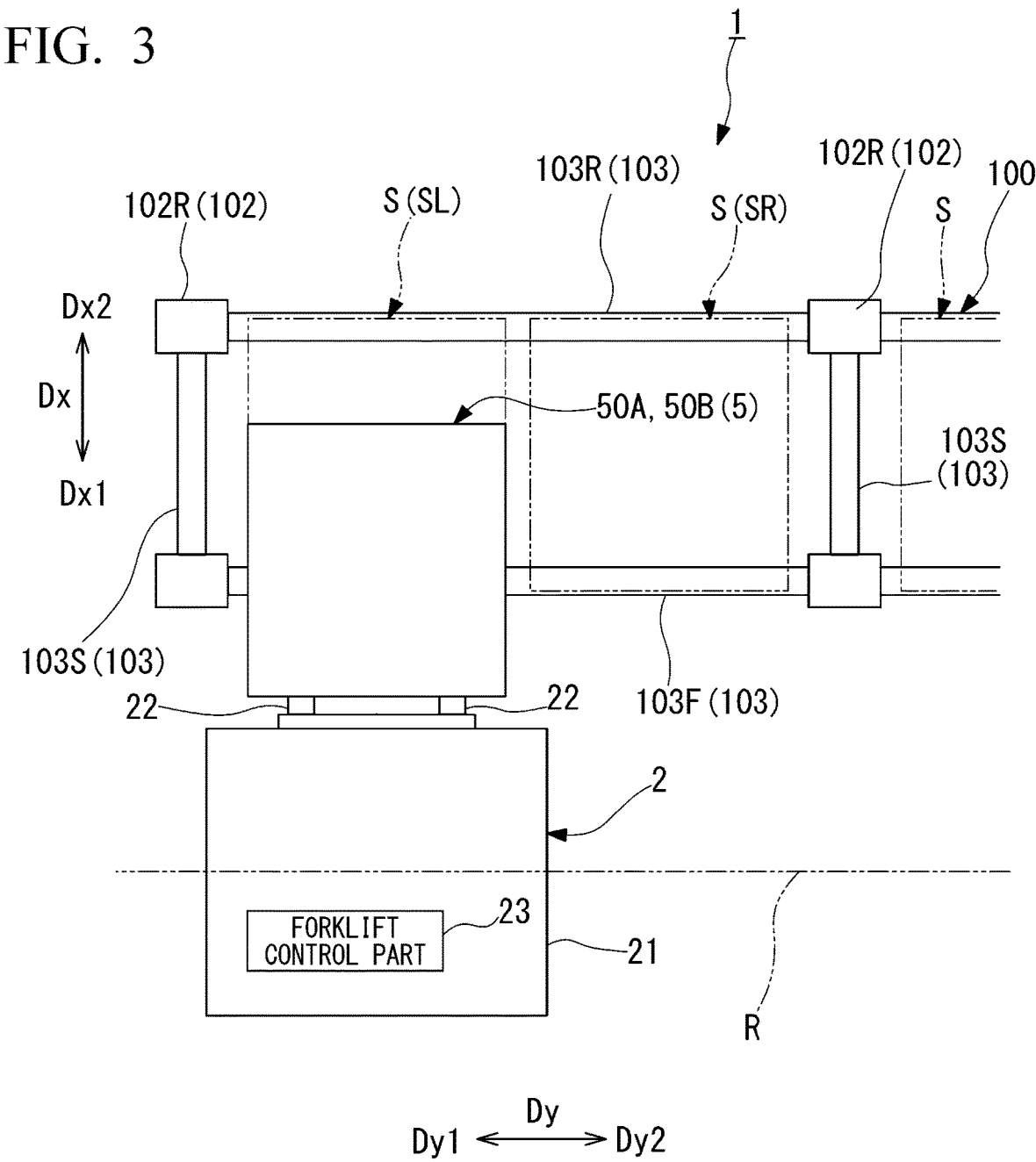
FIG. 3 is a plan view of the rack equipment.

In such a facility, rack structures 100 on which the palette 5 loaded with articles, parts, goods, freights, and the like can be placed are provided. The plurality of rack structures 100 are disposed along the route R of the unmanned forklift 2. As shown in FIG. 2, the rack structures 100 are configured, for example, in multiple vertical layers. As shown in FIG. 2 and FIG. 3, the rack structures 100 include a plurality of columns 102 provided on a floor surface F, and beam members 103 that bridge the neighboring columns 102. The columns 102 and the beam members 103 are formed of, for example, steel frames.

The plurality of columns 102 are disposed at a predetermined interval in a direction in which the route R extends in a horizontal plane (hereinafter, this direction is referred to as a second direction Dy). The plurality of columns 102 include front columns 102F and rear columns 102R that are disposed to form pairs at an interval in a first direction Dx perpendicular to the second direction Dy in which the route R extends in the horizontal plane. The front columns 102F are disposed on a first side Dx1 close to the route R in the first direction Dx. The rear columns 102R are disposed on a second side Dx2 away from the route R in the first direction Dx.

In the embodiment, the beam members 103 are disposed, for example, in multiple layers at an interval in an upward/downward direction Dv of the rack structures 100. The beam members 103 include front beam members 103F, rear beam members 103R, and side beam members 103S. The front beam member 103F extends in the second direction Dy and connects the neighboring front columns 102F. The rear beam member 103R extends in the second direction Dy and connects the neighboring rear columns 102R. The side beam members 103S extend in the first direction Dx and connect the front beam member 103F and the rear beam member 103R, which are close to each other. In an upper layer portion 100t of the rack structures 100, each of the columns 102 extends above the front beam member 103F, the rear beam member 103R, and the side beam members 103S.

The rack structures 100 include a plurality of palette placing parts S. Each of the palette placing parts S can be loaded with the palette 5. The palette placing parts S are set on the beam members 103. In the embodiment, the palette placing parts S are disposed in three vertical layers of the upper layer portion 100t, a middle layer portion 100m, and a lower layer portion 100b of the rack structures 100 in the upward/downward direction Dv. In the palette placing parts S set on the upper layer portion 100t and the middle layer portion 100m of the rack structures 100 in the upward/downward direction Dv, the palette 5 is placed to cross upper surfaces of the front beam member 103F and the rear beam member 103R. An auxiliary beam (not shown) extending in the first direction Dx may be provided between the front beam member 103F and the rear beam member 103R. In the palette placing parts S set on the lower layer portion 100b of the rack structures 100 in the upward/downward direction Dv, the palette 5 is directly placed on the floor surface F. In the palette placing parts S set on the lower layer portion 100b of the rack structures 100, the floor surface F of the palette placing parts S functions as a part of the rack structures 100.

As shown in FIG. 3, in the embodiment, in each of the three vertical layers in the rack structures 100, the two palette placing parts S are set in parallel in the second direction Dy between the front columns 102F and the rear columns 102R, which neighbor in the second direction Dy. That is, in each of the upper layer portion 100t, the middle layer portion 100m and the lower layer portion 100b of the rack structures 100, the palette placing part SL on a first side Dy1 in the second direction Dy (a left side when seen from the side of the route R) and the palette placing part SR on a second side Dy2 in the second direction Dy (a right side when seen from the side of the route R) are disposed between the front columns 102F and the rear columns 102R, which neighbor in the second direction Dy.

(Configuration of Unmanned Forklift)

As shown in FIG. 2 and FIG. 3, the unmanned forklift 2 includes a forklift main body 21, a pair of forks 22, and a forklift control part 23.

The forklift main body 21 is configured to movable along the route R in the facility on the basis of the control of the forklift control part 23. The forklift main body 21 travels along the route R according to a guideless method that involves traveling while recognizing a position of the unmanned forklift 2 itself in the facility using a gyro or a laser, or a guided method that involves driving while laid along the route R.

The pair of forks 22 are provided on the forklift main body 21 to be capable of being raised and lowered in the upward/downward direction Dv. The pair of forks 22 can be inserted into fork insertion parts (not shown) formed in the palette 5. The unmanned forklift 2 holds the palette 5 on the pair of forks 22 by raising the pair of forks 22 in a state in which the pair of forks 22 are inserted into the fork insertion parts (not shown) on the basis of the control of the forklift control part 23.

The forklift control part 23 controls an operation of the unmanned forklift 2 on the basis of a preset operation program. The forklift control part 23 enables transmission and reception of data between the forklift control part 23 and the system controller 3 via a wireless communication means such as wireless local area network (LAN) or the like. The forklift control part 23 receives an order including position information of the palette placing parts S that correspond to a loading position where the palette 5 is stacked on the forks 22 and an unloading position of the palette 5 loaded on the forks 22 from the system controller 3 via a wireless communication means. Here, the position information of the palette placing part S is coordinate information or the like that shows a position of the palette placing part S.

The forklift control part 23 moves the forklift main body 21 along the route R toward the palette placing part S that corresponds to the loading position or the unloading position based on the order received from the system controller 3. The forklift control part 23 operates the forks 22 on the palette placing part S that corresponds to the loading position or the unloading position, and performs loading of the palette 5 onto the forks 22 or unloading the palette 5 onto the palette placing part S. The unmanned forklift 2 advances and retreats in a direction crossing an extension direction of the route R in a horizontal plane (the first direction Dx) with respect to the rack structure 100 when loading or unloading is performed with respect to the palette placing part S.

(Configuration of Adjustment System of Unmanned Forklift)

Figure 4:
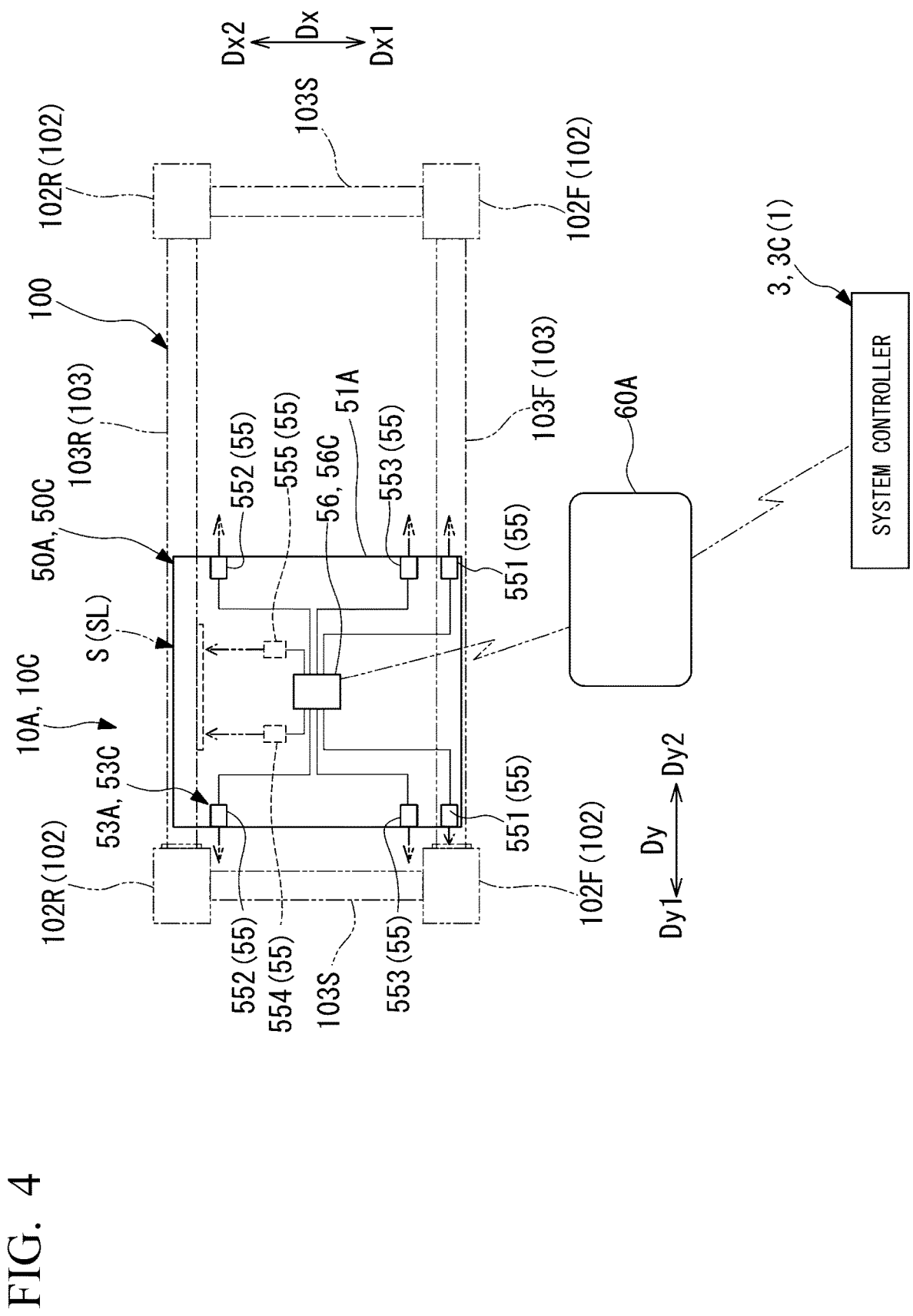
FIG. 4 is a plan view showing a configuration of an adjustment system of an unmanned forklift according to a first embodiment of the present disclosure.

The adjustment system 10A of the unmanned forklift shown in FIG. 4 is applied when the unmanned forklift 2 and the automated guided forklift system 1 are introduced in a new facility. The adjustment system 10A of the unmanned forklift includes a palette for adjustment 50A and a processing terminal 60A.

(Configuration of Palette for Adjustment)

Figure 5:
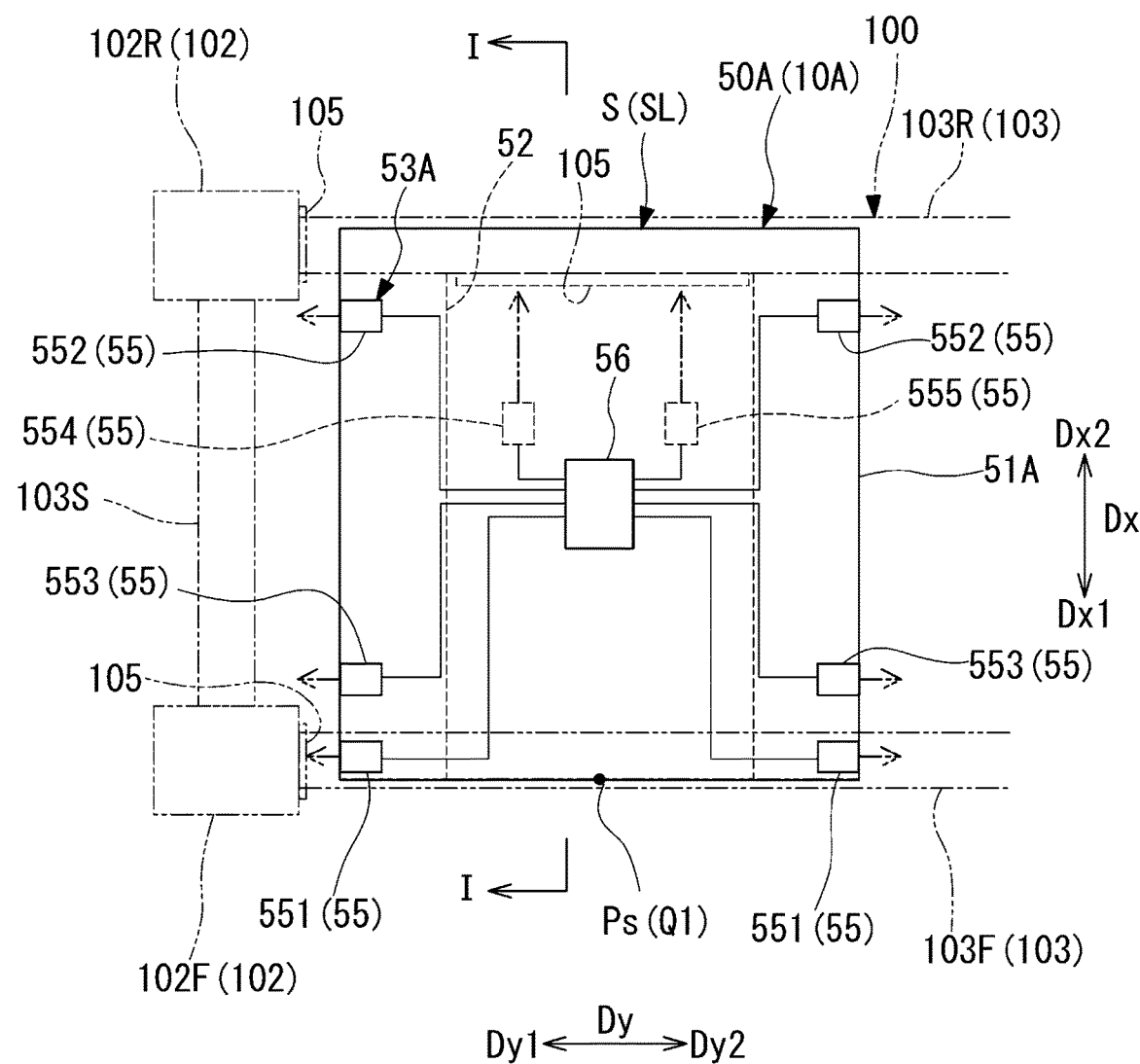
FIG. 5 is a plan view showing the palette for adjustment that constitutes the adjustment system of the unmanned forklift.
Figure 6:
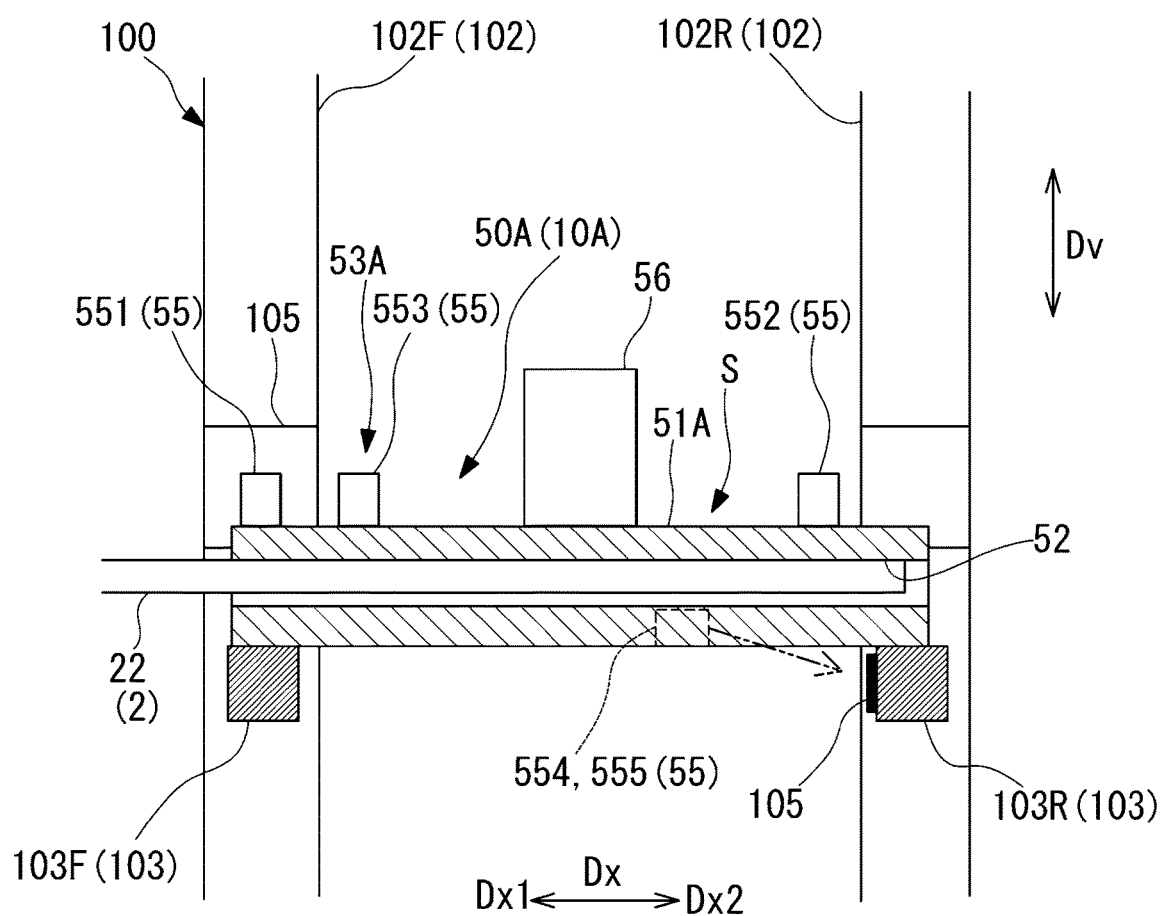
FIG. 6 is a cross-sectional view along an arrow I-I of FIG. 5.

As shown in FIG. 4 to FIG. 6, the palette for adjustment 50A includes a palette main body 51A and a position information acquisition part 53A. The palette for adjustment 50A is preferably formed to resemble the palette 5 with luggage that is actually placed on the palette placing part S of the rack structure 100, and to have a weight of, for example, 1 t (ton). The forklift main body 21 of the unmanned forklift 2 may flexurally deform forward due to its load when the forks 22 are raised in a state in which the palette 5 with the luggage is held. That is, in the unmanned forklift 2, when the palette 5 is placed on the palette placing part S in different layers of the rack structures 100 in the upward/downward direction Dv, due to an influence of the flexural deformation of the forklift main body 21, the position of the palette 5 with respect to the rack structure 100 may differ in the first direction Dx. Here, it is preferable to perform preconditioning of the unmanned forklift 2, which will be described below, by setting the palette for adjustment 50A to the same weight as the palette 5 that is actually used in consideration of the flexural deformation of the forklift main body 21.

The palette main body 51A having a rectangular shape when seen in a plan view and the same size as the palette when seen in a plan view is used in the automated guided forklift system 1. In addition, the palette main body 51A may have a size smaller than that of the palette when seen in a plan view used in the automated guided forklift system 1. For example, the palette main body 51A may shorten the size in the second direction Dy in order to avoid a contact collision between the front column 102F and the rear column 102R due to the shift in the second direction Dy. The palette main body 51A has an insertion hole 52 into which the forks 22 of the unmanned forklift 2 are inserted. Accordingly, the palette main body 51A is configured so that it can be supported by the forks 22 of the unmanned forklift 2. The palette main body 51A can be placed on the palette placing part S of the rack structure 100.

The position information acquisition part 53A is provided on the palette main body 51A. The position information acquisition part 53A acquires relative position information between the palette for adjustment 50A and the rack structure 100 in a state in which the palette for adjustment 50A is placed on the palette placing part S. In the embodiment, the position information acquisition part 53A includes a laser displacement gauge 55 and a data transmission part 56.

The laser displacement gauge 55 measures the distance from the rack structure 100 by radiating a laser to a part of the rack structure 100. A reflection part 105 configured to reflect a laser emitted from the laser displacement gauge 55 is set on each of the palette placing parts S on the side of the rack structure 100. The reflection part 105 is set on, for example, parts of surfaces of the front columns 102F and the rear columns 102R. When the laser emitted from the laser displacement gauge 55 is radiated to the surfaces of the front columns 102F and the rear columns 102R, the laser is reflected by the surfaces of the front columns 102F and the rear columns 102R toward the laser displacement gauge 55. In this case, the surfaces of the front columns 102F and the rear columns 102R function as the reflection part 105 by reflecting the laser emitted from the laser displacement gauge 55. That is, a part of the rack structures 100 is used as the reflection part 105 without separately installing a reflection object that functions as the reflection part 105 on the side of the rack structures 100. In addition, as the reflection part 105, a reflector formed of a material that reflects a laser may be attached to a predetermined position of the rack structures 100, for example, by a magnet or the like when initial setting of the unmanned forklift 2 is performed.

In the embodiment, the laser displacement gauge 55 includes a first laser displacement gauge 551, a second laser displacement gauge 552, an intermediate laser displacement gauge 553, and third laser displacement gauges 554 and 555. The first laser displacement gauge 551, the second laser displacement gauge 552, and the intermediate laser displacement gauge 553 are disposed on both sides of the palette main body 51A in the second direction Dy.

The first laser displacement gauge 551 is disposed on a first side (a side close to the route R) of the unmanned forklift 2 in an advance/retreat direction (the first direction Dx) with respect to the rack structures 100 in the palette main body 51A. The second laser displacement gauge 552 is disposed on the second side Dx2 (a side away from the route R) of the palette main body 51A in the first direction Dx. The intermediate laser displacement gauge 553 is disposed between the first laser displacement gauge 551 and the second laser displacement gauge 552 in the palette main body 51A. The intermediate laser displacement gauge 553 is disposed at a position further deviated toward the first laser displacement gauge 551 than the second laser displacement gauge 552 in the first direction Dx.

Each of the first laser displacement gauge 551, the second laser displacement gauge 552, and the intermediate laser displacement gauge 553 detects a part of the rack structures 100 located in the second direction Dy with respect to the palette main body 51A. The first laser displacement gauge 551, the second laser displacement gauge 552, and the intermediate laser displacement gauge 553 detect a laser reflected by the reflection part 105 provided on the columns 102 (the front columns 102F and the rear columns 102R), which are parts of the rack structures 100. Each of the first laser displacement gauge 551, the second laser displacement gauge 552, and the intermediate laser displacement gauge 553 detects a distance to the reflection part 105 when a laser reflected by the reflection part 105 is detected. In the embodiment, the reflection part 105 is disposed on, for example, the front columns 102F, the rear columns 102R, and the rear beam member 103R. The reflection part 105 is disposed on side surfaces of the front columns 102F and the rear columns 102R directed toward the palette placing part S in the second direction Dy.

The first laser displacement gauge 551, the second laser displacement gauge 552, and the intermediate laser displacement gauge 553 detect the front columns 102F located at a side in the second direction Dy and the reflection part 105 disposed on the rear columns 102R in a state in which the palette for adjustment 50A is mounted on the palette placing part S by the unmanned forklift 2.

Figure 7:
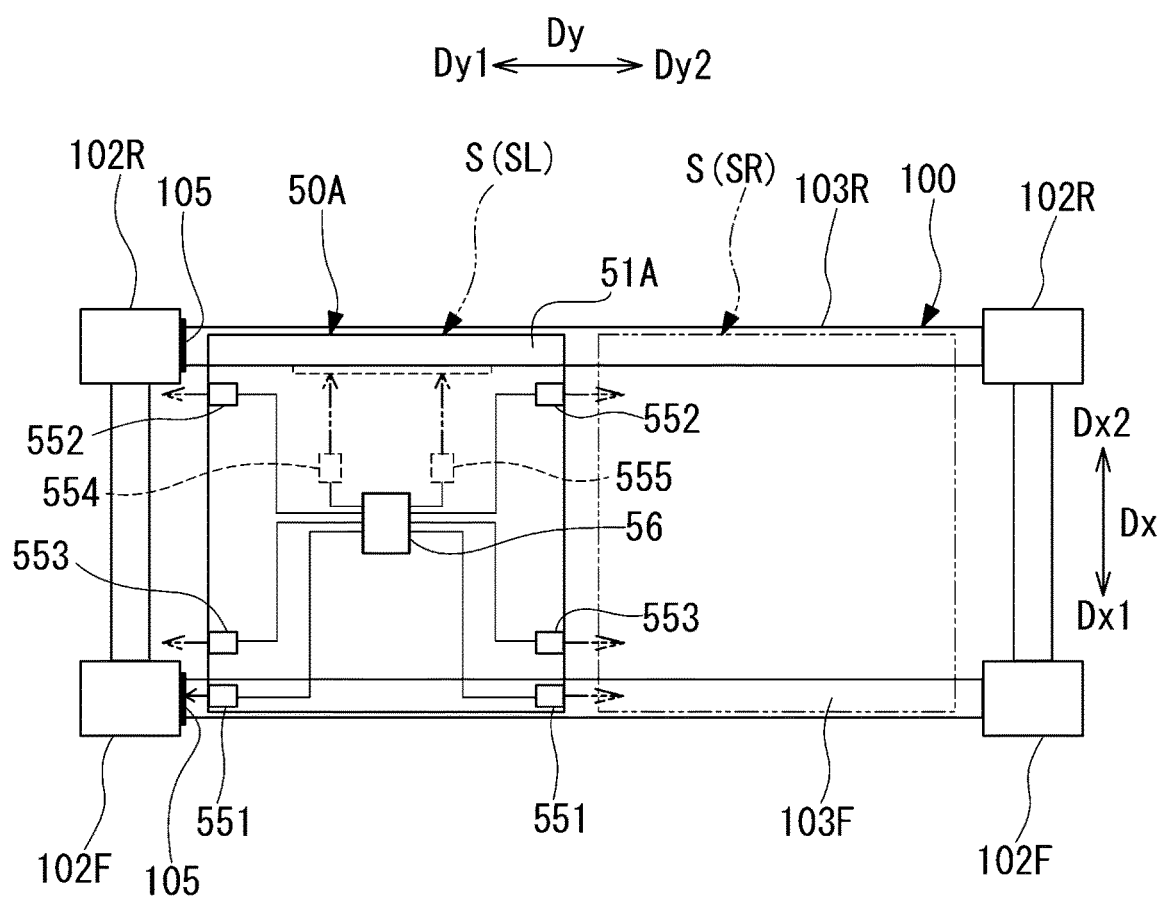
FIG. 7 is a plan view showing detection of a laser performed by a first laser displacement gauge when the palette for adjustment is in a state in which a position shift is little in a first direction.

For example, as shown in FIG. 7, when a position shift of the palette for adjustment 50A with respect to the palette placing part S in the first direction Dx is small, only the first laser displacement gauge 551 detects the reflection part 105 of the front columns 102F, and in the second laser displacement gauge 552 and the intermediate laser displacement gauge 553, the laser passes through the front columns 102F and the rear columns 102R without hitting them.

Figure 8:
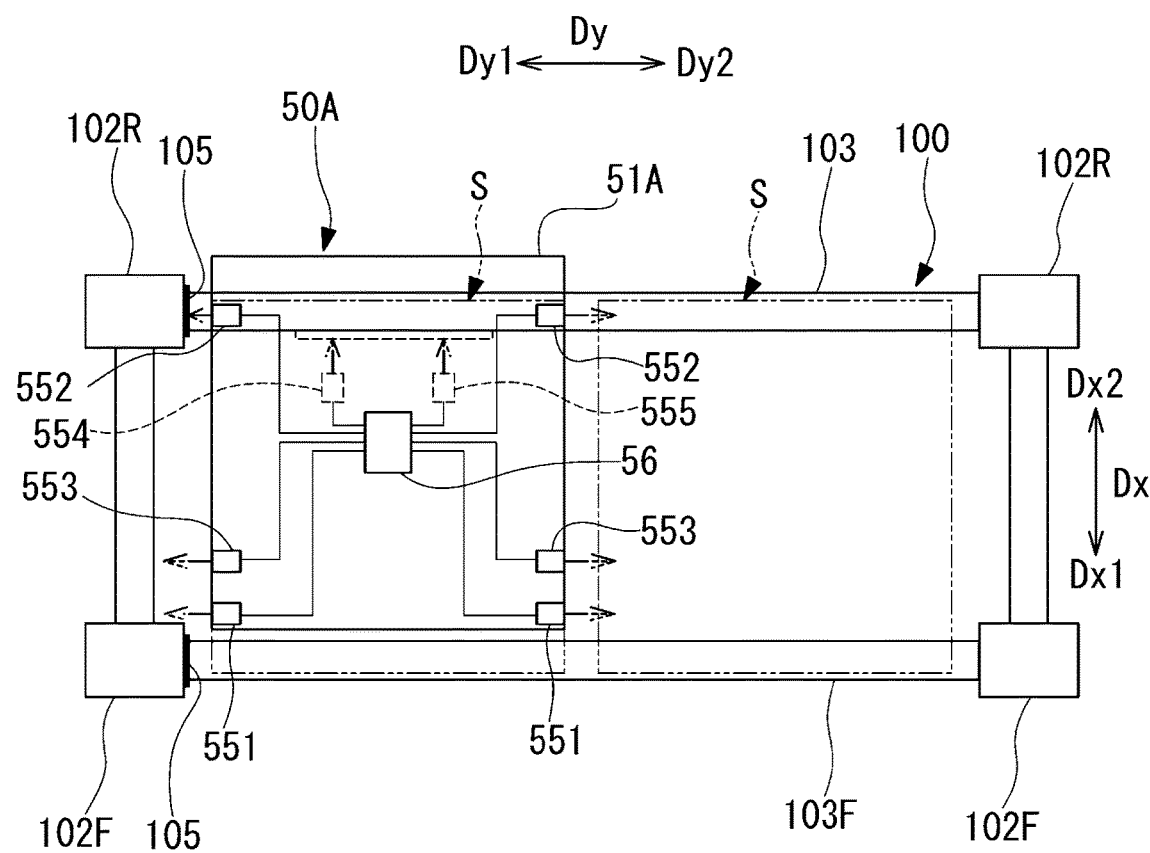
FIG. 8 is a plan view showing detection of a laser performed by a second laser displacement gauge in a state in which a position of the palette for adjustment is largely shifted toward a second side in the first direction.

For example, as shown in FIG. 8, when a position of the palette for adjustment 50A is largely shifted to the second side Dx2 (a side away from the route R) in the first direction Dx with respect to the palette placing part S, only the second laser displacement gauge 552 detects the reflection part 105 of the rear columns 102R, and in the first laser displacement gauge 551 and the intermediate laser displacement gauge 553, the laser passes through the front columns 102F without hitting them.

Figure 9:
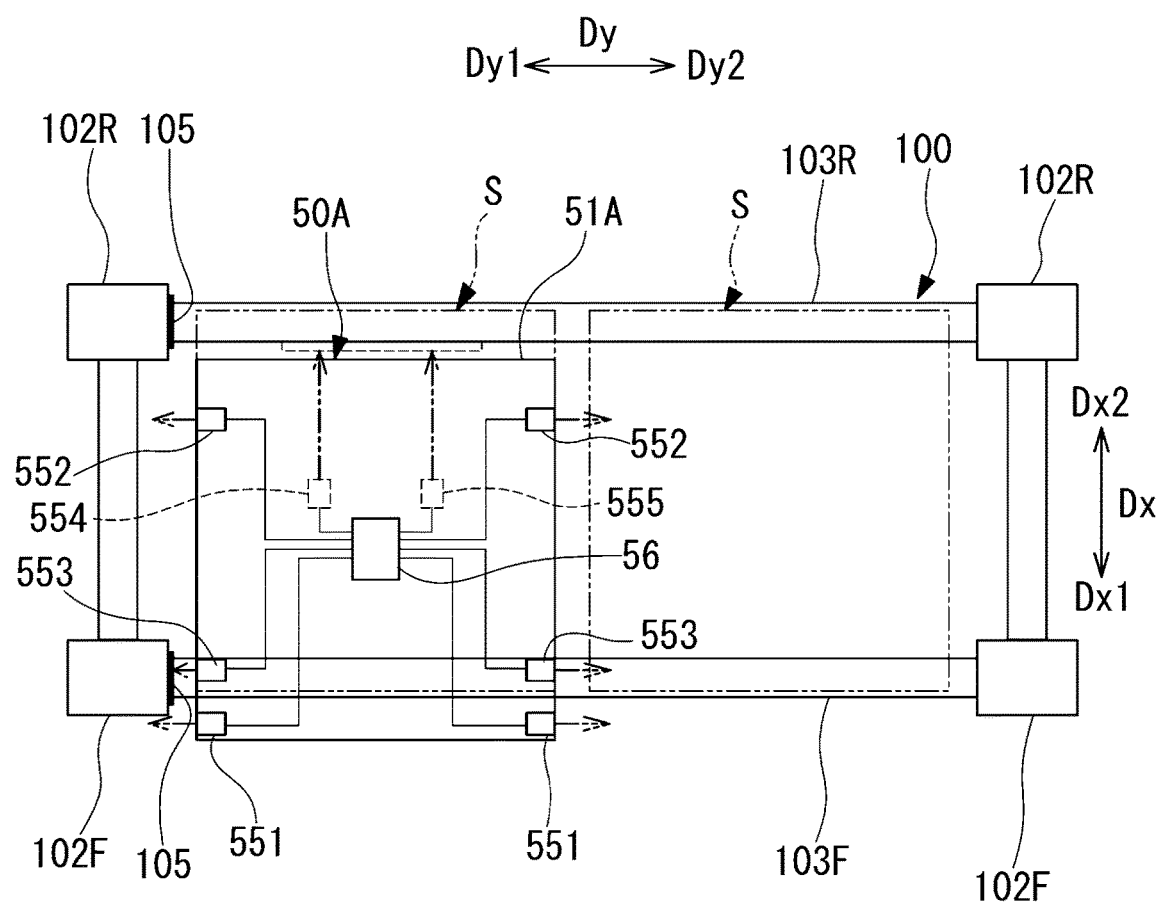
FIG. 9 is a plan view showing detection of a laser performed by an intermediate laser displacement gauge in a state in which a position of the palette for adjustment is largely shifted toward a first side in the first direction.

For example, as shown in FIG. 9, when a position of the palette for adjustment 50A is largely shifted to the first side Dx1 (the side of the route R) in the first direction Dx with respect to the palette placing part S, only the intermediate laser displacement gauge 553 detects the reflection part 105 of the front columns 102F, and in the first laser displacement gauge 551 and the second laser displacement gauge 552, the laser passes through the front columns 102F and the rear columns 102R without hitting them.

Figure 10:
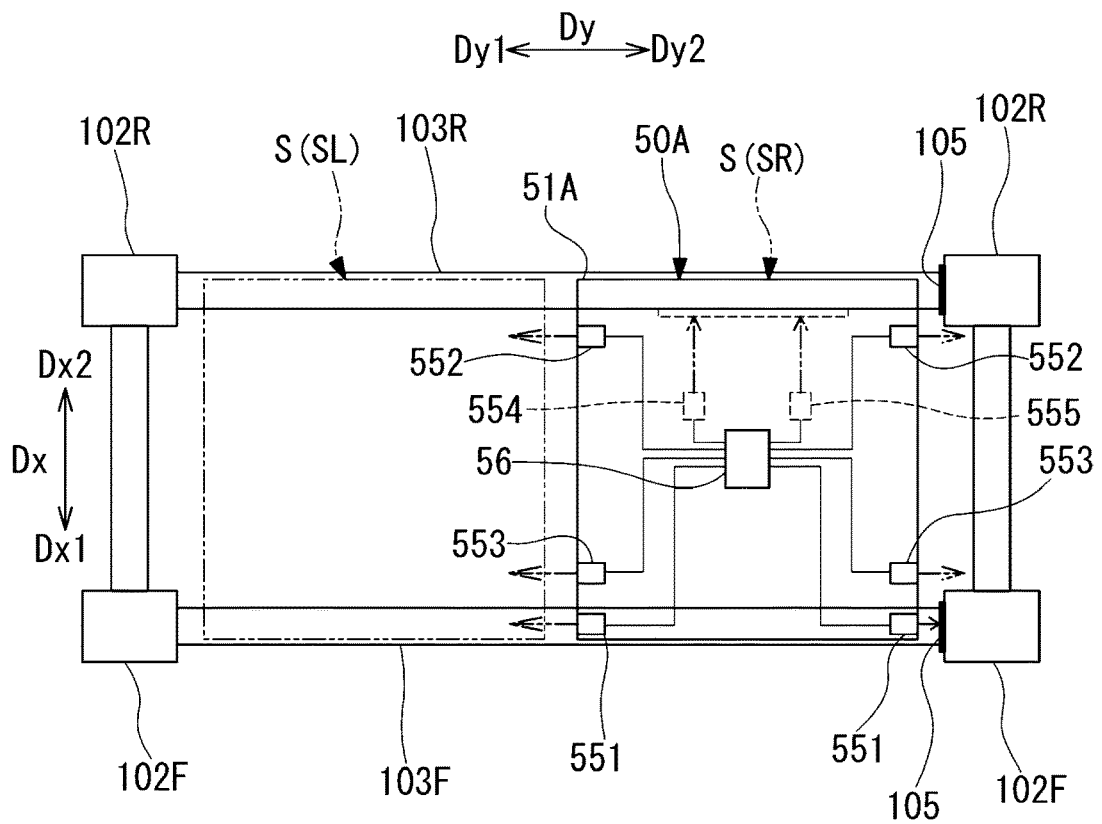
FIG. 10 is a plan view showing a state in which the palette for adjustment is located at a position opposite to FIG. 7 in the second direction.

Each of the first laser displacement gauge 551, the second laser displacement gauge 552, and the intermediate laser displacement gauge 553 can detect only whether the rack structure 100 is within the range of a previously determined distance. As shown in FIG. 7, when the palette for adjustment 50A is mounted on the palette placing part SL on the first side Dy1 (a left side seen from the side of the route R) in the second direction Dy between the front columns 102F and the rear columns 102R neighboring in the second direction Dy, the laser reflected by the reflection part 105 is received by only the first laser displacement gauge 551, the second laser displacement gauge 552, and the intermediate laser displacement gauge 553 disposed on the first side Dy1 in the second direction Dy. As shown in FIG. 10, when the palette for adjustment 50A is mounted on the palette placing part SR on the second side Dy2 (a left side seen from the side of the route R) in the second direction Dy between the front columns 102F and the rear columns 102R neighboring in the second direction Dy, the laser reflected by the reflection part 105 is received only by the first laser displacement gauge 551, the second laser displacement gauge 552, and the intermediate laser displacement gauge 553 disposed on the second side Dy2 in the second direction Dy.

As shown in FIG. 5 and FIG. 6, the third laser displacement gauges 554 and 555 emit lasers diagonally downward toward the second side Dx2 in the first direction Dx in an advance/retreat direction of the unmanned forklift 2 with respect to the rack structures 100. The third laser displacement gauges 554 and 555 are disposed on, for example, a bottom portion of the palette main body 51A. However, depending on the shape and size of the product, the product may be installed at a position that does not interfere with the forks 22, for example, an upper portion of the palette. The third laser displacement gauges 554 and 555 are disposed at an interval in the second direction Dy. Each of the third laser displacement gauges 554 and 555 detects a distance to the reflection part 105 when the laser emitted diagonally downward toward the second side Dx2 in the first direction Dx is reflected by the reflection part 105 mounted on the rear beam member 103R to be directed toward the first side Dx1 in the first direction Dx.

The data transmission part 56 outputs data showing the distances detected by the laser displacement gauges 55 (the first laser displacement gauge 551, the second laser displacement gauge 552, the intermediate laser displacement gauge 553, and the third laser displacement gauges 554 and 555) as relative position information between the palette for adjustment 50A and the rack structures 100. As shown in FIG. 4, the data transmission part 56 transmits the relative position information to the processing terminal 60A via wireless communication such as a wireless LAN or the like.

(Configuration of Processing Terminal)

The processing terminal 60A executes processing of calculating the shift amount of the palette for adjustment 50A with respect to the palette placing part S based on the relative position information transmitted from the palette for adjustment 50A. For example, as shown in FIG. 5, the processing terminal 60A calculates the shift amount between a palette-side reference position Ps set on the palette for adjustment 50A and a rack-side reference position Q1 set on the side of the palette placing part S. In the embodiment, for example, the palette-side reference position Ps is set on a central position in the second direction Dy in an end surface of the palette main body 51A on the first side Dx1 in the first direction Dx. In the embodiment, the rack-side reference position Q1 is set on a central position in the second direction Dy in an end portion on the first side Dx1 in the first direction Dx in each of the palette placing parts S. Further, in FIG. 5, the palette for adjustment 50A has no position shift to the palette placing part S, and the palette-side reference position Ps and the rack-side reference position Q1 are matched.

(Hardware Configuration View)

Figure 11:
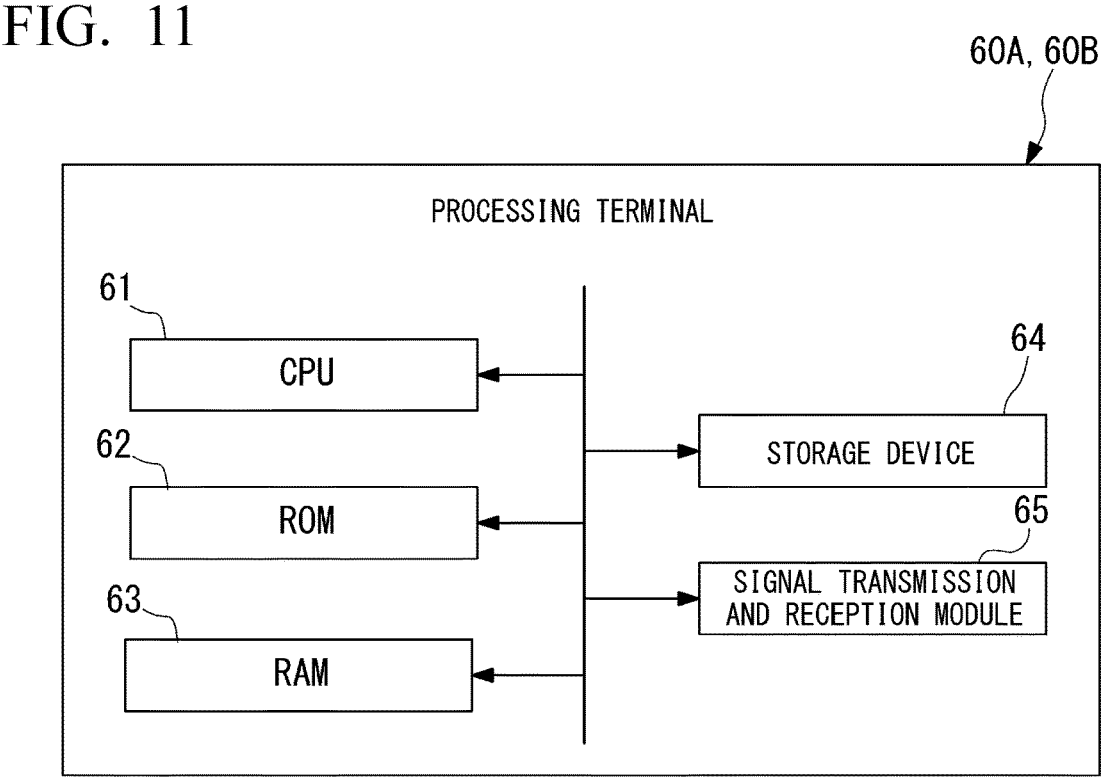
FIG. 11 is a view showing a hardware configuration of a processing terminal that constitutes the adjustment system of the unmanned forklift.

As shown in FIG. 11, the processing terminal 60A is a computer including a central processing unit (CPU) 61, a storage device 64 such as a read only memory (ROM) 62, a random access memory (RAM) 63, a hard disk drive (HDD), a solid state drive (SSD), and the like, and a signal transmission and reception module 65. The processing terminal 60A is a computer terminal having portability such as a tablet terminal, a smart phone, a notebook type personal computer, or the like.

(Functional Block Diagram)

Figure 12:
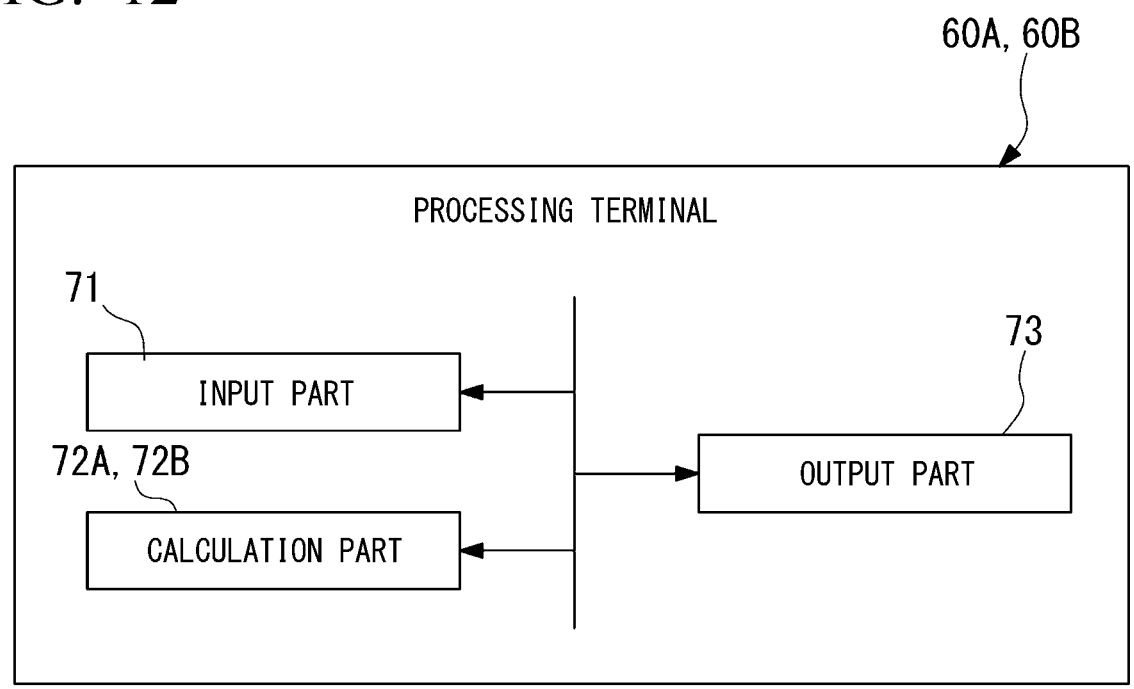
FIG. 12 is a functional block diagram of the processing terminal.

As shown in FIG. 12, the CPU 61 of the processing terminal 60A includes configurations of an input part 71, a calculation part 72A, and an output part 73 by executing a program stored in a host device in advance.

The input part 71 is the signal transmission and reception module 65 in terms of hardware, and receives data from the palette for adjustment 50A. The calculation part 72A executes processing of calculating the shift amount of the palette for adjustment 50A with respect to the palette placing part S based on the relative position information. The output part 73 is the signal transmission and reception module 65 in terms of hardware, and the calculated shift amount is transmitted to the system controller 3 via wireless communication such as a wireless LAN or the like.

(Procedure of Initial Setting Method of Unmanned Forklift)

Figure 13:
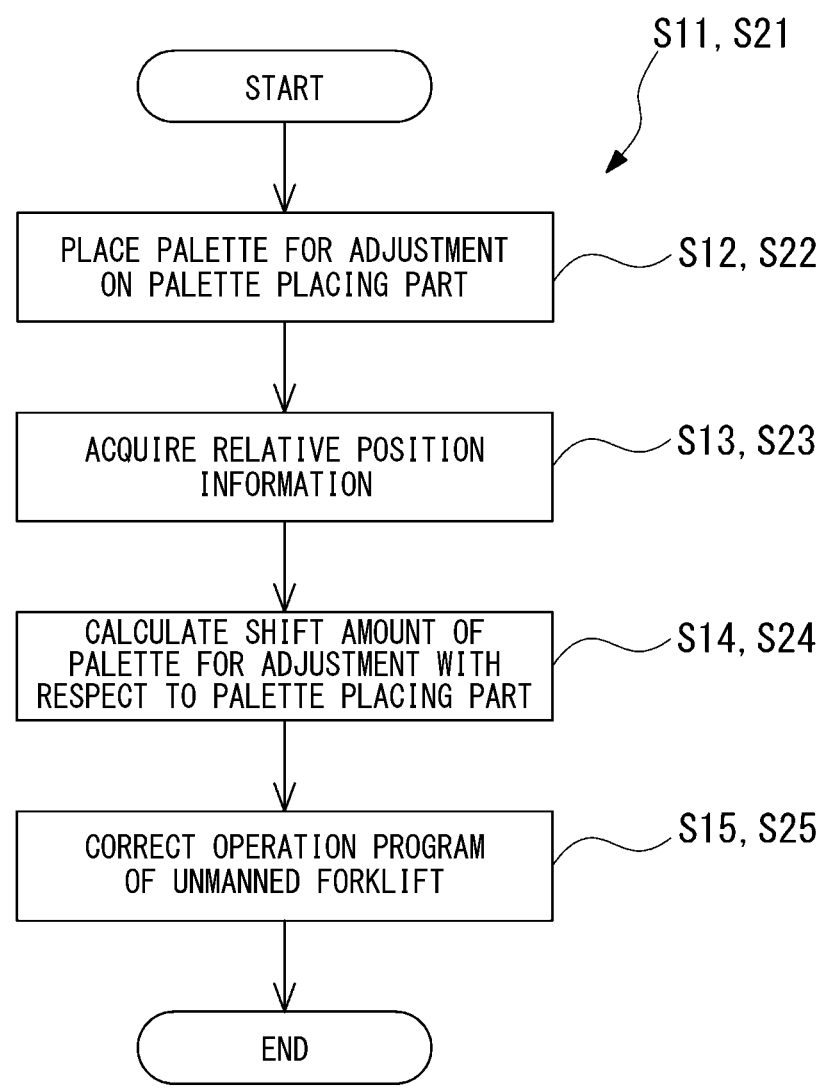
FIG. 13 is a flowchart showing a procedure of the initial setting method of the unmanned forklift according to the embodiment of the present disclosure.

As shown in FIG. 13, an initial setting method S11 of the unmanned forklift 2 according to the embodiment of the present disclosure includes step S12 of placing the palette for adjustment 50A on the palette placing part S, step S13 of acquiring relative position information, step S14 of calculating the shift amount of the palette for adjustment 50A with respect to the palette placing part S, and step S15 of correcting an operation program of the unmanned forklift.

Figure 14:
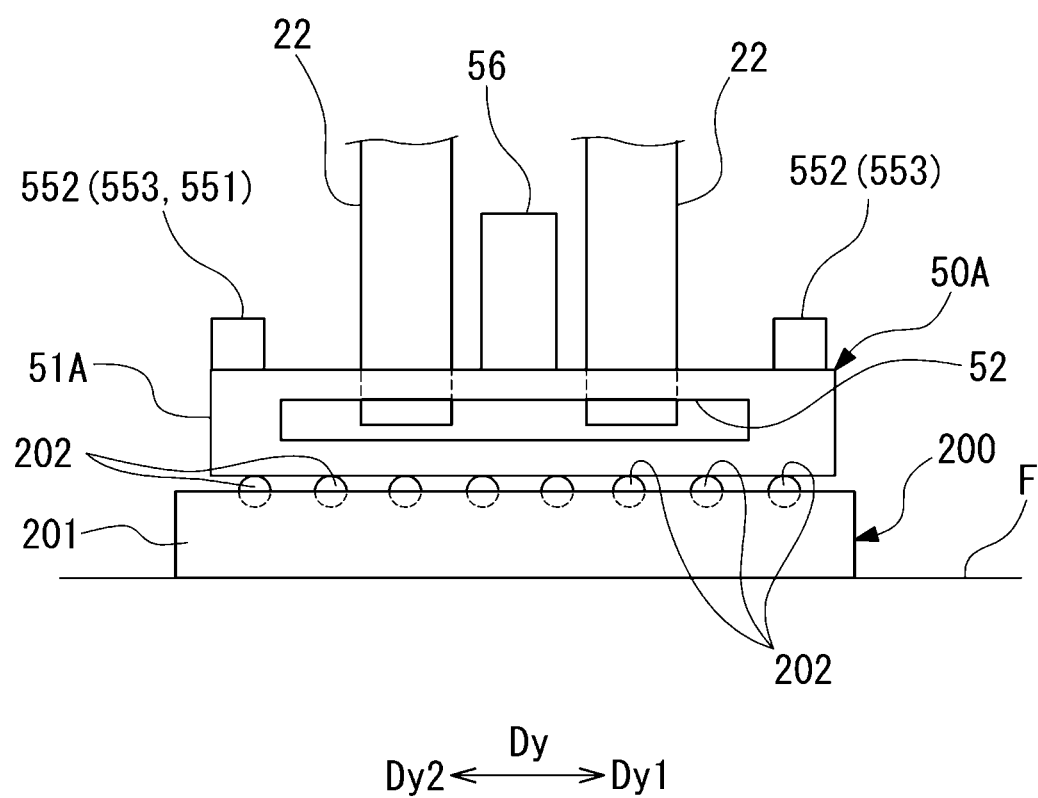
FIG. 14 is a view showing a configuration of a palette position adjusting stand using the adjustment system of the unmanned forklift according to the first embodiment of the present disclosure.

When the initial setting method S11 of the unmanned forklift 2 is executed, prior to step S12 of placing the palette for adjustment 50A on the palette placing part S, the pair of forks 22 of the unmanned forklift 2 are inserted into the insertion hole 52 of the palette for adjustment 50A, and supports the palette for adjustment 50A. Here, it is preferable to make the position shift of the palette for adjustment 50A with respect to the pair of forks 22 as small as possible. For this reason, as shown in FIG. 14, it is preferable to insert the pair of forks 22 into the insertion hole 52 of the palette for adjustment 50A in a state in which the palette for adjustment 50A is placed on a palette position adjusting stand 200.

The palette position adjusting stand 200 includes an adjusting table main body 201, and a plurality of spherical rollers 202. The adjusting table main body 201 is installed on the floor surface F. The plurality of spherical rollers 202 are disposed on an upper surface of the adjusting table main body 201. Each of the spherical rollers 202 is a ball of a so-called ball bearing, and rotatably supported by the adjusting table main body 201. The pair of forks 22 are inserted into the insertion hole 52 of the palette for adjustment 50A in a state in which the palette for adjustment 50A is placed on the plurality of spherical rollers 202 of the palette position adjusting stand 200. Here, a position of the palette for adjustment 50A is adjusted on the plurality of spherical rollers 202 such that a center of the palette for adjustment 50A matches a center of the pair of forks 22 in the second direction Dy. Even when the palette for adjustment 50A has a weight of about 1 t as described above, the plurality of spherical rollers 202 make it possible to manually adjust the position in the horizontal direction.

In step S12 of placing the palette for adjustment 50A on the palette placing part S, the palette for adjustment 50A is placed on the palette placing part S of an object that performs initial setting in the plurality of palette placing parts S set on the plurality of rack structures 100 in the facility by the unmanned forklift 2 operated on the basis of the preset operation program. For this, according to the order from the system controller 3, position coordinates of the palette placing part S is transmitted to the unmanned forklift 2 as a destination. The unmanned forklift 2 moves toward the palette placing part S of the destination along the route R in a state in which the palette for adjustment 50A is placed on the forks 22. The unmanned forklift 2 changes an orientation of the forklift main body 21 to face the palette placing part S after arrival at the palette placing part S of the destination. Then, the unmanned forklift 2 raises and lowers the forks 22 and matches the palette for adjustment 50A placed on the forks 22 with a height of the palette placing part S of the destination. The unmanned forklift 2 advances toward the second side from the first side Dx1 (the side of the route R) in the first direction Dx, and places the loaded palette for adjustment 50A on the palette placing part S at position coordinates of the palette placing part S of the destination.

Figure 15:
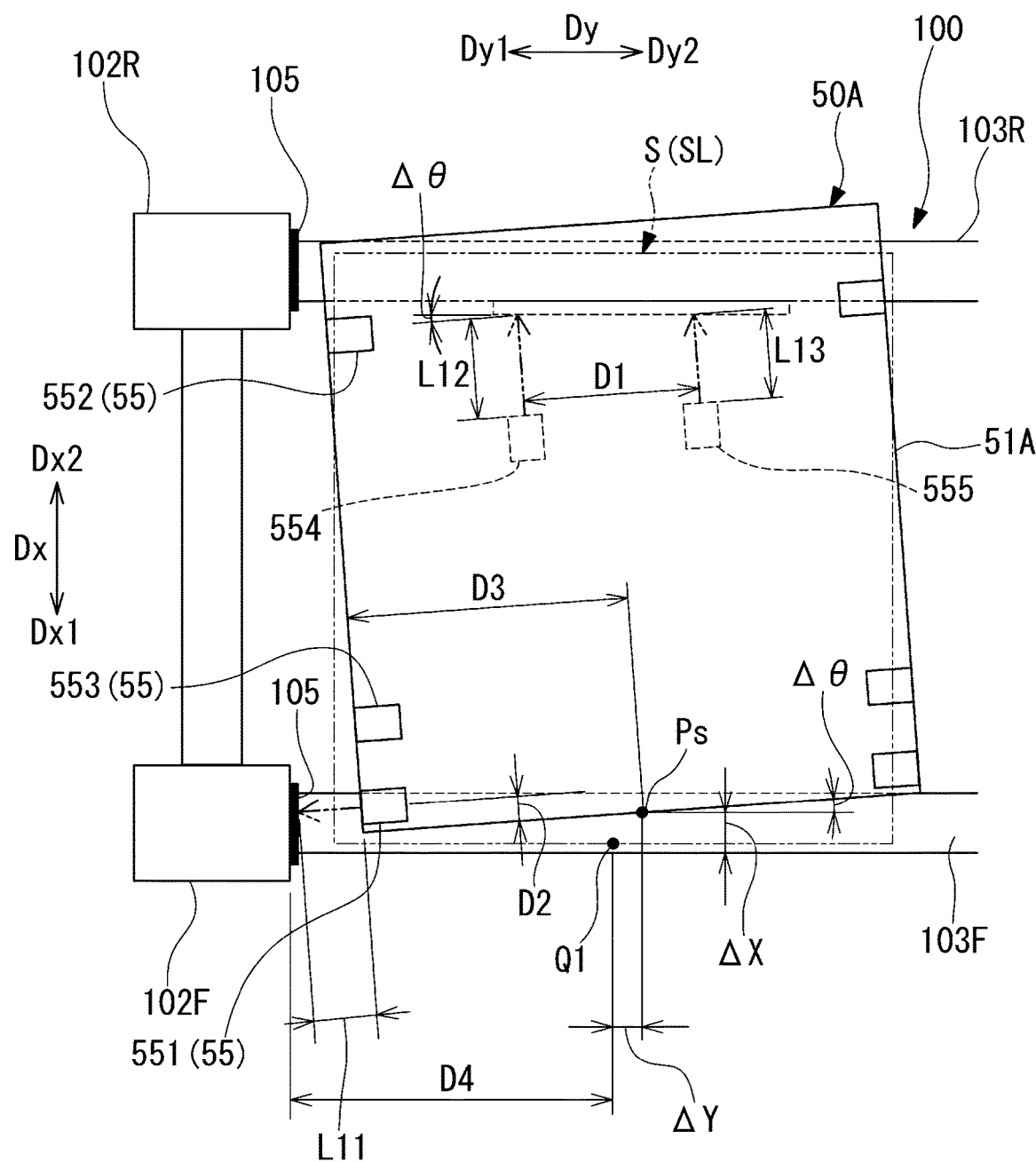
FIG. 15 is a plan view showing a state in which a distance to a part of a rack structure is measured by a laser displacement gauge in order to acquire relative position information.

In step S13 of acquiring the relative position information, relative position information between the loaded palette for adjustment 50A and the rack structure 100 is acquired by the plurality of laser displacement gauges 55 of the position information acquisition part 53A. First, as shown in FIG. 15, a distance L11 to the reflection part 105 provided on the front column 102F is detected by the first laser displacement gauge 551. Further, when reflection from the reflection part 105 cannot be detected by the first laser displacement gauge 551, a distance to the reflection part 105 disposed on the rear column 102R or the front column 102F may be detected by the second laser displacement gauge 552 or the intermediate laser displacement gauge 553 by detecting the reflection from the reflection part 105.

In addition, in step S13, distances L12 and L13 to the reflection part 105 provided on the rear beam member 103R are detected by the third laser displacement gauges 554 and 555. In step S13, the distances L11, L12 and L13 to the rack structure 100 on which the palette for adjustment 50A is placed are measured by the position information acquisition part 53A as relative position information in a non-contact manner.

In step S13, data of the distances L11, L12 and L13 detected by the first laser displacement gauge 551 and the third laser displacement gauges 554 and 555 are transmitted to the processing terminal 60A by the data transmission part 56 as the relative position information. In the processing terminal 60A, data of the distances L11, L12 and L13 are received as the relative position information by the input part 71.

In step S14 of calculating the shift amount of the palette for adjustment 50A with respect to the palette placing part S, the calculation part 72A calculates the shift amount of the palette for adjustment 50A placed on the rack structure 100 with respect to the palette placing part S based on the relative position information acquired by the position information acquisition part 53A. In step S14, a shift amount ΔX in the first direction Dx, a shift amount ΔY in the second direction Dy, and a shift amount Δθ in a rotation direction Dc around a vertical axis are calculated as the shift amount of the rack-side reference position Q1 of the palette placing part S with respect to the palette-side reference position Ps of the palette for adjustment 50A.

In step S14, first, the shift amount Δθ of the palette for adjustment 50A in the rotation direction Dc is calculated by the following Equation (1) based on the distances L12 and L13 detected by the third laser displacement gauges 554 and 555.

$$\Delta\theta = \tan^{-1}(L12-L13)/D1 \quad (1)$$

Figure 16:
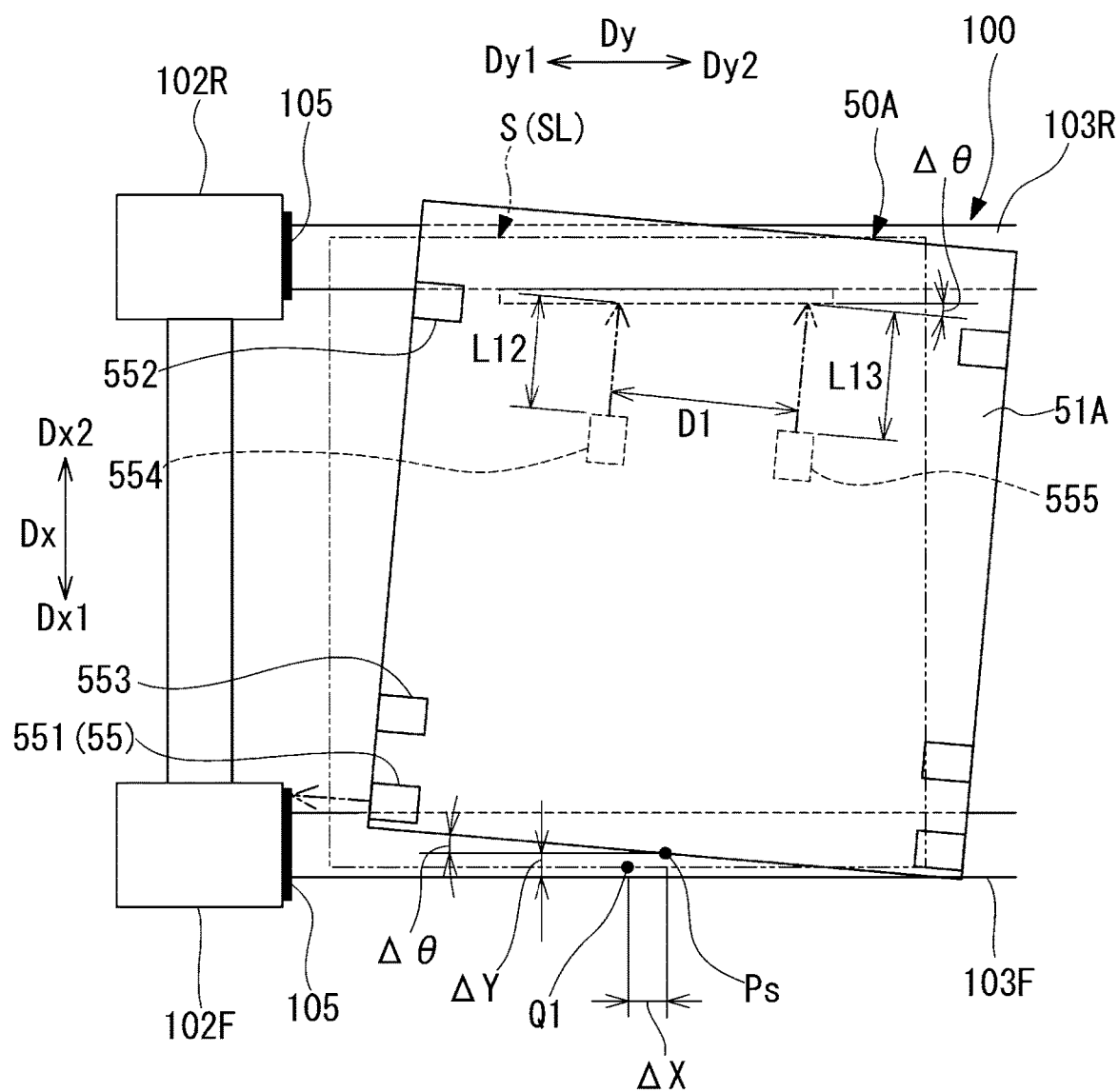
FIG. 16 is a plan view showing a state in which a distance to a part of the rack structure is measured by the laser displacement gauge in order to acquire relative position information when the palette for adjustment is inclined in a direction opposite to FIG. 15.

Here, D1 is an interval (already known) between the third laser displacement gauges 554 and 555 in the second direction Dy. Here, as shown in FIG. 16, when the distance L13 detected by the third laser displacement gauge 555 is greater than the distance L12 detected by the third laser displacement gauge 554, Δθ is a negative value.

In step S14, then, the shift amounts ΔY and ΔX of the palette-side reference position Ps of the palette for adjustment 50A with respect to the rack-side reference position Q1 are calculated based on the distance L11 detected by the first laser displacement gauge 551. As shown in FIG. 15 and FIG. 16, when the palette placing part S is the palette placing part SL located on the first side Dy1 in the second direction Dy, the shift amounts ΔY and ΔX are calculated by the following Equations (2) and (3).

$$\Delta Y = L11 \cdot \cos\Delta\theta + D3 \cdot \cos\Delta\theta - D2\sin(-\Delta\theta) - D4 \quad (2)$$

$$\Delta X = \{(L12-L12\_0) \cdot \cos\Delta\theta + (L13-L13\_0) \cdot \cos\Delta\theta\}/2 \quad (3)$$

Here, D2 is an interval (already known) between the first laser displacement gauge 551 and the palette-side reference position Ps in the second direction Dy. D3 is an interval (already known) between the first laser displacement gauge 551 and the palette-side reference position Ps in the first direction Dx. D4 is an interval (already known) between the front column 102F and the rack-side reference position Q1 in the second direction Dy. L12_0 and L13_0 are distances of the distances L12 and L13 when the palette for adjustment 50A (50B, 50C) has been unloaded onto the correct palette placing part S (SL, SR).

Figure 17:
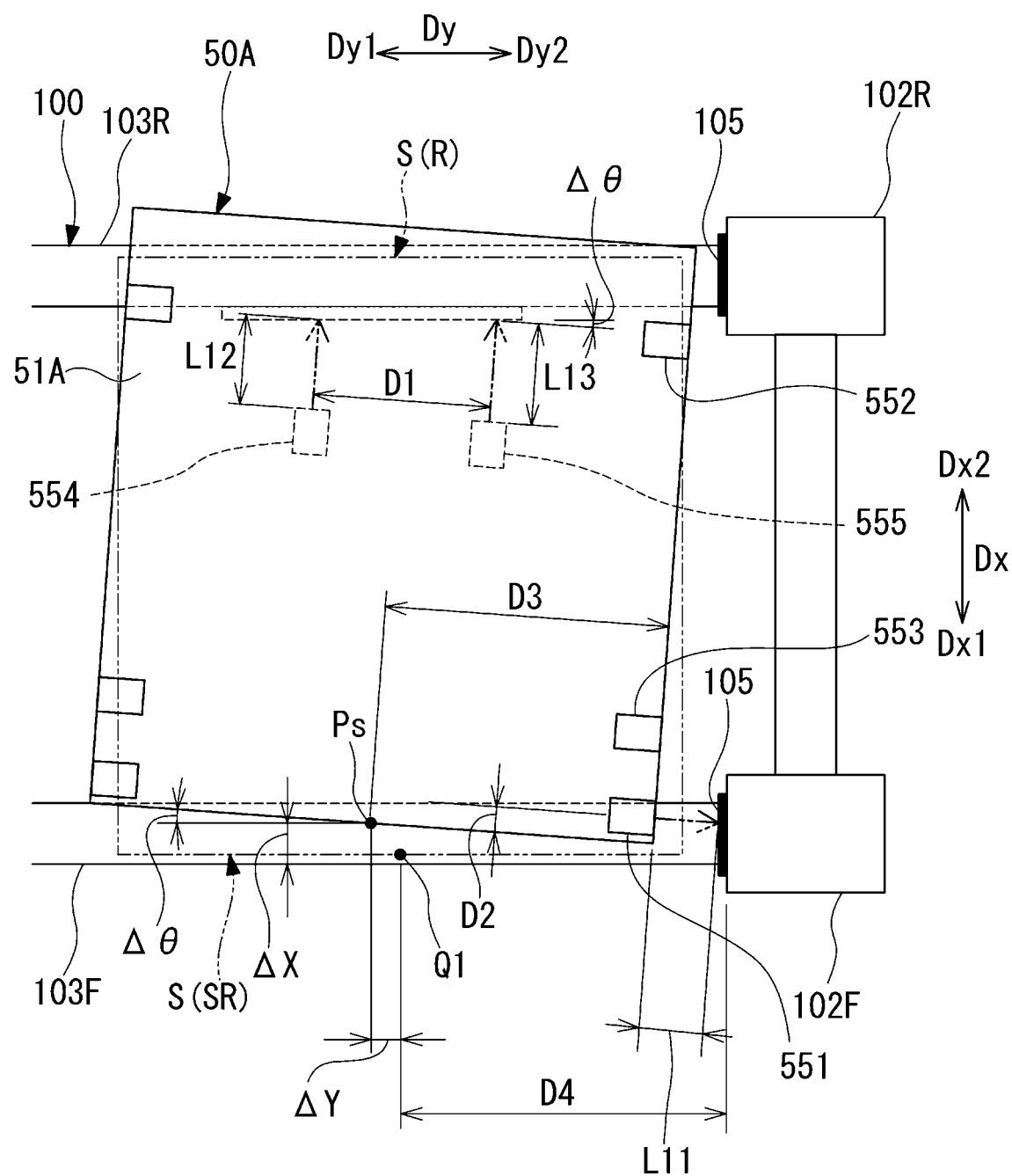
FIG. 17 is a plan view showing a state in which a distance to a part of the rack structure is measured by the laser displacement gauge in order to acquire relative position information when the palette for adjustment is placed on a palette placing part on a side opposite to FIG. 15 in the second direction.

In addition, as shown in FIG. 17, when the palette placing part S is the palette placing part SR located on the second side Dy2 in the second direction Dy, the shift amount ΔY is calculated by the following Equations (4) and (5).

$$\Delta Y = D4 - L11 \cdot \cos\Delta\theta - D3 \cdot \cos\Delta\theta + D2 \cdot \sin(\Delta\theta) \quad (4)$$

$$\Delta X = \{(L12-L12\_0) \cdot \cos\Delta\theta + (L13-L13\_0) \cdot \cos\Delta\theta\}/2 \quad (5)$$

Data of the calculated shift amount (ΔX, ΔY, Δθ) with respect to the palette placing part S of the palette for adjustment 50A are output to the system controller 3 by the output part 73 through wireless communication.

In step S15 of correcting an operation program of the unmanned forklift, the operation program of the unmanned forklift 2 is corrected based on the calculated shift amount. In step S15, data of the shift amount output from the processing terminal 60A are received by the system controller 3. Position coordinates of the palette placing part S in the operation program of the unmanned forklift 2 are corrected by the system controller 3 based on the data of the received shift amount. Here, in correction of the position coordinates of the palette placing part S in the operation program of the unmanned forklift 2, the program of the system controller 3 may be automatically performed, and an operator of the system controller 3 may manually input a numerical value or the like to correct the position coordinates of the palette placing part S. In addition, the numerical value where the shift amount is 0 may be input, and it is possible to store the shift amount separately and perform the operation by correcting the value during control.

The initial setting of all the palette placing parts S is performed by performing the series of processing of the above-mentioned steps S12 to S15 for all the palette placing parts S in the facility.

(Effects)

In the initial setting method S11 of the unmanned forklift 2 having the above-mentioned configuration, when the unmanned forklift 2 is introduced into the facility including the rack structure 100, the palette for adjustment 50A is actually placed on the palette placing part S of the rack structure 100 by the unmanned forklift 2. The relative position information between the palette for adjustment 50A and the rack structure 100 placed on the palette placing part S is acquired by the position information acquisition part 53A. The shift amount of the palette for adjustment 50A with respect to the palette placing part S is calculated based on the acquired relative position information. Accordingly, the shift amount in the case in which the palette 5 on which articles are loaded by the unmanned forklift 2 is placed on the palette placing part S of the rack structure 100 can be grasped. The initial setting when the unmanned forklift 2 is introduced into the facility can be easily performed by correcting the operation program of the unmanned forklift 2 on the basis of the grasped shift amount. In addition, since the position information acquisition part 53A is provided on the palette for adjustment 50A, in each of the plurality of palette placing parts S set on the rack structure 100, there is no need to provide a sensor or the like configured to detect the shift amount to the palette for adjustment 50A on the side of the rack structure 100. Accordingly, the introduction of the unmanned forklift 2 can be easily performed, and time and costs required for test traveling before the official operation can be suppressed.

In addition, the distance to the rack structure 100 is measured by the position information acquisition part 53A as the relative position information in a non-contact manner. Accordingly, the relative position information can be easily and rapidly acquired.

In addition, in the calculating step S14, the shift amount ΔX in the first direction Dx and the shift amount ΔY in the second direction Dy are calculated as the shift amounts.

Accordingly, the shift amounts ΔX and ΔY of the palette for adjustment 50A with respect to the palette placing parts S in the horizontal plane can be acquired.

In addition, in the calculating step S14, the shift amount Δθ in the rotation direction Dc around the vertical axis is calculated as the shift amount.

Accordingly, in addition to the shift amounts ΔX and ΔY in the horizontal plane, the shift amount Δθ in the rotation direction Dc can be acquired. Accordingly, the operation program of the unmanned forklift 2 can be more accurately corrected.

In addition, the operation program of the unmanned forklift 2 is corrected on the basis of the calculated shift amount of the palette for adjustment 50A with respect to the palette placing parts S. Accordingly, after correction, the palette 5 can be aligned with the palette placing parts S with high accuracy by the unmanned forklift 2 operated on the basis of the operation program.

The palette for adjustment 50A having the above-mentioned configuration includes the position information acquisition part 53A configured to acquire the relative position information between the palette for adjustment 50A and the rack structure 100 placed on the palette for adjustment 50A.

By using such a palette for adjustment 50A, the initial setting method S11 of the unmanned forklift 2 can be performed. Since the position information acquisition part 53A is provided in the palette for adjustment 50A, in each of the plurality of palette placing parts S set on the rack structure 100, there is no need to provide a sensor or the like configured to detect the shift amount to the palette for adjustment 50A on the side of the rack structure 100. Accordingly, the introduction of the unmanned forklift 2 can be easily performed, and time and costs required for test traveling before the official operation can be suppressed.

In addition, the position information acquisition part 53A includes the laser displacement gauge 55.

Accordingly, the distance to the rack structure 100 can be measured by the laser displacement gauge 55 as the relative position information in a non-contact manner. Accordingly, the relative position information can be easily and rapidly acquired.

In addition, the palette for adjustment 50A detects the front column 102F that is a part of the rack structure 100 using the first laser displacement gauge 551 disposed on the first side Dx1 in the first direction Dx, and detects the rear column 102R that is another part of the rack structure 100 using the second laser displacement gauge 552 disposed on the second side Dx2 in the first direction Dx. Accordingly, the position of the palette for adjustment 50A with respect to the rack structure 100 in the first direction Dx can be acquired as the relative position information on the basis of the detection results of the first laser displacement gauge 551 and the second laser displacement gauge 552.

In addition, since the first laser displacement gauge 551 and the second laser displacement gauge 552 are provided at both sides in the second direction Dy, the relative position information of the palette main body 51A with respect to the rack structure 100 can be acquired on both sides in the second direction Dy. Here, each of the first laser displacement gauge 551 and the second laser displacement gauge 552 can detect whether there is the rack structure 100 only within the range of a determined distance. When the distance between the first laser displacement gauge 551, the second laser displacement gauge 552 and the rack structure 100 is within a range in which where there is the rack structure 100 is detected by the first laser displacement gauge 551 and the second laser displacement gauge 552 at both sides in the second direction Dy, the relative position information between the palette for adjustment 50A and the rack structure 100 can be acquired. When the palette for adjustment 50A is placed on the palette placing part SL on the first side Dy1 in the second direction Dy, a member of the rack structure 100 on the first side Dy1 in the second direction Dy is detected by the first laser displacement gauge 551 and the second laser displacement gauge 552 disposed on the first side Dy1 in the second direction Dy. In addition, when the palette for adjustment 50A is placed on the palette placing part SR on the second side Dy2 in the second direction Dy, a member of the rack structure 100 on the second side Dy2 in the second direction Dy is detected by the first laser displacement gauge 551 and the second laser displacement gauge 552 disposed on the second side Dy2 in the second direction Dy. In this way, the shift amount of the palette for adjustment 50A can be acquired by the palette for adjustment 50A in both the palette placing part S on the first side Dy1 in the second direction Dy and the palette placing part S on the second side Dy2 in the second direction Dy.

In addition, the position information acquisition part 53A further includes the third laser displacement gauge 555.

The third laser displacement gauge 555 emits a laser toward the second side Dx2 in the first direction Dx. Accordingly, existence of the member of the rack structure 100 located diagonally below the second side Dx2 of the palette for adjustment 50A in the first direction Dx can be detected by the third laser displacement gauge 555. Accordingly, relative position information of the rack structure 100 with respect to the member of the rack structure 100 located diagonally below the second side Dx2 of the palette for adjustment 50A in the first direction Dx can be acquired.

The adjustment system 10A of the unmanned forklift 2 having the above-mentioned configuration includes the palette for adjustment 50A, and the calculation part 72A configured to calculate the shift amount of the palette for adjustment 50A placed on the rack structure 100 with respect to the palette placing part S based on the relative position information acquired by the position information acquisition part 53A.

In the adjustment system 10A of the unmanned forklift 2, the calculation part 72A can calculate the shift amount of the palette for adjustment 50A placed on the rack structure 100 with respect to the palette placing part S based on the relative position information between the palette for adjustment 50A and the rack structure 100 acquired by the position information acquisition part 53A of the palette for adjustment 50A. Accordingly, introduction of the unmanned forklift 2 can be easily performed, and time and costs required for test traveling before the official operation can be suppressed.

Second Embodiment

Next, a second embodiment of an initial setting method of an unmanned forklift, a palette for adjustment, and an adjustment system of the unmanned forklift according to the present disclosure will be described. Further, in the second embodiment described below, the same components as the first embodiment are designated by the same reference signs in the drawings, and description thereof will be omitted. In the second embodiment, the configuration of the palette for adjustment is different from that in the first embodiment.
(Configuration of Adjustment System of Unmanned Forklift)

Figure 18:
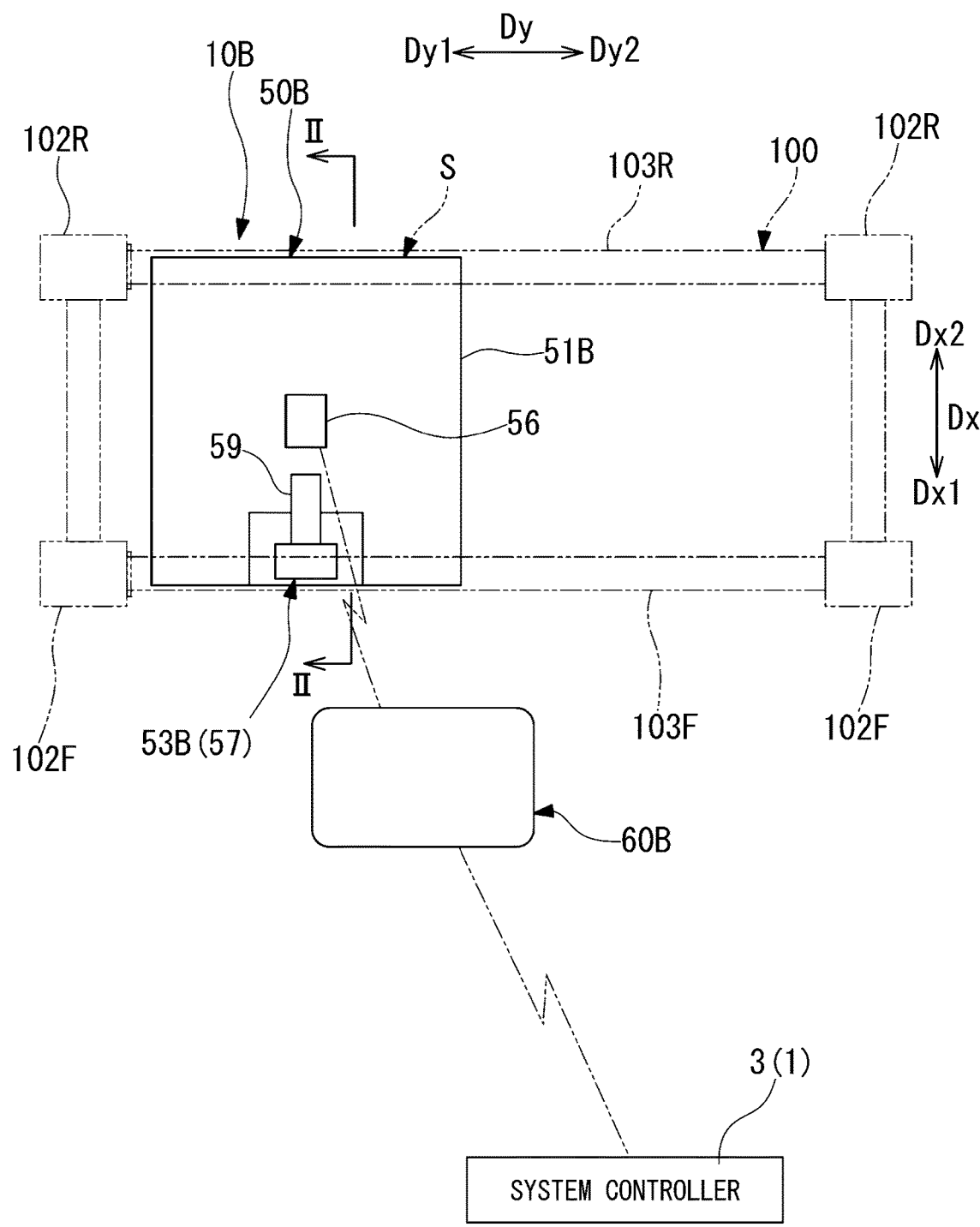
FIG. 18 is a plan view showing a configuration of an adjustment system of an unmanned forklift according to a second embodiment of the present disclosure.

An adjustment system 10B of an unmanned forklift is applied when the unmanned forklift 2 and the automated guided forklift system 1 are introduced into a new facility. As shown in FIG. 18, the adjustment system 10B of the unmanned forklift includes a palette for adjustment 50B and a processing terminal 60B.
(Configuration of Palette for Adjustment)

Figure 19:
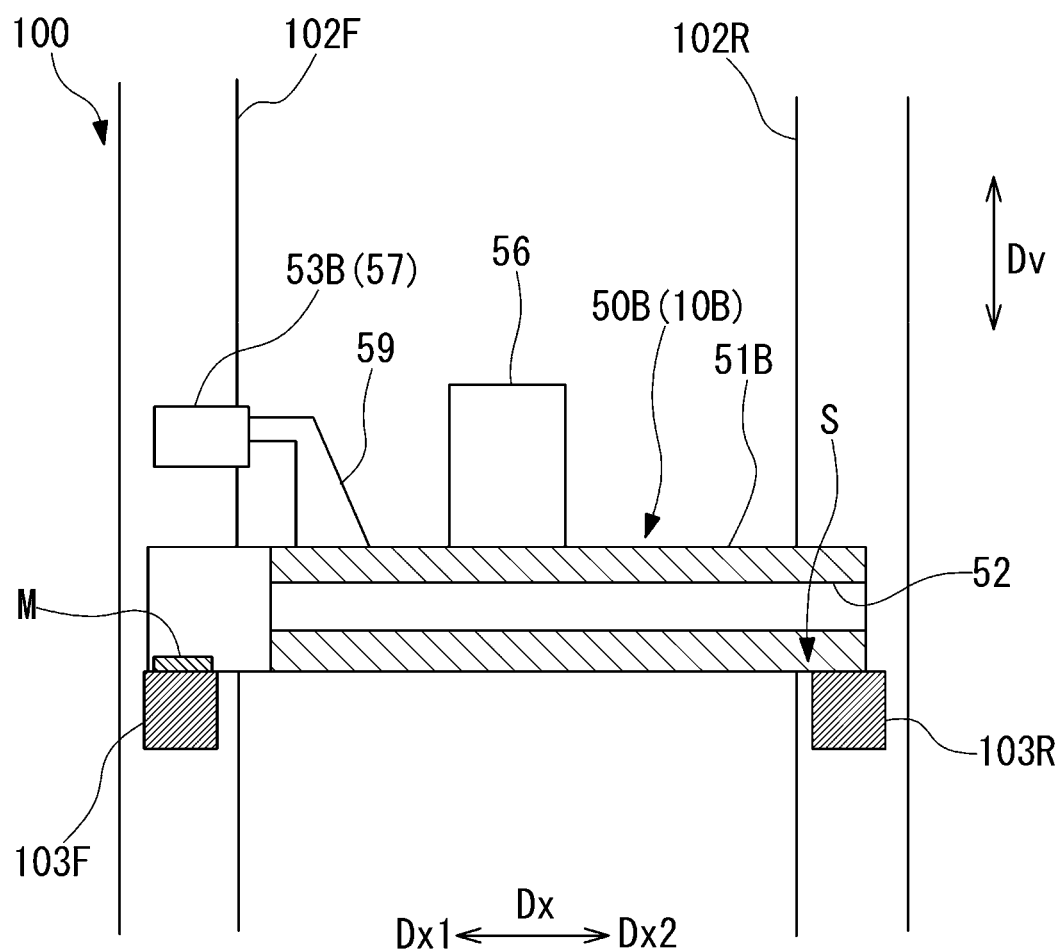
FIG. 19 is a cross-sectional view along an arrow II-II in FIG. 5.

As shown in FIG. 18 and FIG. 19, the palette for adjustment 50B includes a palette main body 51B and a position information acquisition part 53B. The palette main body 51B having a rectangular shape when seen in a plan view and the same size as the palette used in the automated guided forklift system 1 when seen in a plan view is used. The palette main body 51B has the insertion hole 52 into which the forks 22 of the unmanned forklift 2 are inserted. Accordingly, the palette main body 51B is configured to be supported by the forks 22 of the unmanned forklift 2. The palette main body 51B can be placed on the palette placing part S of the rack structure 100.

The position information acquisition part 53B is provided on the palette main body 51B. The position information acquisition part 53B acquires relative position information with the rack structure 100 in a state in which the palette for adjustment 50B is placed on the palette placing part S. In the embodiment, the position information acquisition part 53B includes a camera 57 and the data transmission part 56.

Figure 20:
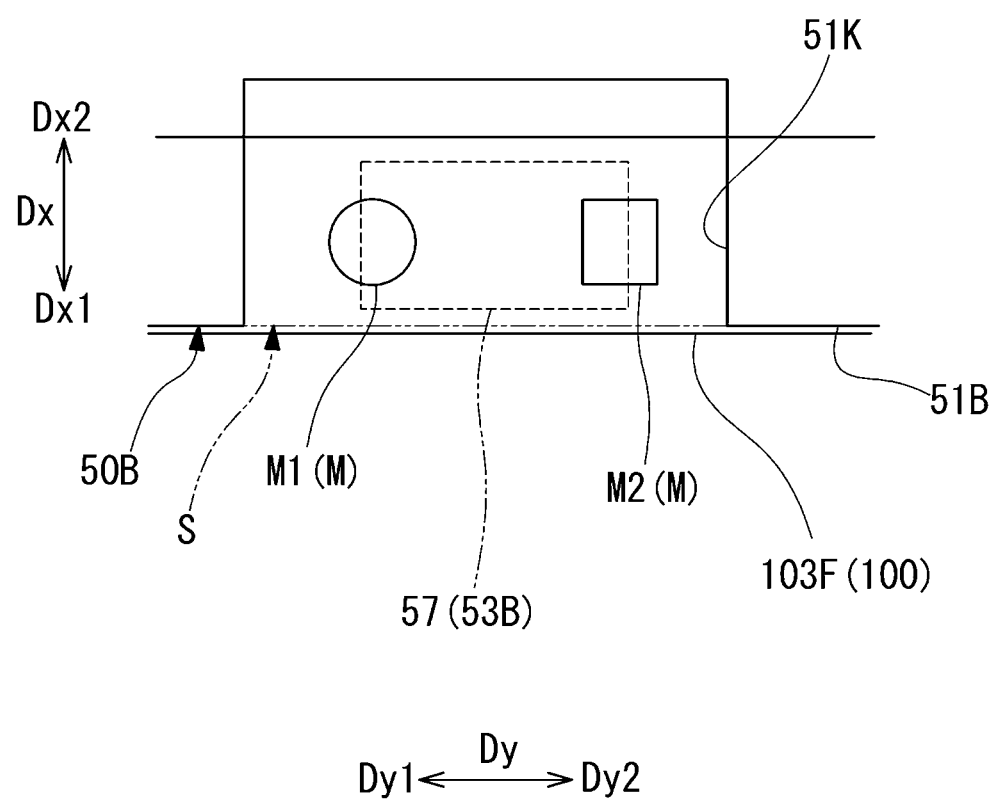
FIG. 20 is a plan view showing an example of a mark serving as a reference position display part set on a rack structure.

The camera 57 photographs a reference position display part M showing a rack-side reference position in the rack structure 100. The reference position display part M is set on the rack structure 100. As shown in FIG. 20, in the embodiment, the reference position display part M has marks M1 and M2 set on the rack structure 100. The marks M1 and M2 are formed on, for example, an upper surface of the front beam member 103F corresponding to each of the palette placing parts S. The marks M1 and M2 preferably have different shapes, dimensions, or the like, so that the mark M1 and the mark M2 can be distinguished from each other. In the embodiment, for example, the one mark M1 has a circular shape when seen in a plan view, and the other mark M2 has a rectangular shape when seen in a plan view. The marks M1 and M2 may be attached to the predetermined position of the rack structure 100, for example, by a magnet or the like, when the initial setting of the unmanned forklift 2 is performed.

Figure 21:
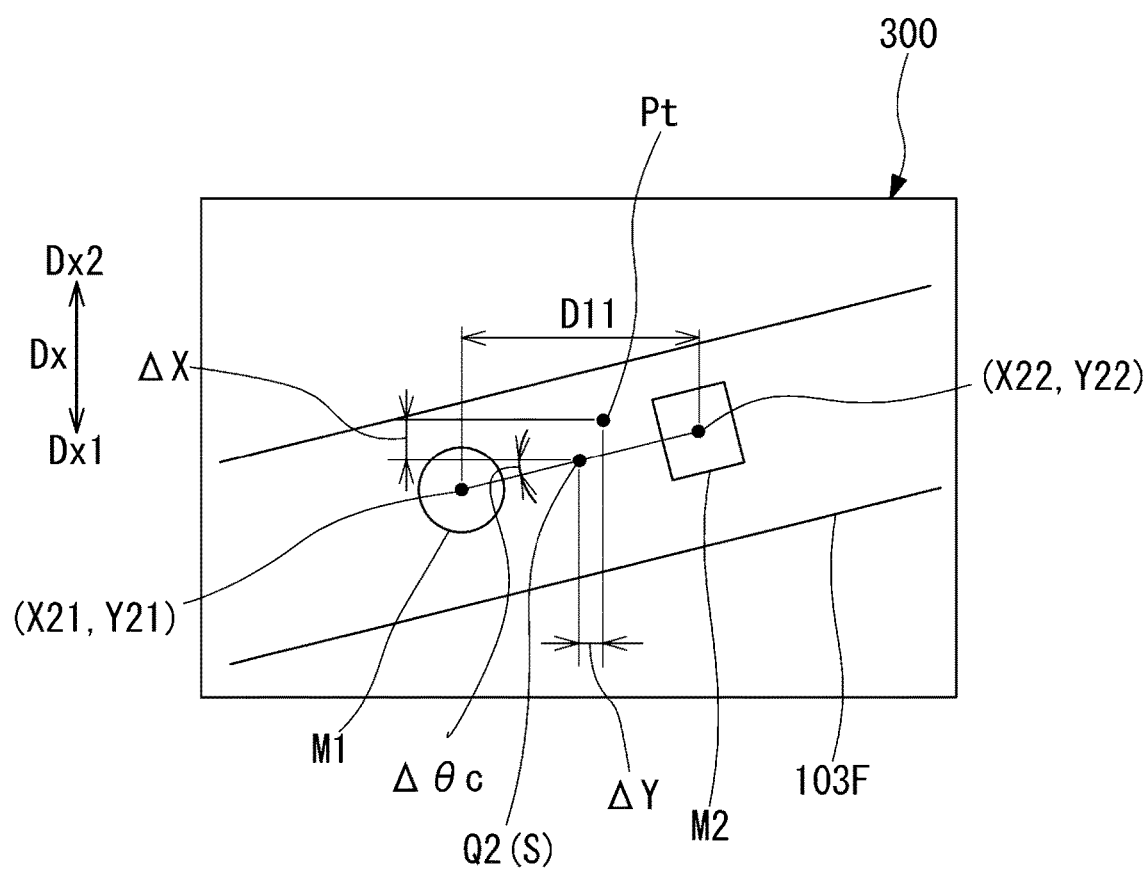
FIG. 21 is a plan view showing an example of an image captured by a camera that constitutes the adjustment system of the unmanned forklift.

In the embodiment, the camera 57 is disposed to photograph the marks M1 and M2 in a state in which the palette for adjustment 50B is placed on the palette placing part S. For example, in the embodiment, a cutout concave portion 51k is formed in the palette main body 51B such that the marks M1 and M2 are exposed above in a state in which the palette for adjustment 50B is placed on the palette placing part S. The camera 57 is supported by the palette main body 51B via a support member 59. The camera 57 is disposed to photograph the marks M1 and M2 from above vertically. As shown in FIG. 21, the camera 57 photographs an image 300 in a region including the reference position display part M showing the rack-side reference position in the rack structure 100.

The data transmission part 56 outputs data of the image 300 photographed by the camera 57 as the relative position information between the palette for adjustment 50B and the rack structure 100. The data transmission part 56 transmits the relative position information to the processing terminal 60B via wireless communication such as a wireless LAN or the like.
(Configuration of Processing Terminal)

The processing terminal 60B executes processing of calculating the shift amount of the palette for adjustment 50B with respect to the palette placing part S based on the relative position information transmitted from the palette for adjustment 50B. The processing terminal 60B calculates, for example, the shift amount between a palette-side reference position Pt set on the palette for adjustment 50B and a rack-side reference position Q2 set on the side of the palette placing part S. In the embodiment, for example, the palette-side reference position Pt is set in the image 300 photographed by the camera 57. The palette-side reference position Pt is set on a position that matches the rack-side reference position Q2 when the shift amount of the palette for adjustment 50B with respect to the palette placing part S is 0. In the embodiment, for example, the rack-side reference position Q2 is set on a center position between a center point of the one mark M1 and a center point of the other mark M2.
(Hardware Configuration View)

As shown in FIG. 11, the processing terminal 60B is a computer including a central processing unit (CPU) 61, a storage device 64 such as a read only memory (ROM) 62, a random access memory (RAM) 63, a hard disk drive (HDD), a solid state drive (SSD), and the like, and a signal transmission and reception module 65. The processing terminal 60B is a computer terminal having portability such as a tablet terminal, a smart phone, a notebook type personal computer, or the like.
(Functional Block Diagram)

As shown in FIG. 12, the CPU 61 of the processing terminal 60B includes configurations of an input part 71, a calculation part 72B, and an output part 73 by executing a program stored in a host device in advance.

The input part 71 is the signal transmission and reception module 65 in terms of hardware, and receives data from the palette for adjustment 50B. The calculation part 72B executes processing of calculating the shift amount of the palette for adjustment 50B with respect to the palette placing part S based on the relative position information. The output part 73 is the signal transmission and reception module 65 in terms of hardware, and transmits the calculated shift amount to the system controller 3 via wireless communication such as a wireless LAN or the like.

(Procedure of Initial Setting Method of Unmanned Forklift)

As shown in FIG. 13, an initial setting method S21 of the unmanned forklift 2 according to the embodiment of the present disclosure includes step S22 of placing the palette for adjustment 50B on the palette placing part S, step S23 of acquiring relative position information, step S24 of calculating the shift amount of the palette for adjustment 50B with respect to the palette placing part S, and step S25 of correcting an operation program of the unmanned forklift.

In step S22 of placing the palette for adjustment 50B on the palette placing part S, the palette for adjustment 50B is placed on the palette placing part S of the object that performs initial setting, among the plurality of palette placing parts S set on the plurality of rack structures 100 in the facility, by the unmanned forklift 2 operated based on a preset operation program. For this, position coordinates of the palette placing part S is transmitted to the unmanned forklift 2 as a destination according to an order from the system controller 3. The unmanned forklift 2 moves toward the palette placing part S of the destination along the route R in a state in which the palette for adjustment 50B is placed on the forks 22. The unmanned forklift 2 changes an orientation of the forklift main body 21 to face the palette placing part S after arrival at the palette placing part S of the destination. Then, the unmanned forklift 2 raises and lowers the forks 22 to match the palette for adjustment 50B placed on the forks 22 with a height of the palette placing part S of the destination. The unmanned forklift 2 advance toward the second side from the first side Dx1 (the side of the route R) in the first direction Dx, and places the loaded palette for adjustment 50B on the palette placing part S at the position coordinates of the palette placing part S of the destination.

In step S23 of acquiring the relative position information, relative position information between the loaded palette for adjustment 50B and the rack structure 100 is obtained by the camera 57 of the position information acquisition part 53B. For this, the camera 57 photographs the image 300 in the region including the marks M1 and M2 as the reference position display part M disposed on the upper surface of the front beam member 103F of the rack structure 100. In this way, in step S23, the image 300 as the relative position information is acquired by the position information acquisition part 53B in a non-contact manner.

In step S23, the pieces of data of the image 300 photographed by the camera 57 are transmitted to the processing terminal 60B by the data transmission part 56 as the relative position information. In the processing terminal 60B, the input part 71 receives the data of the image 300 as the relative position information.

In step S24 of calculating the shift amount of the palette for adjustment 50B with respect to the palette placing part S, the calculation part 72B calculates the shift amount of the palette for adjustment 50B placed on the rack structure 100 with respect to the palette placing part S based on the relative position information acquired by the position information acquisition part 53B. In step S24, as shown in FIG. 21, the shift amount between the palette-side reference position Pt and the rack-side reference position Q2 is calculated based on the data of the image 300. As the shift amount of the palette for adjustment 50B with respect to the palette placing part S, the shift amount $\Delta X$ in the first direction Dx, the shift amount $\Delta Y$ in the second direction Dy, and the shift amount $\Delta \theta$ in the rotation direction Dc around the vertical axis are calculated.

In step S24, first, the calculation part 72B calculates center position coordinates (X21, Y21) of the mark M1 and center position coordinates (X22, Y22) of the mark M2 using the palette-side reference position Pt in the image 300 as an origin through image processing with respect to the image 300 photographed by the camera 57.

Then, the calculation part 72B calculates position coordinates (Xc, Yc) of a center point between the mark M1 and the mark M2, which is the rack-side reference position Q2, using the following Equations (6) and (7).

$$\Delta X = Xc = (X21+X22)/2 \tag{6}$$

$$\Delta Y = Yc = (Y21+Y22)/2 \tag{7}$$

Further, the calculation part 72B calculates the shift amount $\Delta \theta c$ in the rotation direction Dc around the vertical axis of the palette for adjustment 50B with respect to the palette placing part S using the following Equation (8).

$$\Delta \theta c = \tan^{-1}((X21-X22)/D11) \tag{8}$$

Here, D11 is an interval between the center point of the mark M1 and the center point of the mark M2 in the second direction Dy.

Data of the calculated shift amount of the palette for adjustment 50B with respect to the palette placing part S is output to the system controller 3 by the output part 73 through wireless communication.

In step S25 of correcting an operation program of the unmanned forklift, the operation program of the unmanned forklift 2 is corrected based on the calculated shift amount. In step S25, the system controller 3 receives the data of the shift amount output from the processing terminal 60B. The system controller 3 corrects the position coordinates of the palette placing part S in the operation program of the unmanned forklift 2 based on the data of the received shift amount. Here, in the correction of the position coordinates of the palette placing part S in the operation program of the unmanned forklift 2, the program of the system controller 3 may be automatically performed, or an operator of the system controller 3 may manually input a numerical value or the like to correct the position coordinates of the palette placing part S.

The initial setting of all the palette placing parts S is performed by executing a series of processing of the above-mentioned steps S22 to S25 with respect to all the palette placing parts S in the facility.

(Effects)

In the initial setting method S21 of the unmanned forklift 2 having the above-mentioned configuration, when the unmanned forklift 2 is introduced into the facility including the rack structure 100, the palette for adjustment 50B is actually placed on the palette placing part S of the rack structure 100 by the unmanned forklift 2. The relative position information between the palette for adjustment 50B placed on the palette placing part S and the rack structure 100 is acquired by the position information acquisition part 53B. The shift amount of the palette for adjustment 50B with respect to the palette placing part S is calculated on the basis of the acquired relative position information. Accordingly, the shift amount occurred when the article-loaded palette is placed on the palette placing part S of the rack structure 100 by the unmanned forklift 2 can be grasped. The initial setting when the unmanned forklift 2 is introduced into the facility can be easily performed by correcting the operation program of the unmanned forklift 2 on the basis of the grasped shift amount. In addition, since the position information acquisition part 53B is provided on the palette for adjustment 50B, in each of the plurality of palette placing parts S set on the rack structure 100, there is no need to provide a sensor or the like configured to detect the shift amount to the palette for adjustment 50B on the side of the rack structure 100. Accordingly, the introduction of the unmanned forklift 2 can be easily performed, and time and costs required for test traveling before the official operation can be suppressed.

In addition, the position information acquisition part 53B can calculate the shift amount of the rack-side reference position Q2 with respect to the palette-side reference position Pt set on the palette for adjustment 50B by photographing the image 300 including the reference position display part M set on the rack structure 100 as the relative position information.

In addition, the shift amount of the palette for adjustment 50B with respect to the palette placing part S in the horizontal plane can be acquired by setting the marks M1 and M2 to the rack structure 100 as the reference position display part M.

In addition, in addition to the shift amount of the palette for adjustment 50B with respect to the palette placing part S in the horizontal plane, the shift amount Δθc in the rotation direction Dc can be acquired by setting the plurality of marks M1 and M2 to the rack structure 100 as the reference position display part M. Accordingly, the operation program of the unmanned forklift 2 can be corrected with high accuracy.

The palette for adjustment 50B having the above-mentioned configuration includes the position information acquisition part 53B configured to acquire the relative position information with the rack structure 100 on which the palette for adjustment 50B is placed.

By using the palette for adjustment 50B, the initial setting method S21 of the unmanned forklift 2 as described above can be performed. Since the position information acquisition part 53B is provided on the palette for adjustment 50B, in each of the plurality of palette placing parts S set on the rack structure 100, there is no need to provide a sensor or the like configured to detect the shift amount to the palette for adjustment 50B on the side of the rack structure 100. Accordingly, the introduction of the unmanned forklift 2 can be easily performed, and time and costs required for test traveling before the official operation can be suppressed.

In addition, the position information acquisition part 53B includes the camera 57 configured to photograph the marks M1 and M2. Accordingly, the shift amount of the palette for adjustment 50B with respect to the palette placing part S can be acquired by photographing the image 300 including the marks M1 and M2 using the camera 57. Accordingly, the relative position information can be easily and rapidly acquired.

The adjustment system 10B of the unmanned forklift 2 having the above-mentioned configuration includes the palette for adjustment 50B, and the calculation part 72B configured to calculate the shift amount of the palette for adjustment 50B placed on the rack structure 100 with respect to the palette placing part S based on the relative position information acquired by the position information acquisition part 53B.

The adjustment system 10B of the unmanned forklift 2 can calculate the shift amount of the palette for adjustment 50B placed on the rack structure 100 with respect to the palette placing part S using the calculation part 72B based on the relative position information between the palette for adjustment 50B and the rack structure 100 acquired by the position information acquisition part 53B of the palette for adjustment 50B. Accordingly, the introduction of the unmanned forklift 2 can be easily performed, and time and costs required for test traveling before the official operation can be suppressed.

Third Embodiment

Next, a third embodiment of an initial setting method of an unmanned forklift, a palette for adjustment, and an adjustment system of the unmanned forklift according to the present disclosure will be described. Further, in the third embodiment described below, the same components as in the first and second embodiments are designated by the same reference sings and description thereof will be omitted. In the third embodiment, a configuration of adjusting a position shift between the palette for adjustment and the unmanned forklift is different from that in the first and second embodiments.

(Configuration of Adjustment System of Unmanned Forklift)

An adjustment system 10C of an unmanned forklift shown in FIG. 4 is applied when the unmanned forklift 2 and the automated guided forklift system 1 are introduced into a new facility. The adjustment system 10C of the unmanned forklift includes a palette for adjustment 50C and a system controller 3C.

(Configuration of Palette for Adjustment)

Figure 22:
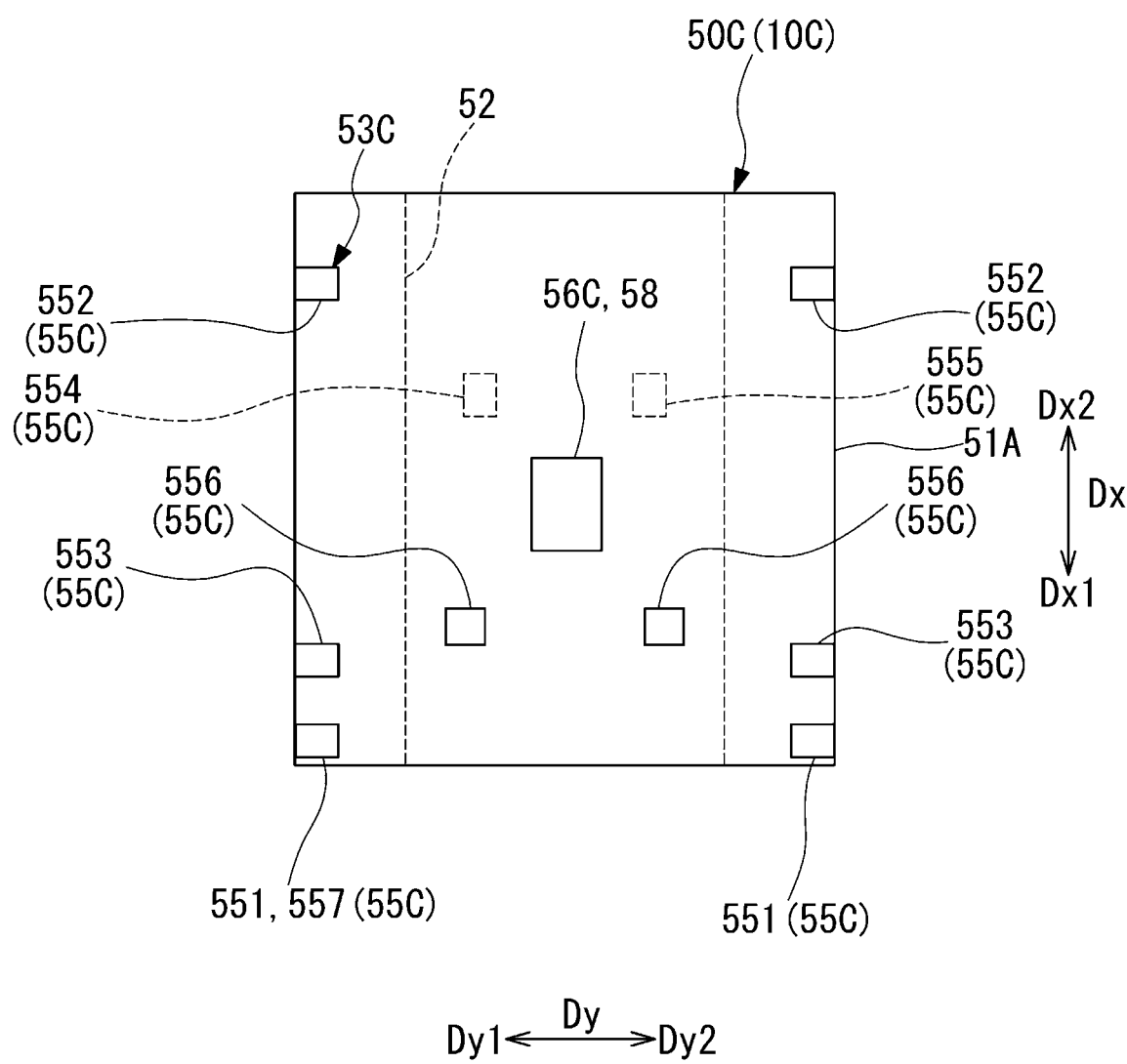
FIG. 22 is a plan view showing a palette for adjustment of an adjustment system of an unmanned forklift according to a third embodiment of the present disclosure.
Figure 23:
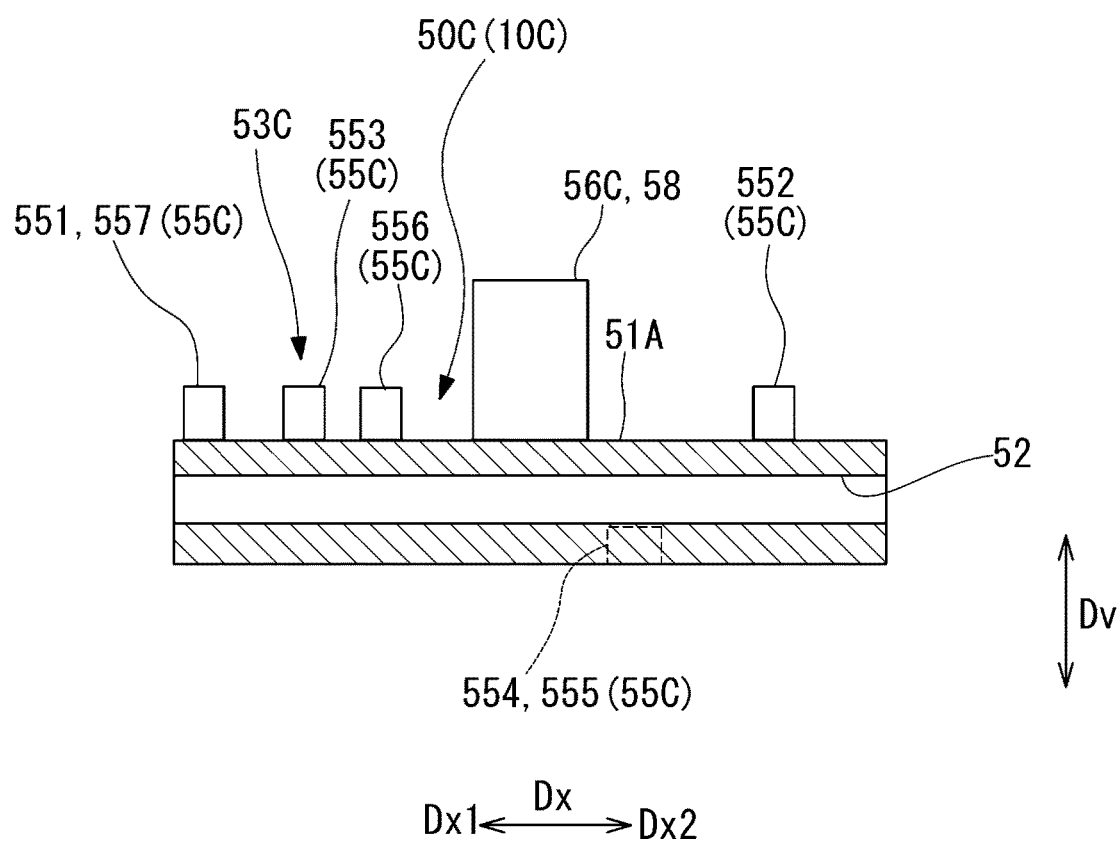
FIG. 23 is a cross-sectional view on the side of the palette for adjustment.

As shown in FIG. 22 and FIG. 23, the palette for adjustment 50C includes a palette main body 51A and a position information acquisition part 53C. The palette for adjustment 50C imitates the palette 5 (see FIG. 2) on which luggage actually placed on the palette placing part S of the rack structure 100 is loaded, and is preferably formed to have a weight of, for example, about 1 t (ton).

The position information acquisition part 53C is provided on the palette main body 51A. Like the first embodiment, the position information acquisition part 53C acquires relative position information with the rack structure 100 in a state in which the palette for adjustment 50C is placed on the palette placing part S. In addition, the position information acquisition part 53C of the embodiment acquires relative position information between the palette for adjustment 50C and the unmanned forklift 2 in a state in which the palette for adjustment 50C is loaded. In the embodiment, the position information acquisition part 53C includes a laser displacement gauge 55C, a data transmission part 56C, and a displacement gage controller 58.

In the embodiment, the laser displacement gauge 55C includes a first laser displacement gauge 551, a second laser displacement gauge 552, an intermediate laser displacement gauge 553, third laser displacement gauges 554 and 555, a fourth laser displacement gauge 556, and a fifth laser displacement gauge 557. The first laser displacement gauge 551, the second laser displacement gauge 552, the intermediate laser displacement gauge 553, and the fourth laser displacement gauge 556 are disposed on both sides of the palette main body 51A in the second direction Dy.

Like the first embodiment, the first laser displacement gauge 551, the second laser displacement gauge 552, and the intermediate laser displacement gauge 553 measure distances to the rack structure 100 by radiating lasers to a part of the rack structure 100. As shown in FIG. 5, the reflection part 105 configured to reflect the lasers emitted from the first laser displacement gauge 551, the second laser displacement gauge 552, and the intermediate laser displacement gauge 553 is set on each of the palette placing parts S on the side of the rack structure 100. For example, the reflection part 105 is set on a part of surfaces of the front column 102F and the rear column 102R.

Figure 24:
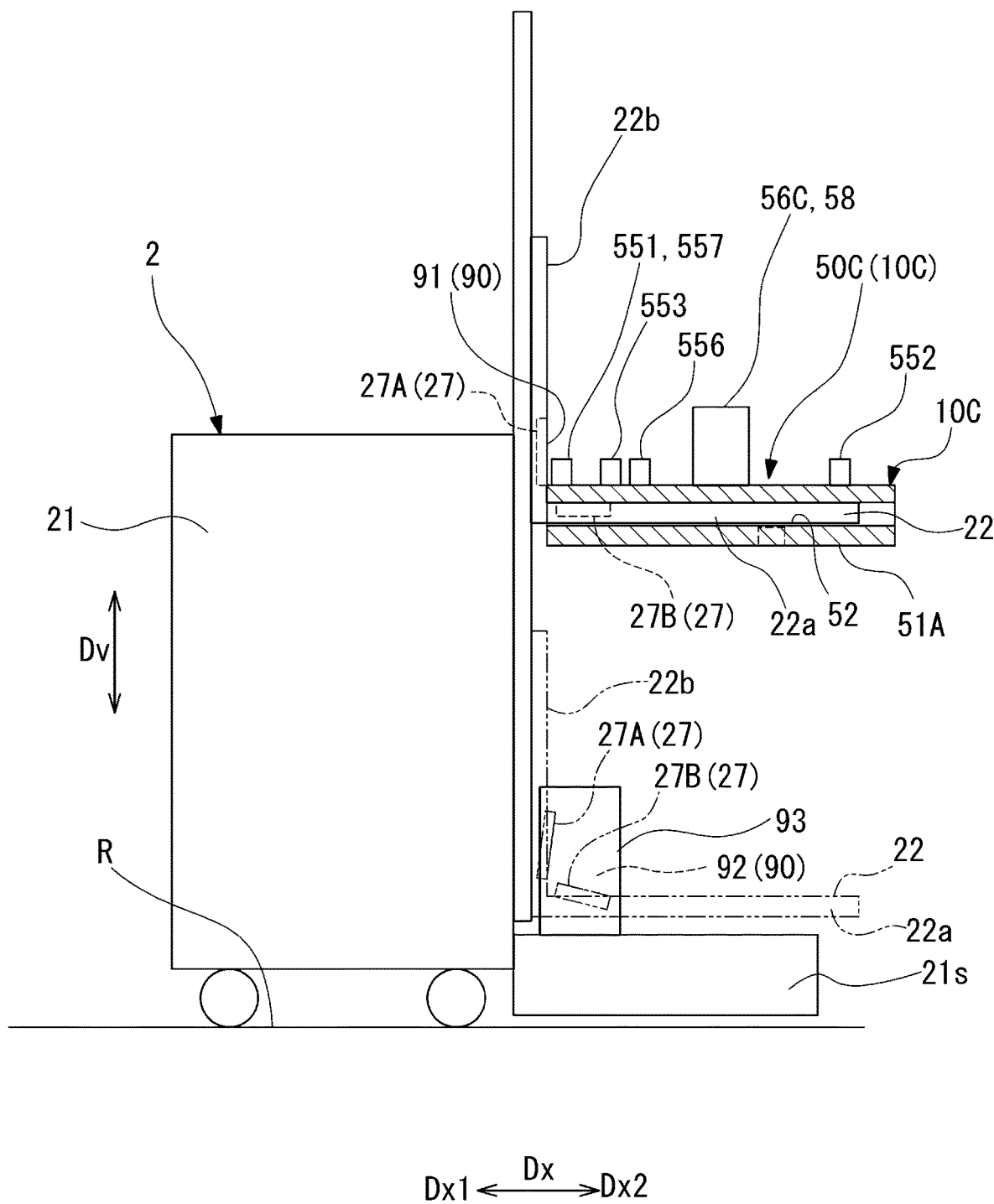
FIG. 24 is a cross-sectional view showing a state in which the palette for adjustment is supported by forks of the unmanned forklift.
Figure 25:
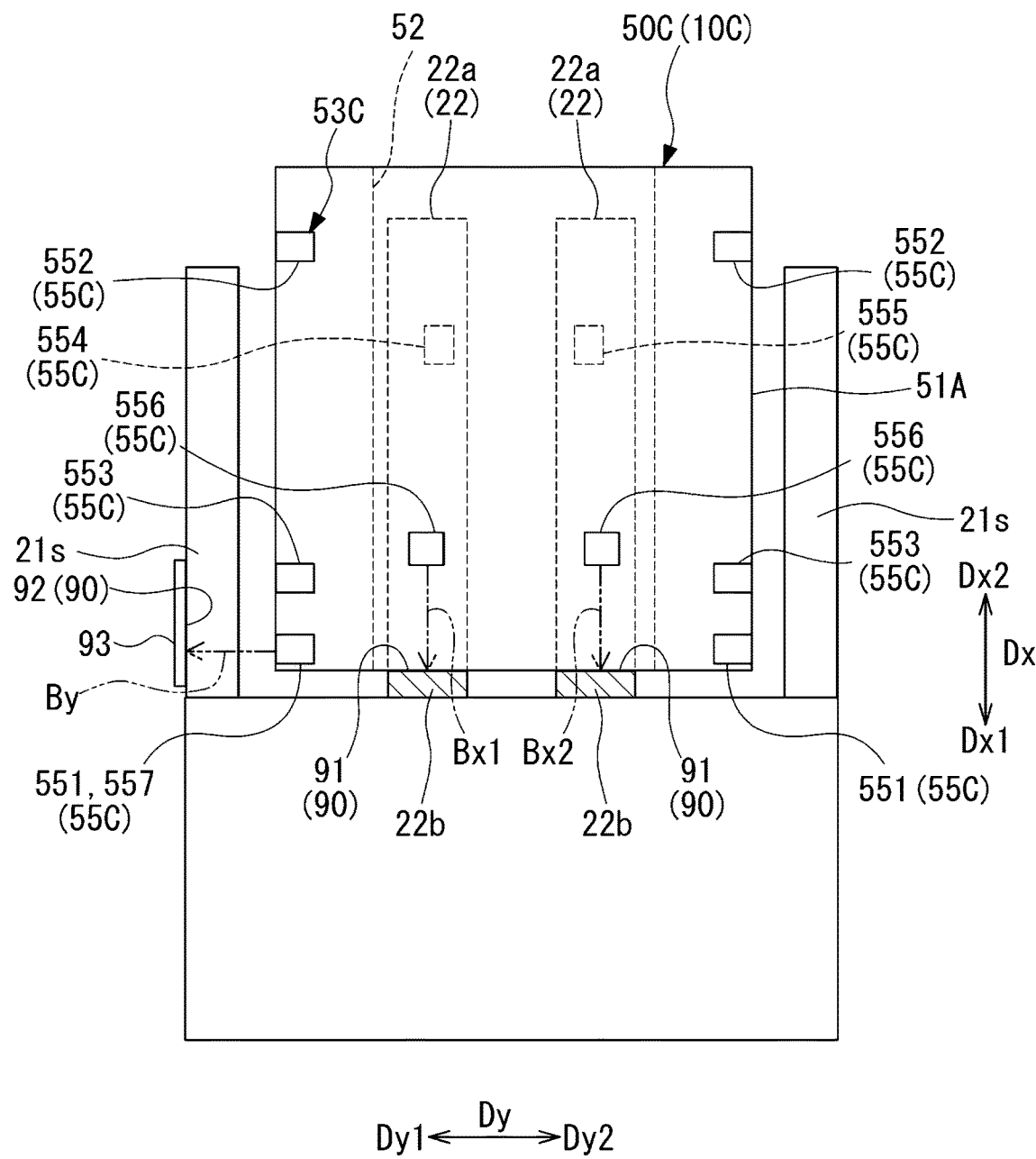
FIG. 25 is a plan view showing a state in which the palette for adjustment is supported by the forks of the unmanned forklift.

As shown in FIG. 24 and FIG. 25, the fourth laser displacement gauge 556 and the fifth laser displacement gauge 557 measure a position shift amount of the palette for adjustment 50C with respect to the unmanned forklift 2 in a state in which the palette for adjustment 50C is loaded by radiating a laser to a part of the unmanned forklift 2. The fourth laser displacement gauge 556 and the fifth laser displacement gauge 557 are disposed on the first side Dx1 of the palette main body 51A in the first direction Dx.

The fourth laser displacement gauge 556 and the fifth laser displacement gauge 557 measure a distance to an unmanned forklift-side reference position display part 90 as relative position information between the palette for adjustment SOC and the unmanned forklift 2. The unmanned forklift-side reference position display part 90 is set on the unmanned forklift 2, and shows an unmanned forklift-side reference position in the unmanned forklift 2. In the embodiment, a forward surface 91 and a laterally-facing surface 92 are set as the unmanned forklift-side reference position display part 90.

The forward surface 91 is set on the forks 22 of the unmanned forklift 2. Each of the forks 22 of the unmanned forklift 2 is formed in an L shape when seen in a widthwise direction (the second direction Dy) of the forklift main body 21. Each of the forks 22 has a palette support portion 22a inserted into the insertion hole 52 of the palette main body 51A, and a fork base 22b extending upward from a base end portion of the palette support portion 22a and configured to support the forklift main body 21 to raise and lower the forklift main body 21. The forward surface 91 as the unmanned forklift-side reference position display part 90 is a surface facing the first side Dx1 (forward) of the fork base 22b in the first direction Dx.

In addition, in the forklift main body 21 of the unmanned forklift 2, a plate-shaped reflection member 93 is provided on a straddle leg 21s along a floor surface. The reflection member 93 stands upward from the straddle leg 21s. The laterally-facing surface 92 as the unmanned forklift-side reference position display part 90 is formed in the reflection member 93 in the second direction Dy.

Each of the fourth laser displacement gauge 556 and the fifth laser displacement gauge 557 detects a part of the unmanned forklift 2 to measure a position shift amount of the palette for adjustment 50C with respect to the unmanned forklift 2 upon loading.

As shown in FIG. 25, the fourth laser displacement gauge 556 measures distances Bx1 and Bx2 to the forward surfaces 91 of the pair of forks 22 by radiating the laser to the forward surface 91 as the unmanned forklift-side reference position display part 90 along the second side Dx2 in the first direction Dx. In the embodiment, the pair of fourth laser displacement gauges 556 are disposed at an interval in the second direction Dy to match the pair of forks 22. A shift of the palette for adjustment SOC with respect to the unmanned forklift 2 in the rotation direction around the vertical axis can be detected from a difference between the distances Bx1 and Bx2 to the forward surface 91 of each of the forks 22 measured by the pair of fourth laser displacement gauges 556.

The fifth laser displacement gauge 557 is disposed on at least one side of the forklift main body 21 in the second direction Dy (in the example of FIG. 25, for example, the first side Dy1). Each of the fifth laser displacement gauges 557 radiates a laser to the second side Dy2 in the second direction Dy, and measures a distance By to the laterally-facing surface 92 of the reflection member 93 as the unmanned forklift-side reference position display part 90. Further, in the embodiment, the fifth laser displacement gauge 557 also functions as the first laser displacement gauge 551. Of course, the fifth laser displacement gauge 557 and the first laser displacement gauge 551 may be individually provided.

The fourth laser displacement gauge 556 and the fifth laser displacement gauge 557 detect the laser reflected by the forward surface 91 that is the unmanned forklift-side reference position display part 90 and the laterally-facing surface 92. Each of the fourth laser displacement gauge 556 and the fifth laser displacement gauge 557 detects a distance to the forward surface 91 or the laterally-facing surface 92 when the laser reflected by the forward surface 91 and the laterally-facing surface 92 is detected.

The fourth laser displacement gauge 556 and the fifth laser displacement gauge 557 as the position information acquisition part 53C are configured to operate in a state in which the palette for adjustment SOC is supported by the forks 22 of the unmanned forklift 2. For example, as shown in FIG. 24, the forks 22 include palette sensors 27 configured to detect that the palette for adjustment 50C was loaded. The palette sensors 27 include a first palette sensor 27A configured to detect that the palette for adjustment 50C collided with the forward surfaces 91 of the forks 22, and a second palette sensor 27B configured to detect that the palette for adjustment 50C was placed on the palette support portions 22a of the forks 22.

The first palette sensor 27A is disposed to protrude from a forward surface 22f and to be retractable in the first direction Dx. The first palette sensor 27A is pushed in when the palette for adjustment 50C hits the forward surfaces 91 of the forks 22 upon loading of the palette for adjustment 50C, and outputs a signal showing that the palette for adjustment 50C was detected. The second palette sensor 27B is disposed to protrude upward from the palette support portion 22a and to be retractable in an upward/downward direction. The second palette sensor 27B is pushed in below when the palette for adjustment 50C is placed on the palette support portion 22a upon loading of the palette for adjustment 50C, and outputs a signal showing that the palette for adjustment 50C is detected. The first palette sensor 27A and the second palette sensor 27B transmit the output signal to the displacement gage controller 58 through wireless communication.

In addition, when the palette for adjustment 50C supported by the forks 22 is placed on the palette placing part S, the fork base 22b moves downward relative to the palette for adjustment 50C. Accordingly, the second palette sensor 27B protrudes upward from the palette support portion 22a, and the signal showing that the palette for adjustment 50C was unloaded may be transmitted to the displacement gage controller 58 through wireless communication.

The displacement gage controller 58 controls operations of the first laser displacement gauge 551, the second laser displacement gauge 552, the intermediate laser displacement gauge 553, the third laser displacement gauges 554 and 555, the fourth laser displacement gauge 556, and the fifth laser displacement gauge 557. The displacement gage controller 58 operates the fourth laser displacement gauge 556, and the fifth laser displacement gauge 557, and measures a position shift amount of the palette for adjustment 50C with respect to the unmanned forklift 2 when the signal showing that the palette for adjustment 50C is loaded from the first palette sensor 27A and the second palette sensor 27B was received.

The displacement gage controller 58 may operate the first laser displacement gauge 551, the second laser displacement gauge 552, and the intermediate laser displacement gauge 553, and measure a position shift amount of the palette for adjustment 50C with respect to the rack structure 100 when a signal showing that the palette for adjustment 50C is unloaded on the palette placing part S was received from the second palette sensor 27B.

The data transmission part 56C outputs data showing distances detected by the first laser displacement gauge 551, the second laser displacement gauge 552, the intermediate laser displacement gauge 553, the third laser displacement gauges 554 and 555 as relative position information between the palette for adjustment 50C and the rack structure 100. The data transmission part 56C outputs data showing distances detected by the fourth laser displacement gauge 556 and the fifth laser displacement gauge 557 as relative position information between the palette for adjustment 50C and the unmanned forklift 2. As shown in FIG. 4, the data transmission part 56C transmits the relative position information to the system controller 3C via wireless communication such as a wireless LAN or the like.

(Configuration of System Controller)

The system controller 3C controls an operation of the unmanned forklift 2 in the adjustment system 10C of the unmanned forklift. The system controller 3C moves the unmanned forklift 2 to a loading position where the palette 5 is loaded on the forks 22 or an unloading position of the palette 5 loaded on the forks 22. The system controller 3C operates the forks 22 and executes a predetermined loading operation at the loading position. The system controller 3C operates the forks 22 and executes a predetermined unloading operation at the unloading position. The system controller 3C executes processing of calculating the shift amount of the palette for adjustment 50C with respect to the palette placing part S upon unloading, and processing of calculating the shift amount of the palette for adjustment 50C with respect to the unmanned forklift 2 upon loading based on the relative position information transmitted from the palette for adjustment 50C.

(Hardware Configuration View)

Figure 26:
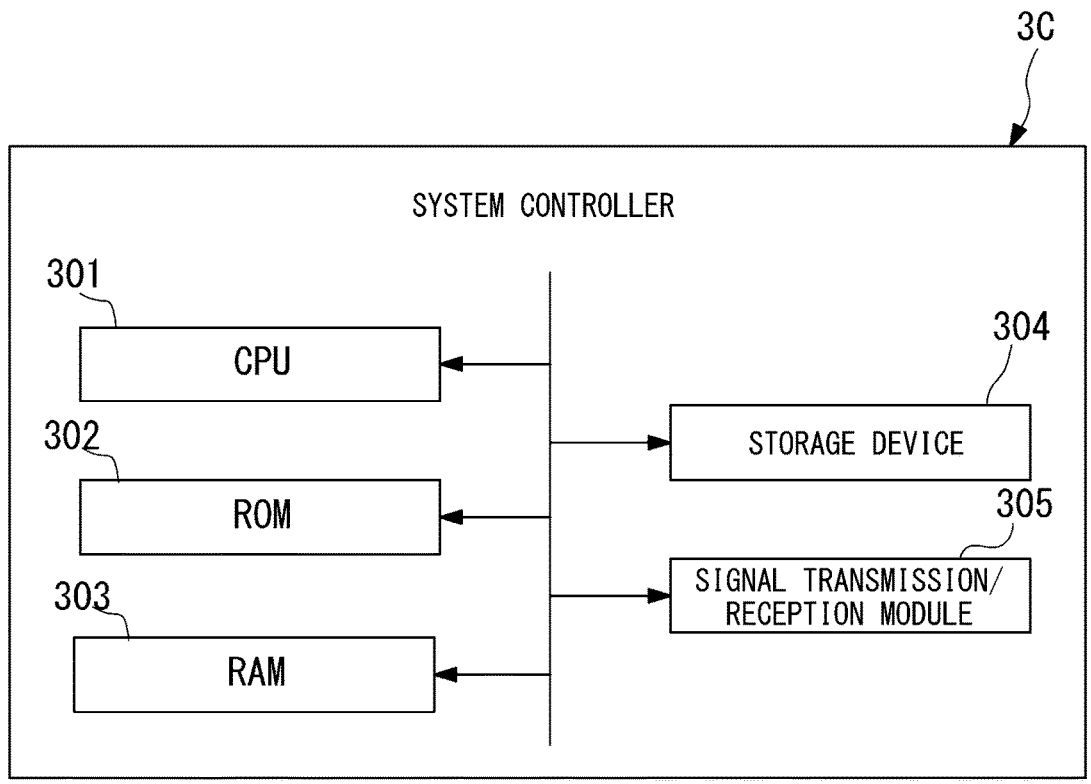
FIG. 26 is a view showing a hardware configuration of a processing terminal that constitutes the adjustment system of the unmanned forklift.

As shown in FIG. 26, system controller 3C is a computer including a central processing unit (CPU) 301, a storage device 304 such as a read only memory (ROM) 302, a random access memory (RAM) 303, a hard disk drive (HDD), a solid state drive (SSD), and the like, and a signal reception module 305.

(Functional Block Diagram)

Figure 27:
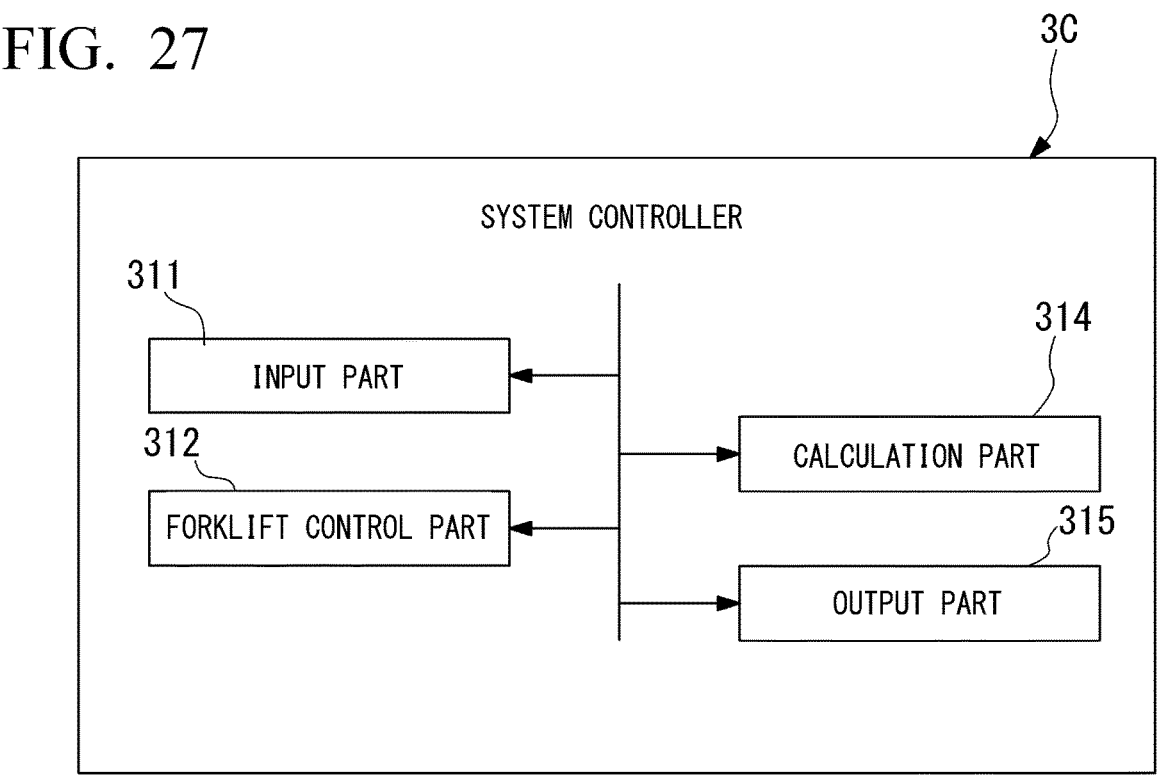
FIG. 27 is a functional block diagram of the processing terminal.

As shown in FIG. 27, the CPU 301 of the system controller 3C includes configurations of an input part 311, a forklift control part 312, a calculation part 314, and an output part 315 by executing a program stored in a host device in advance.

The input part 311 is the signal reception module 305 in terms of hardware, and receives data from the palette for adjustment 50C. The forklift control part 312 controls an operation of the unmanned forklift 2. The forklift control part 312 outputs an operation order including position information such as a loading position, an unloading position, or the like, to the forklift control part 23 of the unmanned forklift 2 via a wireless communication means such as a wireless LAN or the like. The calculation part 314 executes processing of calculating the shift amount of the palette for adjustment 50C with respect to the palette placing part S and the shift amount of the palette for adjustment 50C with respect to the palette placing part S based on the relative position information. The calculation part 314 corrects the operation program of the unmanned forklift 2 based on the calculated shift amount. The output part 315 is the signal reception module 305 in terms of hardware, and transmits an order signal or the like to the unmanned forklift 2 via wireless communication means such as a wireless LAN or the like.

(Procedure of Initial Setting Method of Unmanned Forklift)

Figure 28:
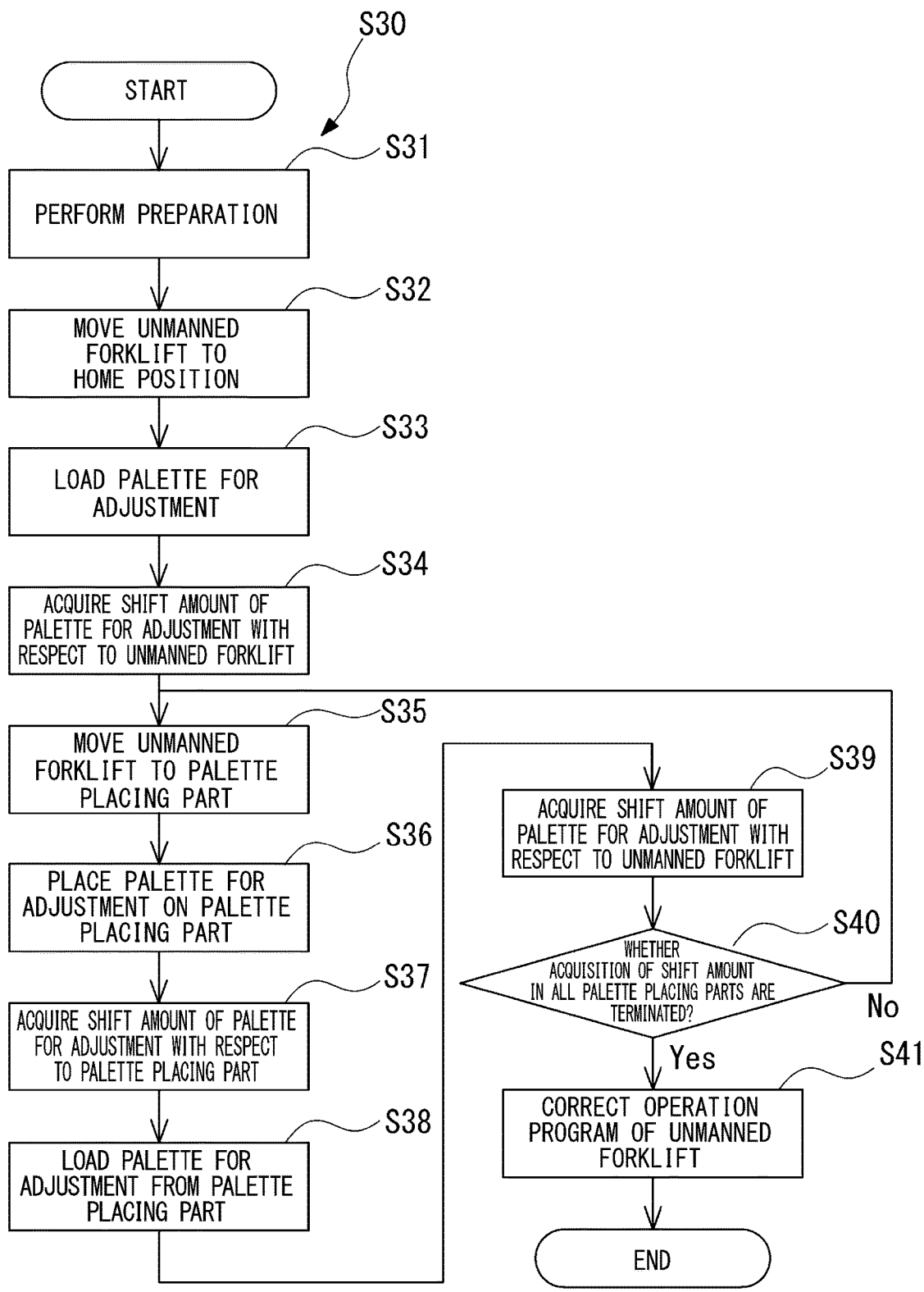
FIG. 28 is a flowchart showing a procedure of an initial setting method of the unmanned forklift according to the third embodiment of the present disclosure.

As shown in FIG. 28, an initial setting method S30 of the unmanned forklift 2 according to the embodiment of the present disclosure includes step S31 of performing advance preparation, step S32 of moving the unmanned forklift 2 to a home position, step S33 of loading the palette for adjustment 50C, step S34 of acquiring the shift amount of the palette for adjustment 50C with respect to the unmanned forklift 2, step S35 of moving the unmanned forklift 2 to the palette placing part S, step S36 of placing the palette for adjustment 50C on the palette placing part S, step S37 of acquiring the shift amount of the palette for adjustment 50C with respect to the palette placing part S, step S38 of loading the palette for adjustment 50C from the palette placing part S, step S39 of acquiring the shift amount of the palette for adjustment 50C with respect to the unmanned forklift 2, step S40 of confirming whether acquisition of the shift amount in all the palette placing part S was terminated, and step S41 of correcting an operation program of the unmanned forklift.

In step S31 of performing the advance preparation, the reflection member 93 is attached to the unmanned forklift 2. In addition, an operation program including information such as a home position of the unmanned forklift 2, position information (position coordinates) of the rack structure 100 of each of the palette placing parts S, a moving route of the unmanned forklift 2, and the like, is set on the system controller 3C.

In step S32 of moving the unmanned forklift 2 to a home position, first, the unmanned forklift 2 is moved to the home position under control of the system controller 3C. The home position is set on a position other than in the rack structure 100. The palette for adjustment 50C is disposed at the home position.

In step S33 of loading the palette for adjustment 50C, the palette for adjustment 50C is loaded by the forks 22 of the unmanned forklift 2 moved to the home position. When the palette for adjustment 50C is loaded, when the first palette sensor 27A and the second palette sensor 27B are pushed in by the palette for adjustment 50C, the first palette sensor 27A the second palette sensor 27B transmit the signal showing that the palette for adjustment 50C was loaded to the displacement gage controller 58 through wireless communication. Then, the displacement gage controller 58 executes step S34.

In step S34 of acquiring the shift amount of the palette for adjustment 50C with respect to the unmanned forklift 2, the displacement gage controller 58 operates the fourth laser displacement gauge 556 and the fifth laser displacement gauge 557 to measure a position shift amount of the palette for adjustment 50C with respect to the unmanned forklift 2. The fourth laser displacement gauge 556 measures the distances Bx1 and Bx2 to the forward surfaces 91 of the forks 22 by radiating the laser to the forward surface 91. The fifth laser displacement gauge 557 measures the distance By to the laterally-facing surface 92 of the reflection member 93. The shift amount of the palette for adjustment 50C with respect to the unmanned forklift 2 is detected from the distances Bx1 and Bx2 to the forward surface 91 and the distance By to the laterally-facing surface 92. Here, when the fifth laser displacement gauge 557 measures the distance By to the laterally-facing surface 92 of the reflection member 93, the forks 22 are lowered according to necessity, and the fifth laser displacement gauge 557 of the palette for adjustment 50C faces the reflection member 93.

In addition, in step S34, the data of the distances Bx1 and Bx2 to the forward surface 91 and the distance By to the laterally-facing surface 92 detected by the fourth laser displacement gauge 556 and the fifth laser displacement gauge 557 are transmitted to the system controller 3C by the data transmission part 56C as the relative position information. In the system controller 3C, the input part 311 receives the data of the distances Bx1, Bx2 and By as the relative position information. In the system controller 3C, the calculation part 314 calculates the shift amount of the palette for adjustment 50C with respect to the unmanned forklift 2 at the home position on the basis of the distances Bx1, Bx2 and By. In addition, when the forks 22 are tilted and the forks 22 are inclined diagonally upward toward tips thereof, the forks 22 are returned to horizontal.

In step S35 of moving the unmanned forklift 2 to the palette placing part S, the unmanned forklift 2 holding the palette for adjustment 50C loaded at the home position is moved to the palette placing part S set on perform the initial setting first, among the plurality of palette placing parts S set on the plurality of rack structures 100 in the facility. For this, the position coordinates of the palette placing part S are transmitted to the unmanned forklift 2 as the destination according to the order from the system controller 3C. The unmanned forklift 2 moves toward the palette placing part S of the destination along the route R in a state in which the palette for adjustment 50C is placed on the forks 22.

In step S36 of placing the palette for adjustment 50C on the palette placing part S, the palette for adjustment 50C is placed (unloaded) on the palette placing part S of the object that performs the initial setting. For this, the orientation of the unmanned forklift 2 arrived at the palette placing part S of the destination is changed to face the palette placing part S. Then, the unmanned forklift 2 raises and lowers the forks 22, and matches the palette for adjustment 50C loaded on the forks 22 with the palette placing part S of the destination. The unmanned forklift 2 advances toward the second side from the first side Dx1 (the side of the route R) in the first direction Dx, and the loaded palette for adjustment 50C is placed on the palette placing part S at the position coordinates of the palette placing part S of the destination.

In step S37 of acquiring the shift amount of the palette for adjustment 50C with respect to the palette placing part S, the plurality of laser displacement gauges 55C of the position information acquisition part 53C acquire relative position information between the loaded palette for adjustment 50C and the rack structure 100. For this, first, as shown in FIG. 15, the first laser displacement gauge 551 detects the distance L11 to the reflection part 105 provided on the front column 102F. Further, when reflection from the reflection part 105 cannot be detected by the first laser displacement gauge 551, the second laser displacement gauge 552 or the intermediate laser displacement gauge 553 may detect a distance to the reflection part 105 disposed on the rear column 102R or the front column 102F by detecting the reflection from the reflection part 105.

In addition, the third laser displacement gauges 554 and 555 detect the distances L12 and L13 to the reflection part 105 provided on the rear beam member 103R. In step S37, the position information acquisition part 53C measures the distances L11, L12 and L13 to the rack structure 100 on which the palette for adjustment 50C is placed as the relative position information in a non-contact manner.

In addition, in step S37, data of the distances L11, L12 and L13 detected by the first laser displacement gauge 551 and the third laser displacement gauges 554 and 555 are transmitted to the system controller 3C by the data transmission part 56C as the relative position information. In the system controller 3C, the input part 311 receives data of the distances L11, L12 and L13 as the relative position information.

In step S37 of acquiring the shift amount of the palette for adjustment 50C with respect to the palette placing part S, like the first embodiment, the calculation part 314 acquires (detects) the shift amount of the palette for adjustment 50C placed on the rack structure 100 with respect to the palette placing part S based on the relative position information acquired by the position information acquisition part 53C.

In step S38 of loading the palette for adjustment 50C from the palette placing part S, the palette for adjustment 50C placed on the palette placing part S is loaded on the forks 22 of the unmanned forklift 2. When the palette for adjustment 50C is loaded, the first palette sensor 27A and the second palette sensor 27B are pushed in by the palette for adjustment 50C, the first palette sensor 27A and the second palette sensor 27B transmit the signal showing that the palette for adjustment 50C is detected to the displacement gage controller 58 through wireless communication. Then, the displacement gage controller 58 executes step S39.

In step S39 of acquiring the shift amount of the palette for adjustment 50C with respect to the unmanned forklift 2, like step S34, the displacement gage controller 58 operates the fourth laser displacement gauge 556 and the fifth laser displacement gauge 557, and measures a position shift amount of the palette for adjustment 50C with respect to the unmanned forklift 2 when loaded by the palette placing part S. The fourth laser displacement gauge 556 measures the distances Bx1 and Bx2 to the forward surfaces 91 of the forks 22 by radiating the laser to the forward surfaces 91. The fifth laser displacement gauge 557 measures the distance By to the laterally-facing surface 92 of the reflection member 93. The shift amount of the palette for adjustment 50C with respect to the unmanned forklift 2 is acquired from the distances Bx1 and Bx2 to the forward surface 91 and the distance By to the laterally-facing surface 92.

Here, the fifth laser displacement gauge 557 lowers the forks 22 according to necessity and causes the fifth laser displacement gauge 557 of the palette for adjustment 50C to face the reflection member 93 when the distance By to the laterally-facing surface 92 of the reflection member 93 is measured. In addition, in step S39, data of the distances Bx1 and Bx2 to the forward surface 91 and the distance By to the laterally-facing surface 92 detected by the fourth laser displacement gauge 556 and the fifth laser displacement gauge 557 are transmitted to the system controller 3C by the data transmission part 56C as the relative position information. In the system controller 3C, the input part 311 receives data of the distances Bx1, Bx2 and By as the relative position information. In the system controller 3C, the calculation part 314 calculates the shift amount of the palette for adjustment 50C with respect to the unmanned forklift 2 in the palette placing part S on the basis of the distances Bx1, Bx2 and By.

Next, it is checked whether acquisition of the shift amount in all the palette placing parts S is terminated (step S40). As a result, when acquisition of the shift amount in all the palette placing parts S has been completed, the processing returns to step S35, and moves to the palette placing part S of the object that performs the initial setting next. Here, the unmanned forklift 2 may move to the palette placing part S of the object that performs the initial setting next without returning to the home position.

Meanwhile, in step S40, when the acquisition of the shift amount in all the palette placing parts S is terminated, the processing shifts to step S41.

In step S41 of correcting the operation program of the unmanned forklift, the operation program of the unmanned forklift 2 is corrected based on the shift amount calculated at each loading position and each unloading position. In step S41, the position coordinates of the unmanned forklift 2, the position coordinates of the palette placing part S, and the like, are corrected in the operation program of the unmanned forklift 2 based on the data of the calculated shift amount at each loading position and each unloading position. Here, in correction of the position coordinates of the palette placing part S in the operation program of the unmanned forklift 2, the program of the system controller 3C may be automatically performed, and the operator of the system controller 3C may manually input a numerical value or the like to correct the position coordinates of the palette placing part S. In addition, a numerical value where the shift amount is 0 may be input, or the shift amount may be separately stored to correct the value during control.

(Effects)

In the initial setting method S30 of the unmanned forklift 2 having the above-mentioned configuration, the palette for adjustment 50C is actually loaded by the unmanned forklift 2, and relative position information between the loaded palette for adjustment 50C and the unmanned forklift 2 is acquired by the position information acquisition part 53C. The shift amount of the palette for adjustment 50C with respect to the unmanned forklift 2 is calculated on the basis of the acquired relative position information. Accordingly, it is possible to grasp the shift amount when the palette is loaded by the unmanned forklift 2. The initial setting when the unmanned forklift 2 is introduced in the facility can be easily performed by correcting the operation program of the unmanned forklift 2 on the basis of the grasped shift amount.

In addition, as the shift amount of the palette for adjustment 50C with respect to the unmanned forklift 2, the shift amount of the unmanned forklift 2 with respect to the palette for adjustment 50C in the advance/retreat direction and the shift amount of the unmanned forklift 2 in the widthwise direction crossing the advance/retreat direction in the horizontal plane are calculated.

Accordingly, it is possible to acquire the shift amount of the palette for adjustment 50C with respect to the unmanned forklift 2 in the horizontal plane.

In addition, relative position information between the palette for adjustment 50C and the unmanned forklift 2 can be acquired by measuring the distances Bx1, Bx2 and By to the unmanned forklift-side reference position display part 90 set on the unmanned forklift 2.

In addition, relative position information between the palette for adjustment 50C and the unmanned forklift 2 in the advance/retreat direction of the unmanned forklift 2 can be acquired by setting the unmanned forklift-side reference position display part 90 on the forward surfaces 91 of the forks 22 and measuring the distances Bx1 and Bx2 to the unmanned forklift-side reference position display part 90 set on the unmanned forklift 2.

Further, relative position information between the palette for adjustment 50C and the unmanned forklift 2 in the widthwise direction of the unmanned forklift 2 can be acquired by setting the unmanned forklift-side reference position display part 90 on the reflection member 93 having the laterally-facing surface 92 provided on the forklift main body 21 of the unmanned forklift 2 and facing in the widthwise direction.

In addition, the position information acquisition part 53C acquires relative position information between the palette for adjustment 50C and the unmanned forklift 2. Accordingly, the position information acquisition part 53C can acquire relative position information between the palette for adjustment 50C and the unmanned forklift 2. Accordingly, it is possible to grasp the shift amount when the palette is loaded by the unmanned forklift 2. The initial setting when the unmanned forklift 2 is introduced in the facility can be easily performed by correcting the operation program of the unmanned forklift 2 on the basis of the grasped shift amount.

In addition, since the distances Bx1 and Bx2 to the forward surfaces 91 of the forks 22 are measured by the fourth laser displacement gauge 556, relative position information between the palette for adjustment 50C and the unmanned forklift 2 in the advance/retreat direction of the unmanned forklift 2 can be acquired. In addition, since a distance Dy to the reflection member 93 having the laterally-facing surface 92 of the unmanned forklift 2 is measured by the fifth laser displacement gauge 557, relative position information between the palette for adjustment 50C and the unmanned forklift 2 in the widthwise direction of the unmanned forklift 2 can be acquired. Accordingly, it is possible to acquire the shift amount of the palette for adjustment 50C with respect to the unmanned forklift 2 in the horizontal plane.

In the adjustment system 10C of the above-mentioned unmanned forklift 2, the shift amount of the palette for adjustment 50C with respect to the unmanned forklift 2 is calculated based on the relative position information between the palette for adjustment 50C and the unmanned forklift 2 acquired by the position information acquisition part 53C.

Accordingly, it is possible to grasp the shift amount when the palette is loaded by the unmanned forklift 2. The initial setting when the unmanned forklift 2 is introduced in the facility can be easily performed by correcting the operation program of the unmanned forklift 2 on the basis of the grasped shift amount.

In addition, the unmanned forklift 2 includes the palette sensors 27 configured to detect that the palette for adjustment 50C was loaded, and starts acquisition of relative position information between the palette for adjustment 50C and the unmanned forklift 2 when the palette sensors 27 detect that the palette for adjustment 50C was loaded.

Accordingly, when the palette sensors 27 detect that the palette for adjustment 50C was loaded, acquisition of the relative position information between the palette for adjustment 50C and the unmanned forklift 2 can be automatically started.

In addition, like the embodiment, when the unmanned forklift 2 is introduced in the facility, the palette for adjustment 50C is actually placed on the palette placing part S of the rack structure 100 by the unmanned forklift 2. Relative position information between the loaded palette for adjustment 50C and the rack structure 100 on the palette placing part S is acquired by the position information acquisition part 53C. The shift amount of the palette for adjustment 50C with respect to the palette placing part S is calculated on the basis of the acquired relative position information. Accordingly, it is possible to grasp the shift amount when the palette 5 on which articles are loaded by the unmanned forklift 2 is placed on the palette placing part S of the rack structure 100. The initial setting when the unmanned forklift 2 is introduced in the facility can be easily performed by correcting the operation program of the unmanned forklift 2 on the basis of the grasped shift amount. In addition, since the position information acquisition part 53C is provided in the palette for adjustment 50C, in each of the plurality of palette placing parts S set on the rack structure 100, there is no need to provide a sensor or the like configured to detect the shift amount of the palette for adjustment 50C on the side of the rack structure 100. Accordingly, the introduction of the unmanned forklift 2 can be easily performed, and time and costs required for test traveling before the official operation can be suppressed.

Other Embodiments

Hereinabove, while the embodiments of the present disclosure have been described in detail with reference to the accompanying drawings, a specific configuration is not limited to the embodiment and also includes design changes without departing from the spirit of the present disclosure.

Further, in the embodiment, in steps S14 and S24, while data of the calculated shift amount are output to the system controller 3 through wireless communication, there is no limitation thereto. For example, the operation program of the unmanned forklift 2 may be corrected by manually inputting the data of the shift amount calculated by the processing terminal 60A or 60B into the system controller 3 by the operator.

In addition, in the first or second embodiment, it is possible to provide a configuration in which the processing terminal 60A or 60B and the system controller 3 are integrated.

In addition, while the configuration in which the plurality of laser displacement gauges 55 are included as the position information acquisition part 53A or 53C has been provided in the first or third embodiment, an installation number and an installation position thereof may be appropriately changed. In addition, while the configuration in which the camera 57 is included as the position information acquisition part 53B has been provided in the second embodiment, an installation position thereof may be appropriately changed as long as the reference position display part M can be photographed.

While the configuration in which the marks M1 and M2 are included as the reference position display part M has been provided in the embodiment, a shape, a size, a number, disposition, or the like, thereof may be appropriately changed. For example, a specific area of the rack structure 100 having a fixed positional relation with respect to each of the palette placing parts S (for example, a bonding area or the like between the columns 102 and the beam members 103) can be employed as the reference position display part M without attaching the marks M1 and M2 and the like as the reference position display part M.

<Supplementary Statements>

The initial setting method S11, S21 or S30 of the unmanned forklift 2, the palettes for adjustment 50A to 50C and the adjustment system of the unmanned forklift 2 according to the embodiments are grasped, for example, as follows.

(1) The initial setting method S11, S21 or S30 of the unmanned forklift 2 according to a first aspect is the initial setting method S11, S21 or S30 when the unmanned forklift 2 is introduced in the facility including the rack structure 100, the method including: step S12, S22 or S36 of placing the palettes for adjustment 50A to 50C on the palette placing parts S of the rack structure 100 using the unmanned forklift 2 on the basis of a preset operation program, step S13 or S23 of acquiring relative position information between the palettes for adjustment 50A to 50C and the rack structure 100 using the position information acquisition parts 53A to 53C included in the palettes for adjustment 50A to 50C, and step S14 or S24 of calculating the shift amount of the palettes for adjustment 50A to 50C loaded on the rack structure 100 with respect to the palette placing parts S on the basis of the relative position information.

As an example of the facility, a warehouse, a factory, a commercial facility, a freight handling facility, or the like, are exemplary examples.

In the initial setting method S11, S21 or S30 of the unmanned forklift 2, when the unmanned forklift 2 is introduced in the facility including the rack structure 100, the palettes for adjustment 50A to 50C are actually placed on the palette placing parts S of the rack structure 100 by the unmanned forklift 2. Relative position information between the loaded palettes for adjustment 50A to 50C on the palette placing parts S and the rack structure 100 is acquired by the position information acquisition part 53A. The shift amount of the palettes for adjustment 50A to 50C with respect to the palette placing parts S is calculated on the basis of the acquired relative position information. Accordingly, it is possible to grasp the shift amount when the palette on which articles are loaded is placed on the palette placing parts S of the rack structure 100 by the unmanned forklift 2. Initial setting when the unmanned forklift 2 is introduced in the facility can be easily performed by correcting an operation program of the unmanned forklift 2 on the basis of the grasped shift amount. In addition, since the position information acquisition parts 53A to 53C are provided on the palettes for adjustment 50A to 50C, in each of the plurality of palette placing parts S set on the rack structure 100, there is no need to provide a sensor or the like configured to detect shift amounts of the palettes for adjustment 50A to 50C on the side of the rack structure 100. Accordingly, the introduction of the unmanned forklift 2 can be easily performed, and time and costs required for test traveling before the official operation can be suppressed.

(2) The initial setting method S11 or S30 of the unmanned forklift 2 according to a second aspect is the initial setting method S11 or S30 of the unmanned forklift 2 of the above-mentioned (1), in steps S13 or S37 of acquiring position information, a distance to the rack structure 100 on which the palette for adjustment 50A or 50C is placed may be measured by the position information acquisition part 53A or 53C as relative position information in a non-contact manner.

Accordingly, the distance to the rack structure 100 is measured by the position information acquisition part 53A or 53C as the relative position information in a non-contact manner. Accordingly, the relative position information can be easily and rapidly acquired.

As the example in which the distance to the rack structure 100 is measured by the position information acquisition part 53A or 53C in a non-contact manner, the laser displacement gauge 55 configured to measure the distance to the rack structure 100 by radiating a laser to the rack structure 100 or a distance measuring device using ultrasonic waves, infrared light, or the like, is an exemplary example.

(3) The initial setting method S11 or S30 of the unmanned forklift 2 according to a third aspect is the initial setting method S11 or S30 of the unmanned forklift 2 of the above-mentioned (2), in the calculating step S14, the shift amount $\Delta X$ in the first direction Dx along the advance/retreat direction of the unmanned forklift 2 with respect to the rack structure 100 and the shift amount ΔY in the second direction Dy crossing the first direction Dx in the horizontal plane may be calculated as the shift amounts.

Accordingly, it is possible to acquire the shift amounts ΔX and ΔY of the palette for adjustment 50A or 50C with respect to the palette placing part S in the horizontal plane.

(4) The initial setting method S11 or S30 of the unmanned forklift 2 according to a fourth aspect is the initial setting method S11 or S30 of the unmanned forklift 2 of the above-mentioned (3), in the calculating step S14 or S37, the shift amount Δθ in the rotation direction Dc around the vertical axis may be further calculated as the shift amount.

Accordingly, the shift amount Δθ of the palette for adjustment 50A or 50C in the rotation direction Dc around the vertical axis with respect to the palette placing part S can be acquired. The operation program of the unmanned forklift 2 can be more accurately corrected by acquiring the shift amount Δθ in the rotation direction Dc, in addition to the shift amounts ΔX and ΔY in the horizontal plane.

(5) The initial setting method S21 of the unmanned forklift 2 according to a fifth aspect is the initial setting method S21 of the unmanned forklift 2 of the above-mentioned (1), in step S23 of acquiring the position information, the position information acquisition part 53B photographs the image 300 including the reference position display part M showing the rack-side reference position in the rack structure 100 set on the rack structure 100 as the relative position information, and in the calculating step S24, the shift amounts of the rack-side reference position Q2 in the image 300 with respect to the palette-side reference position Pt set on the palette for adjustment 50B on the basis of the relative position information may be calculated.

Accordingly, since the position information acquisition part 53B photographs the image 300 including the reference position display part M set on the rack structure 100 as the relative position information, the shift amount of the rack-side reference position Q2 in the image 300 with respect to the palette-side reference position Pt set on the palette for adjustment 50B can be calculated.

(6) The initial setting method S21 of the unmanned forklift 2 according to a sixth aspect is the initial setting method S21 of the unmanned forklift 2 of the above-mentioned (5), in step S23 of acquiring the position information, the image 300 including a mark installed on the rack structure 100 as the reference position display part M is photographed, and in the calculating step S24, a shift amount ΔX in a first direction Dx along an advance/retreat direction of the unmanned forklift 2 with respect to the rack structure 100, and a shift amount ΔY in a second direction Dy crossing the first direction Dx in a horizontal plane may be calculated as the shift amounts.

Accordingly, since the marks M1 and M2 are set on the rack structure 100 as the reference position display part M, the shift amount of the palette for adjustment 50B with respect to the palette placing part S in the horizontal plane can be acquired.

(7) The initial setting method S21 of the unmanned forklift 2 according to a seventh aspect is the initial setting method S21 of the unmanned forklift 2 of the above-mentioned (6), in step S23 of acquiring the relative position information, the plurality of marks M1 and M2 set on the rack structure 100 are photographed, and in the calculating step S24, a shift amount Δθc in a rotation direction Dc around a vertical axis may be further calculated based on a positional relation between the palette-side reference position Pt and the plurality of marks M1 and M2.

Accordingly, since the plurality of marks M1 and M2 are set on the rack structure 100 as the reference position display part M, in addition to the shift amount of the palette for adjustment 50B with respect to the palette placing part S in the horizontal plane, the shift amount Δθc in the rotation direction Dc can be acquired. Accordingly, the operation program of the unmanned forklift 2 can be more accurately corrected.

(8) The initial setting method S30 of the unmanned forklift 2 according to an eighth aspect is the initial setting method S30 of the unmanned forklift 2 of any one of the above-mentioned (1) to (7), the method may further including step S33 or S38 of loading the palette for adjustment 50C on the unmanned forklift 2 on the basis of a preset operation program, step S34 or S39 of acquiring relative position information between the palette for adjustment 50C and the unmanned forklift 2 using the position information acquisition part 53C provided in the palette for adjustment 50C, and step S34 or S39 of calculating the shift amount of the palette for adjustment 50C with respect to the unmanned forklift 2 on the basis of the relative position information between the palette for adjustment 50C and the unmanned forklift 2.

In this way, the palette for adjustment 50C is actually loaded by the unmanned forklift 2, and the relative position information between the loaded palette for adjustment 50C and the unmanned forklift 2 is acquired by the position information acquisition part 53C. The shift amount of the palette for adjustment 50C with respect to the unmanned forklift 2 is calculated on the basis of the acquired relative position information. Accordingly, the shift amount when the palette 5 is loaded by the unmanned forklift 2 can be grasped. Since the operation program of the unmanned forklift 2 is corrected on the basis of the grasped shift amount, the initial setting when the unmanned forklift 2 is introduced in the facility can be easily performed.

(9) The initial setting method S30 of the unmanned forklift 2 according to a ninth aspect is the initial setting method S30 of the unmanned forklift 2 of the above-mentioned (8), in step S34 or S39 of calculating the shift amount of the palette for adjustment 50C with respect to the unmanned forklift 2, the shift amount of the unmanned forklift 2 with respect to the palette for adjustment 50C in the advance/retreat direction and the shift amount of the unmanned forklift 2 in the widthwise direction crossing the advance/retreat direction in the horizontal plane may be calculated.

Accordingly, the shift amount of the palette for adjustment 50C with respect to the unmanned forklift 2 in the horizontal plane can be acquired.

(10) The initial setting method S30 of the unmanned forklift 2 according to a tenth aspect is the initial setting method S30 of the unmanned forklift 2 of the above-mentioned (8) or (9), in step S34 or S37 of acquiring the relative position information between the palette for adjustment 50C and the unmanned forklift 2, the position information acquisition part 53C may measures the distances Bx1, Bx2 and By to the unmanned forklift-side reference position display part 90 showing the unmanned forklift-side reference position in the unmanned forklift 2 set on the unmanned forklift 2 as the relative position information between the palette for adjustment 50C and the unmanned forklift 2.

Accordingly, the relative position information between the palette for adjustment 50C and the unmanned forklift 2 can be acquired by measuring the distances Bx1, Bx2 and By to the unmanned forklift-side reference position display part 90 set on the unmanned forklift 2.

(11) The initial setting method S30 of the unmanned forklift 2 according to an eleventh aspect is the initial setting method S30 of the unmanned forklift 2 of the above-mentioned (10), the unmanned forklift-side reference position display part 90 is provided to rise and lower in the unmanned forklift 2 with respect to the forklift main body 21 in the upward/downward direction, and may set on the forward surfaces 91 of the forks 22 supporting the palette for adjustment 50C, which face forward in the advance/retreat direction of the unmanned forklift 2.

Accordingly, the relative position information between the palette for adjustment 50C and the unmanned forklift 2 in the advance/retreat direction of the unmanned forklift 2 can be acquired by setting the unmanned forklift-side reference position display part 90 to the forward surfaces 91 of the forks 22 and measuring the distances Bx1 and Bx2 to the unmanned forklift-side reference position display part 90 set on the unmanned forklift 2.

(12) The initial setting method S30 of the unmanned forklift 2 according to a twelfth aspect is the initial setting method S30 of the unmanned forklift 2 of the above-mentioned (10) or (11), the unmanned forklift-side reference position display part 90 is provided on the forklift main body 21 of the unmanned forklift 2, and may set on the reflection member 93 having the laterally-facing surface 92 facing the widthwise direction.

Accordingly, the relative position information between the palette for adjustment 50C and the unmanned forklift 2 in the widthwise direction of the unmanned forklift 2 can be acquired by setting the unmanned forklift-side reference position display part 90 to the reflection member 93 having the laterally-facing surface 92 provided on the forklift main body 21 of the unmanned forklift 2 and facing the widthwise direction and measuring the distance By to unmanned forklift-side reference position display part 90 set on the unmanned forklift 2.

(13) The initial setting method S11, S21 or S30 of the unmanned forklift 2 according to a thirteenth aspect is the initial setting method S11, S21 or S30 of the unmanned forklift 2 of any one of the above-mentioned (1) to (12), the method may further including step S15, S25 or S41 of correcting the operation program of the unmanned forklift 2 on the basis of the calculated shift amount.

Accordingly, the operation program of the unmanned forklift 2 is corrected on the basis of the shift amount of the calculated palettes for adjustment 50A to 50C with respect to the palette placing parts S, and after correction, the palette can be unloaded on the palette placing parts S with high accuracy by the unmanned forklift 2 operated on the basis of the operation program.

(14) The palette for adjustment 50A according to a fourteenth aspect is the palettes for adjustment 50A to 50C used in the initial setting method S11, S21 or S30 of the unmanned forklift 2 of any one of the above-mentioned (1) to (13), the palette for adjustment 50A including the palette main body 51A that is able to be supported by the forks 22 of the unmanned forklift 2 and placed on the rack structure 100, and the position information acquisition parts 53A to 53C provided on the palette main body 51A and configured to acquire relative position information with the rack structure 100 on which the palettes for adjustment 50A to 50C are placed.

The initial setting method S11, S21 or S30 of the unmanned forklift 2 can be performed using the palettes for adjustment 50A to 50C. Since the position information acquisition parts 53A to 53C are provided on the palettes for adjustment 50A to 50C, in each of the plurality of palette placing parts S set on the rack structure 100, there is no need to provide a sensor or the like configured to detect the shift amount to the palettes for adjustment 50A to 50C on the side of the rack structure 100. Accordingly, the introduction of the unmanned forklift 2 can be easily performed, and time and costs required for test traveling before the official operation can be suppressed.

(15) The palette for adjustment 50A or 50C according to a fifteenth aspect is the palette for adjustment 50A or 50C of the above-mentioned (14), the position information acquisition part 53A or 53C may includes the laser displacement gauge 55 configured to measure a distance to the rack structure 100 by radiating a laser to the rack structure 100.

Accordingly, the laser displacement gauge 55 can measure the distance to the rack structure 100 as the relative position information in a non-contact manner. Accordingly, the relative position information can be easily and rapidly acquired.

(16) The palette for adjustment 50A or 50C according to a sixteenth aspect is the palette for adjustment 50A or 50C of the above-mentioned (15), the position information acquisition part 53A or 53C may including the first laser displacement gauge 551 disposed on the first side Dx1 in the first direction Dx along the advance/retreat direction of the unmanned forklift 2 with respect to the rack structure 100 and configured to detect a part of the rack structure 100 located in the second direction Dy crossing the first direction Dx in the horizontal plane with respect to the palette main body 51A, and the second laser displacement gauge 552 disposed on the second side Dx2 in the first direction Dx and configured to detect another part of the rack structure 100 located in the second direction Dy with respect to the palette main body 51A.

In the palette for adjustment 50A, the part of the rack structure 100 is detected by the first laser displacement gauge 551 disposed on the first side Dx1 in the first direction Dx, and the other part of the rack structure 100 is detected by the second laser displacement gauge 552 disposed on the second side Dx2 in the first direction Dx. Accordingly, a position of the palette for adjustment 50A or 50C in the first direction Dx with respect to the rack structure 100 can be acquired as the relative position information on the basis of the detection result in the first laser displacement gauge 551 and the second laser displacement gauge 552.

(17) The palette for adjustment 50A or 50C according to a seventeenth aspect is the palette for adjustment 50A or SOC of the above-mentioned (16), the first laser displacement gauge 551 and the second laser displacement gauge 552 are provided on both sides of the palette main body 51A in the second direction Dy, respectively, and each of the first laser displacement gauge 551 and the second laser displacement gauge 552 may be able to detect whether there is the rack structure 100 only within the range of a determined distance.

Accordingly, since the first laser displacement gauge 551 and the second laser displacement gauge 552 are provided on both sides in the second direction Dy, relative position information of the palette main body 51A with respect to the rack structure 100 can be acquired on both sides in the second direction Dy. Here, each of the first laser displacement gauge 551 and the second laser displacement gauge 552 can detect whether there is the rack structure 100 only within the range of the determined distance. That is, when the distance between the first laser displacement gauge 551 or the second laser displacement gauge 552 and the rack structure 100 is within the range where whether there is the rack structure 100 can be detected by the first laser displacement gauge 551 and the second laser displacement gauge 552 in both sides in the second direction Dy, the relative position information between the palette for adjustment 50A or 50C and the rack structure 100 can be acquired. In the case in which an interval between the members that constitute the rack structure 100 located on both sides in the second direction Dy is large, when the palette for adjustment 50A or 50C is placed on the palette placing part S on the first side Dy1 in the second direction Dy, the first laser displacement gauge 551 and the second laser displacement gauge 552 disposed on the first side Dy1 in the second direction Dy detects the member of the rack structure 100 on the first side Dy1 in the second direction Dy. In addition, when the palette for adjustment 50A or 50C is placed on the palette placing part S on the second side Dy2 in the second direction Dy, the member of the rack structure 100 on the second side Dy2 in the second direction Dy is detected by the first laser displacement gauge 551 and the second laser displacement gauge 552 disposed on the second side Dy2 in the second direction Dy. In this way, the shift amount of the palette for adjustment 50A or 50C in both of the palette placing part S on the first side Dy1 in the second direction Dy and the palette placing part S on the second side Dy2 in the second direction Dy can be acquired by the palette for adjustment 50A or 50C.

(18) The palette for adjustment 50A or 50C according to an eighteenth aspect is the palette for adjustment 50A of the above-mentioned (17), the position information acquisition part 53A or 53C may further including the third laser displacement gauge 555 configured to emit a laser toward the second side Dx2 in the first direction Dx along the advance/retreat direction of the unmanned forklift 2 with respect to the rack structure 100.

In the palette for adjustment 50A or 50C, the third laser displacement gauge 555 emits a laser toward the second side Dx2 in the first direction Dx along the advance/retreat direction of the unmanned forklift 2. Accordingly, whether there is the member of the rack structure 100 located diagonally below the second side Dx2 of the palette for adjustment 50A or 50C in the first direction Dx can be detected by the third laser displacement gauge 555. Accordingly, relative position information of the rack structure 100 with respect to the member of the rack structure 100 located diagonally below the second side Dx2 of the palette for adjustment 50A or 50C in the first direction Dx can be acquired.

(19) The palette for adjustment 50B according to a nineteenth aspect is the palette for adjustment 50B of the above-mentioned (14), the position information acquisition part 53B may including the camera 57 configured to photograph the marks M1 and M2 set on the rack structure 100.

Accordingly, since the camera 57 of the position information acquisition part 53A photographs the image 300 including the marks M1 and M2, the shift amount of the palette for adjustment 50B with respect to the palette placing part S can be acquired.

(20) The palette for adjustment 50C according to a twentieth aspect is the palette for adjustment 50C of any one of the above-mentioned (14) to (19), the position information acquisition part 53C may acquires relative position information between the palette for adjustment 50C and the unmanned forklift 2.

Accordingly, the position information acquisition part 53C can acquire the relative position information between the palette for adjustment 50C and the unmanned forklift 2. Accordingly, the shift amount when the palette is loaded by the unmanned forklift 2 can be grasped. Since the operation program of the unmanned forklift 2 is corrected on the basis of the grasped shift amount, the initial setting when the unmanned forklift 2 is introduced in the facility can be easily performed.

(21) The palette for adjustment 50C according to a twenty first aspect is the palette for adjustment 50C of the above-mentioned (20), the position information acquisition part 53C may including the fourth laser displacement gauge 556 configured to measure a distance to the forward surfaces 91 of the forks 22 facing forward in the advance/retreat direction of the unmanned forklift 2, and the fifth laser displacement gauge 557 provided on the forklift main body 21 of the unmanned forklift 2 and configured to measure a distance to the reflection member 93 having the laterally-facing surface 92 facing the widthwise direction, while being supported on the forks 22 of the unmanned forklift 2.

Accordingly, since the fourth laser displacement gauge 556 measures the distance to the forward surfaces 91 of the forks 22, the relative position information between the palette for adjustment 50C and the unmanned forklift 2 in the advance/retreat direction of the unmanned forklift 2 can be acquired. In addition, since the fifth laser displacement gauge 557 measures the distance to the reflection member 93 having the laterally-facing surface 92 of the unmanned forklift 2, the relative position information between the palette for adjustment 50C and the unmanned forklift 2 in the widthwise direction of the unmanned forklift 2 can be acquired. Accordingly, the shift amount of the palette for adjustment 50C with respect to the unmanned forklift 2 in the horizontal plane can be acquired.

(22) The adjustment systems 10A to 10C of the unmanned forklift 2 according to a twenty second aspect include the palettes for adjustment 50A to 50C of any one of the above-mentioned (14) to (21), and the calculation part 72A, 72B or 314 configured to calculate the shift amount of the palettes for adjustment 50A to 50C loaded on the rack structure 100 with respect to the palette placing part S based on the relative position information acquired by the position information acquisition parts 53A to 53C.

The adjustment system of the unmanned forklift 2 can calculate the shift amount of the palettes for adjustment 50A to 50C loaded on the rack structure 100 with respect to the palette placing parts S using the calculation part 72A, 72B or 314 based on the relative position information between the palettes for adjustment 50A to 50C and the rack structure 100 acquired by the position information acquisition parts 53A to 53C of the palettes for adjustment 50A to 50C. Accordingly, the introduction of the unmanned forklift 2 can be easily performed, and time and costs required for test traveling before the official operation can be suppressed.

(23) The adjustment system 10C of the unmanned forklift 2 according to a twenty third aspect is the adjustment system 10C of the unmanned forklift 2 of the above-mentioned (22), the calculation part 314 may calculating the shift amount of the palette for adjustment 50C with respect to the unmanned forklift 2 based on the relative position information between the palette for adjustment 50C and the unmanned forklift 2 acquired by the position information acquisition part 53C.

Accordingly, the shift amount when the palette is loaded by the unmanned forklift 2 can be grasped. The initial setting when the unmanned forklift 2 is introduced in the facility can be easily performed by correcting the operation program of the unmanned forklift 2 on the basis of the grasped shift amount.

(24) The adjustment system 10C of the unmanned forklift 2 according to a twenty fourth aspect is the adjustment system 10C of the unmanned forklift 2 of the above-mentioned (23), the unmanned forklift 2 includes the palette sensors 27 configured to detect that the palette for adjustment 50C was loaded, and the palette sensors 27 may start acquisition of the relative position information between the palette for adjustment 50C and the unmanned forklift 2 when it is detected that the palette for adjustment 50C was loaded.

Accordingly, when the palette sensors 27 detect that the palette for adjustment 50C was loaded, acquisition of the relative position information between the palette for adjustment SOC and the unmanned forklift 2 can be automatically started.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Automated guided forklift system
2 Unmanned forklift
3, 3C System controller
10A to 10C Adjustment system
21 Forklift main body
21s Straddle leg
22 Fork
23 Forklift control part
27A First palette sensor (palette sensor)
27B Second palette sensor (palette sensor)
50A to 50C Palette for adjustment
51A, 51B Palette main body
51k Cutout concave portion
52 Insertion hole
53A to 53C Position information acquisition part
55, 55C Laser displacement gauge
551 First laser displacement gauge
552 Second laser displacement gauge
553 Intermediate laser displacement gauge
554, 555 Third laser displacement gauge
556 Fourth laser displacement gauge
557 Fifth laser displacement gauge
56, 56C Data transmission part
57 Camera
58 Displacement gage controller
59 Support member
60A, 60B Processing terminal
61, 301 CPU
62, 302 ROM
63, 303 RAM
64, 304 Storage device
65, 305 Signal transmission and reception module
71 Input part
72A, 72B Calculation part
73 Output part
90 Unmanned forklift-side reference position display part
91 Forward surface
92 Laterally-facing surface
93 Reflection member
100 Rack structure
100b Lower layer portion
100m Middle layer portion
100t Upper layer portion
102 Column
102F Front column
102R Rear column
103 Beam member
103F Front beam member
103R Rear beam member
103S Side beam member
105 Reflection part
200 Palette position adjusting stand
201 Adjusting table main body
202 Spherical roller
300 Image
Dc Rotation direction
Dc Circumferential direction
Dv Upward/downward direction
Dx First direction
Dx1 First side
Dx2 Second side
Dy Second direction
Dy1 First side
Dy2 Second side
F Floor surface
Bx1, Bx2, By Distance
L11 Distance
L12 Distance
L13 Distance
M Reference position display part
M1 Mark
M2 Mark
Ps, Pt Palette-side reference position
Q1, Q2 Rack-side reference position
R Route
S, SL, SR Palette placing part
S11, S21, S30 Initial setting method of unmanned forklift
S12, S22 Step of placing palette for adjustment on palette placing part
S13, S23 Step of acquiring relative position information
S14, S24 Step of calculating shift amount with respect to palette placing part of palette for adjustment
S15, S25 Step of correcting operation program of unmanned forklift
S31 Step of performing advance preparation
S32 Step of moving unmanned forklift to home position
S33 Step of loading palette for adjustment
S34 Step of acquiring shift amount of palette for adjustment with respect to unmanned forklift
S35 Step of moving unmanned forklift to palette placing part
S36 Step of placing palette for adjustment on palette placing part
S37 Step of acquiring shift amount with respect to palette placing part of palette for adjustment
S38 Step of loading palette for adjustment from palette placing part
S39 Step of acquiring shift amount of palette for adjustment with respect to unmanned forklift
S40 Step of confirming whether acquisition of shift amount is terminated in all palette placing parts
S41 Step of correcting operation program of unmanned forklift
$\Delta X$ Shift amount in first direction
$\Delta Y$ Shift amount in second direction
$\Delta\theta$, $\Delta\theta c$ Shift amount in rotation direction

What is claimed is:

1. An initial setting method for when an unmanned forklift is introduced into a facility including a rack structure, the initial setting method of the unmanned forklift comprising:

placing a palette for adjustment on a palette placing part of the rack structure using the unmanned forklift on the basis of a preset operation program;
acquiring relative position information between the palette for adjustment and the rack structure using a position information acquisition part included in the palette for adjustment;
calculating a shift amount of the palette for adjustment placed on the rack structure with respect to the palette placing part on the basis of the relative position information; and
correcting the operation program of the unmanned forklift based on the calculated shift amount.

2. The initial setting method of the unmanned forklift according to claim 1, wherein acquiring the position information includes measuring a distance to the rack structure on which the palette for adjustment is placed using the position information acquisition part as the relative position information.

3. The initial setting method of the unmanned forklift according to claim 2, wherein, in calculating the shift amount,
a shift amount in a first direction along an advance/retreat direction of the unmanned forklift with respect to the rack structure, and
a shift amount in a second direction crossing the first direction in a horizontal plane are calculated.

4. The initial setting method of the unmanned forklift according to claim 3, wherein, in calculating the shift amount,
a shift amount in a rotation direction around a vertical axis is further calculated.

5. The initial setting method of the unmanned forklift according to claim 1, wherein, in acquiring the position information, an image including a reference position display part showing a rack-side reference position in the rack structure set on the rack structure is photographed by the position information acquisition part as the relative position information, and
in calculating, a shift amount of the rack-side reference position in the image with respect to a palette-side reference position set on the palette for adjustment is calculated on the basis of the relative position information.

6. The initial setting method of the unmanned forklift according to claim 5, wherein, in acquiring the position information, the image including a mark installed on the rack structure as the reference position display part is photographed, and
in calculating the shift amount,
a shift amount in a first direction along an advance/retreat direction of the unmanned forklift with respect to the rack structure, and
a shift amount in a second direction crossing the first direction in a horizontal plane are calculated.

7. The initial setting method of the unmanned forklift according to claim 6, wherein, in acquiring the relative position information, a plurality of marks set on the rack structure are photographed, and
in calculating, a shift amount in a rotation direction around a vertical axis is further calculated based on a positional relation between the palette-side reference position and the plurality of marks.

8. The initial setting method of the unmanned forklift according to claim 1, further comprising:
loading the palette for adjustment using the unmanned forklift on the basis of a preset operation program;
acquiring relative position information between the palette for adjustment and the unmanned forklift using a position information acquisition part provided in the palette for adjustment; and
calculating a shift amount of the palette for adjustment with respect to the unmanned forklift on the basis of the relative position information between the palette for adjustment and the unmanned forklift.

9. The initial setting method of the unmanned forklift according to claim 8, wherein, in calculating the shift amount of the palette for adjustment with respect to the unmanned forklift,
a shift amount of the unmanned forklift with respect to the palette for adjustment in an advance/retreat direction, and
a shift amount of the unmanned forklift in a widthwise direction crossing the advance/retreat direction in a horizontal plane are calculated.

10. The initial setting method of the unmanned forklift according to claim 8, wherein, in acquiring the relative position information between the palette for adjustment and the unmanned forklift, the position information acquisition part measures a distance to an unmanned forklift-side reference position display part showing an unmanned forklift-side reference position in the unmanned forklift set on the unmanned forklift as the relative position information between the palette for adjustment and the unmanned forklift.

11. The initial setting method of the unmanned forklift according to claim 10, wherein the unmanned forklift-side reference position display part is provided to move up and down with respect to a forklift main body in the unmanned forklift, and set on a forward surface facing forward in the advance/retreat direction of the unmanned forklift in the forks that support the palette for adjustment.

12. The initial setting method of the unmanned forklift according to claim 10, wherein the unmanned forklift-side reference position display part is provided on the forklift main body of the unmanned forklift, and set on a reflection member having a laterally facing surface directed in the widthwise direction.

13. A palette for adjustment used in the initial setting method of the unmanned forklift according to claim 1, the palette for adjustment comprising:
a palette main body that is able to be supported by the forks of the unmanned forklift and placed on the rack structure; and
the position information acquisition part provided on the palette main body and configured to acquire relative position information with the rack structure on which the palette for adjustment is placed.

14. The palette for adjustment according to claim 13, wherein the position information acquisition part comprises a laser displacement gauge configured to measure a distance to the rack structure by radiating a laser to the rack structure.

15. The palette for adjustment according to claim 14, wherein the position information acquisition part comprises:
a first laser displacement gauge disposed on a first side in a first direction along an advance/retreat direction of the unmanned forklift with respect to the rack structure and configured to detect a part of the rack structure located in a second direction crossing the first direction in a horizontal plane with respect to the palette main body; and
a second laser displacement gauge disposed on a second side in the first direction and configured to detect another part of the rack structure located in the second direction with respect to the palette main body.

16. The palette for adjustment according to claim 15, wherein the first laser displacement gauge and the second laser displacement gauge are provided on both sides of the palette main body in the second direction, and
each of the first laser displacement gauge and the second laser displacement gauge is able to detect only whether the rack structure is within a range of a determined distance.

17. The palette for adjustment according to claim 16, wherein the position information acquisition part further comprises a third laser displacement gauge configured to emit a laser toward a second side in the first direction along the advance/retreat direction of the unmanned forklift with respect to the rack structure.

18. The palette for adjustment according to claim 13, wherein the position information acquisition part comprises a camera configured to photograph a mark set on the rack structure.

19. The palette for adjustment according to claim 13, wherein the position information acquisition part acquires relative position information between the palette for adjustment and the unmanned forklift.

20. The palette for adjustment according to claim 19, wherein the position information acquisition part comprises:
a fourth laser displacement gauge configured to measure a distance to a forward surface of the fork facing forward in the advance/retreat direction of the unmanned forklift while being supported by the fork of the unmanned forklift; and
a fifth laser displacement gauge provided on a forklift main body of the unmanned forklift and configured to measure a distance to a reflection member having a laterally facing surface directed in the widthwise direction.

21. An adjustment system of an unmanned forklift comprising:
the palette for adjustment according to claim 13; and
a calculation part configured to calculate a shift amount of the palette for adjustment placed on the rack structure with respect to the palette placing part based on the relative position information acquired by the position information acquisition part.

22. The adjustment system of the unmanned forklift according to claim 21, wherein the calculation part calculates a shift amount of the palette for adjustment with respect to the unmanned forklift based on relative position information between the palette for adjustment and the unmanned forklift acquired by the position information acquisition part.

23. The adjustment system of the unmanned forklift according to claim 22, wherein the unmanned forklift includes a palette sensor configured to detect loading of the palette for adjustment, and
acquisition of the relative position information between the palette for adjustment and the unmanned forklift is started when the palette sensor detects loading of the palette for adjustment.

* * * * *